United States Patent
Lovchinsky et al.

(10) Patent No.: US 11,818,523 B2
(45) Date of Patent: Nov. 14, 2023

(54) SYSTEM AND METHOD FOR ENHANCING SPEECH OF TARGET SPEAKER FROM AUDIO SIGNAL IN AN EAR-WORN DEVICE USING VOICE SIGNATURES

(71) Applicant: Chromatic Inc., New York, NY (US)

(72) Inventors: Igor Lovchinsky, New York, NY (US); Andrew J. Casper, Inver Grove Heights, MN (US); Nicholas Morris, Brooklyn, NY (US); Matthew de Jonge, Brooklyn, NY (US); Jonathan Macoskey, Pittsburgh, PA (US)

(73) Assignee: Chromatic Inc., New York, NY (US)

( * ) Notice: Subject to any disclaimer, the term of this patent is extended or adjusted under 35 U.S.C. 154(b) by 0 days.

(21) Appl. No.: 18/137,951

(22) Filed: Apr. 21, 2023

(65) Prior Publication Data
US 2023/0254650 A1   Aug. 10, 2023

Related U.S. Application Data

(63) Continuation of application No. 18/097,154, filed on Jan. 13, 2023, which is a continuation-in-part of
(Continued)

(51) Int. Cl.
*H04R 25/00* (2006.01)
*G10L 21/028* (2013.01)
(Continued)

(52) U.S. Cl.
CPC .......... *H04R 25/507* (2013.01); *G06F 3/165* (2013.01); *G10L 17/18* (2013.01); *G10L 21/028* (2013.01);
(Continued)

(58) Field of Classification Search
CPC . H04R 25/558; H04R 25/604; H04R 2430/01
See application file for complete search history.

(56) References Cited

U.S. PATENT DOCUMENTS

| 9,881,631 B2 | 1/2018 | Erdogan et al. |
| 10,516,934 B1 * | 12/2019 | Solbach ............... H04R 1/1083 |

(Continued)

FOREIGN PATENT DOCUMENTS

| EP | 0 357 212 A2 | 3/1990 |
| WO | WO 2020/079485 A2 | 4/2020 |

(Continued)

OTHER PUBLICATIONS

International Search Report and Written Opinion dated Apr. 28, 2023 in connection with International Application No. PCT/US2023/010837.
(Continued)

*Primary Examiner* — Suhan Ni
(74) *Attorney, Agent, or Firm* — Wolf, Greenfield & Sacks, P.C.

(57) ABSTRACT

An ear-worn device is provided that operates to isolate and individually treat the received speech of a target speaker or multiple target speakers from an audio input signal detected in a multi-speaker environment. The ear-worn device uses a machine learning model that receives a voice signature of each of one or more target speakers as input signals, to identify and isolate the component of the audio input signal attributable to the target speaker(s). Once isolated, the target speaker's speech may be enhanced, de-emphasized, or otherwise processed in a manner desired by the wearer of the ear-worn device. The wearer may use an external electronic device, e.g., a phone, to select one or more target speakers in a conversation and/or configure various settings associated with processing the speech on the ear-worn device.

20 Claims, 26 Drawing Sheets

Related U.S. Application Data application No. 17/576,899, filed on Jan. 14, 2022, and a continuation-in-part of application No. 17/576,718, filed on Jan. 14, 2022, and a continuation-in-part of application No. PCT/US2022/012567, filed on Jan. 14, 2022, and a continuation-in-part of application No. 17/576,746, filed on Jan. 14, 2022, and a continuation-in-part of application No. 17/576,893, filed on Jan. 14, 2022.

(60) Provisional application No. 63/305,676, filed on Feb. 1, 2022.

(51) Int. Cl.
*G10L 17/18* (2013.01)
*G10L 21/0364* (2013.01)
*G06F 3/16* (2006.01)

(52) U.S. Cl.
CPC ........ G10L 21/0364 (2013.01); H04R 25/558 (2013.01); H04R 25/604 (2013.01); H04R 25/609 (2019.05); *H04R 2225/43* (2013.01); *H04R 2225/55* (2013.01); *H04R 2430/01* (2013.01)

(56) References Cited

U.S. PATENT DOCUMENTS

| | | | |
|---|---|---|---|
| 10,721,571 | B2 | 7/2020 | Crow et al. |
| 10,812,915 | B2 | 10/2020 | Santos et al. |
| 10,957,301 | B2 | 3/2021 | Hoby et al. |
| 11,245,993 | B2 | 2/2022 | Andersen et al. |
| 11,330,378 | B1 | 5/2022 | Jelcicováet al. |
| 11,375,325 | B2 | 6/2022 | Froehlich et al. |
| 11,553,286 | B2 | 1/2023 | Sabin et al. |
| 2007/0172087 | A1 | 7/2007 | Olsen |
| 2010/0027820 | A1 | 2/2010 | Kates |
| 2015/0078575 | A1 | 3/2015 | Selig et al. |
| 2017/0229117 | A1 | 8/2017 | Van der Made et al. |
| 2020/0043499 | A1 | 2/2020 | Basye et al. |
| 2021/0105565 | A1 | 4/2021 | Pedersen et al. |
| 2021/0274296 | A1* | 9/2021 | Rohde .................. H04R 25/609 |
| 2021/0289299 | A1 | 9/2021 | Durrieu |
| 2022/0095061 | A1 | 3/2022 | Diehl et al. |
| 2022/0159403 | A1 | 5/2022 | Sporer et al. |
| 2022/0223161 | A1 | 7/2022 | Fuchs et al. |
| 2022/0230048 | A1 | 7/2022 | Li et al. |
| 2022/0232321 | A1 | 7/2022 | Wexler et al. |
| 2022/0232331 | A1 | 7/2022 | Jelcicováet al. |
| 2022/0256294 | A1 | 8/2022 | Diehl et al. |

FOREIGN PATENT DOCUMENTS

| | | |
|---|---|---|
| WO | WO 2022/079848 A1 | 4/2022 |
| WO | WO 2022/107393 A1 | 5/2022 |
| WO | WO 2022/191879 A1 | 9/2022 |

OTHER PUBLICATIONS

International Search Report and Written Opinion dated Jun. 16, 2022 in connection with International Application No. PCT/US2022/012567.

Gerlach et al., A Survey on Application Specific Processor Architectures for Digital Hearing Aids. Journal of Signal Processing Systems. Mar. 20, 2021;94:1293-1308. https://link.springer.com/rticle/10.1007/s11265-021-01648-0 [last retrieved May 17, 2022].

Giri et al., Personalized Percepnet: Real-time, Low-complexity Target Voice Separation and Enhancement. Amazon Web Service, Jun. 8, 2021, arXiv preprint arXiv:2106.04129. 5 pages.

* cited by examiner

SYSTEM AND METHOD FOR ENHANCING SPEECH OF TARGET SPEAKER FROM AUDIO SIGNAL IN AN EAR-WORN DEVICE USING VOICE SIGNATURES

CROSS REFERENCE TO RELATED APPLICATIONS

This application is a continuation claiming the benefit under 35 U.S.C. § 120 of U.S. patent application Ser. No. 18/097,154, entitled "System and Method for Enhancing Speech of Target Speaker from Audio Signal in an Ear-Worn Device Using Voice Signatures," filed Jan. 13, 2023, which is herein incorporated by reference in its entirety.

U.S. patent application Ser. No. 18/097,154 is a continuation-in-part, claiming the benefit under 35 U.S.C. § 120, of U.S. application Ser. No. 17/576,718, entitled "Method, Apparatus and System for Neural Network Hearing Aid," filed Jan. 14, 2022, which is herein incorporated by reference in its entirety.

U.S. patent application Ser. No. 18/097,154 is a continuation-in-part, claiming the benefit under 35 U.S.C. § 120, of U.S. application Ser. No. 17/576,746, entitled "Method, Apparatus and System for Neural Network Hearing Aid," filed Jan. 14, 2022, which is herein incorporated by reference in its entirety.

U.S. patent application Ser. No. 18/097,154 is a continuation-in-part, claiming the benefit under 35 U.S.C. § 120, of U.S. application Ser. No. 17/576,893, entitled "Method, Apparatus and System for Neural Network Hearing Aid," filed Jan. 14, 2022, which is herein incorporated by reference in its entirety.

U.S. patent application Ser. No. 18/097,154 is a continuation-in-part, claiming the benefit under 35 U.S.C. § 120, of U.S. application Ser. No. 17/576,899, entitled "Method, Apparatus and System for Neural Network Hearing Aid," filed Jan. 14, 2022, which is herein incorporated by reference in its entirety.

U.S. patent application Ser. No. 18/097,154 is a continuation-in-part of International Patent Application Serial No. PCT/US2022/012567, entitled "Method, Apparatus and System for Neural Network Hearing Aid," filed Jan. 14, 2022, which is herein incorporated by reference in its entirety.

U.S. patent application Ser. No. 18/097,154 claims the benefit under 35 U.S.C. § 119(e) of U.S. Provisional Patent Application Ser. No. 63/305,676 filed Feb. 1, 2022, and entitled "SYSTEM AND METHOD FOR ENHANCING SPEECH OF TARGET SPEAKER FROM AUDIO SIGNAL IN AN EAR-WORN DEVICE USING VOICE SIGNATURES," which is herein incorporated by reference in its entirety.

BACKGROUND

Field

The present application relates to ear-worn speech enhancement devices.

Related Art

Hearing aids are used to help those who have trouble hearing to hear better. Typically, hearing aids amplify received sound. Some hearing aids attempt to remove environmental noise from the incoming sound.

BRIEF SUMMARY

Some embodiments provide for a method for selectively processing with an ear-worn device a target speaker's speech from an audio signal comprising the target speaker's speech and speech from additional speakers. The ear-worn device includes a processor and a microphone coupled to the processor. The method comprises: detecting the audio signal with the microphone of the ear-worn device; providing the audio signal detected by the microphone of the ear-worn device to the processor of the ear-worn device; and increasing, with the processor of the ear-worn device, a signal-to-noise ratio (SNR) of the target speaker's speech by processing the audio signal with a machine learning model using a voice signature of the target speaker.

Some embodiments provide for an apparatus comprising a processor and a microphone coupled to the processor. The apparatus is an ear-worn device. The processor is configured to selectively process a target speaker's speech from an audio signal comprising the target speaker's speech and speech from additional speakers. The processing includes: detecting the audio signal with the microphone of the ear-worn device; providing the audio signal detected by the microphone of the ear-worn device to the processor of the ear-worn device; and increasing, with the processor of the ear-worn device, a signal-to-noise ratio (SNR) of the target speaker's speech by processing the audio signal with a machine learning model using a voice signature of the target speaker.

Some embodiments provide for a method for selectively processing with an ear-worn device a target speaker's speech from an audio signal comprising the target speaker's speech and speech from additional speakers. The ear-worn device includes a processor and a microphone coupled to the processor. The method comprises: detecting the audio signal with the microphone of the ear-worn device; providing the audio signal detected by the microphone of the ear-worn device to the processor of the ear-worn device; and increasing, with the processor of the ear-worn device, a signal-to-noise ratio (SNR) of the target speaker's speech by processing the audio signal with a machine learning model using a voice signature of the target speaker.

Some embodiments provide for an apparatus comprising a processor and a microphone coupled to the processor. The apparatus is an ear-worn device. The processor is configured to selectively process a target speaker's speech from an audio signal comprising the target speaker's speech and speech from additional speakers. The processing includes: detecting the audio signal with the microphone of the ear-worn device; providing the audio signal detected by the microphone of the ear-worn device to the processor of the ear-worn device; and increasing, with the processor of the ear-worn device, a signal-to-noise ratio (SNR) of the target speaker's speech by processing the audio signal with a machine learning model using a voice signature of the target speaker.

Some embodiments provide for a method for operating a mobile processing device operatively couplable to an ear-worn device. The method comprises: wirelessly transmitting, from the mobile processing device to the ear-worn device, a voice signature of at least one target speaker.

Some embodiments provide for an apparatus comprising a processor, where the apparatus is operatively couplable to an ear-worn device. The apparatus is a mobile processing device. The processor is configured to: wirelessly transmit, from the mobile processing device to the ear-worn device, a voice signature of at least one target speaker.

Some embodiments provide for a system comprising: a hearable device comprising a microphone configured to receive an audio signal comprising temporally overlapping speech components from multiple speakers; and at least one processor configured to process the audio signal received by the microphone to identify a target speaker among the multiple speakers.

Some embodiments provide a method of selectively processing, with an ear-worn device including a processor and a microphone coupled to the processor, a target speaker's speech from an audio signal. The method comprises detecting the audio signal with the microphone of the ear-worn device; providing the audio signal detected by the microphone of the ear-worn device to the processor of the ear-worn device; and isolating, with the processor of the ear-worn device, a component of the audio signal representing speech; determining, with the processor of the ear-worn device, that the component of the audio signal representing speech represents speech of a target or non-target speaker; and applying a relative gain to the audio signal in dependence on determining that the component of the audio signal represents speech of the target or non-target speaker.

Some embodiments provide for non-transitory computer-readable medium including instructions that when executed by a processor, perform one or more of the methods listed above.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
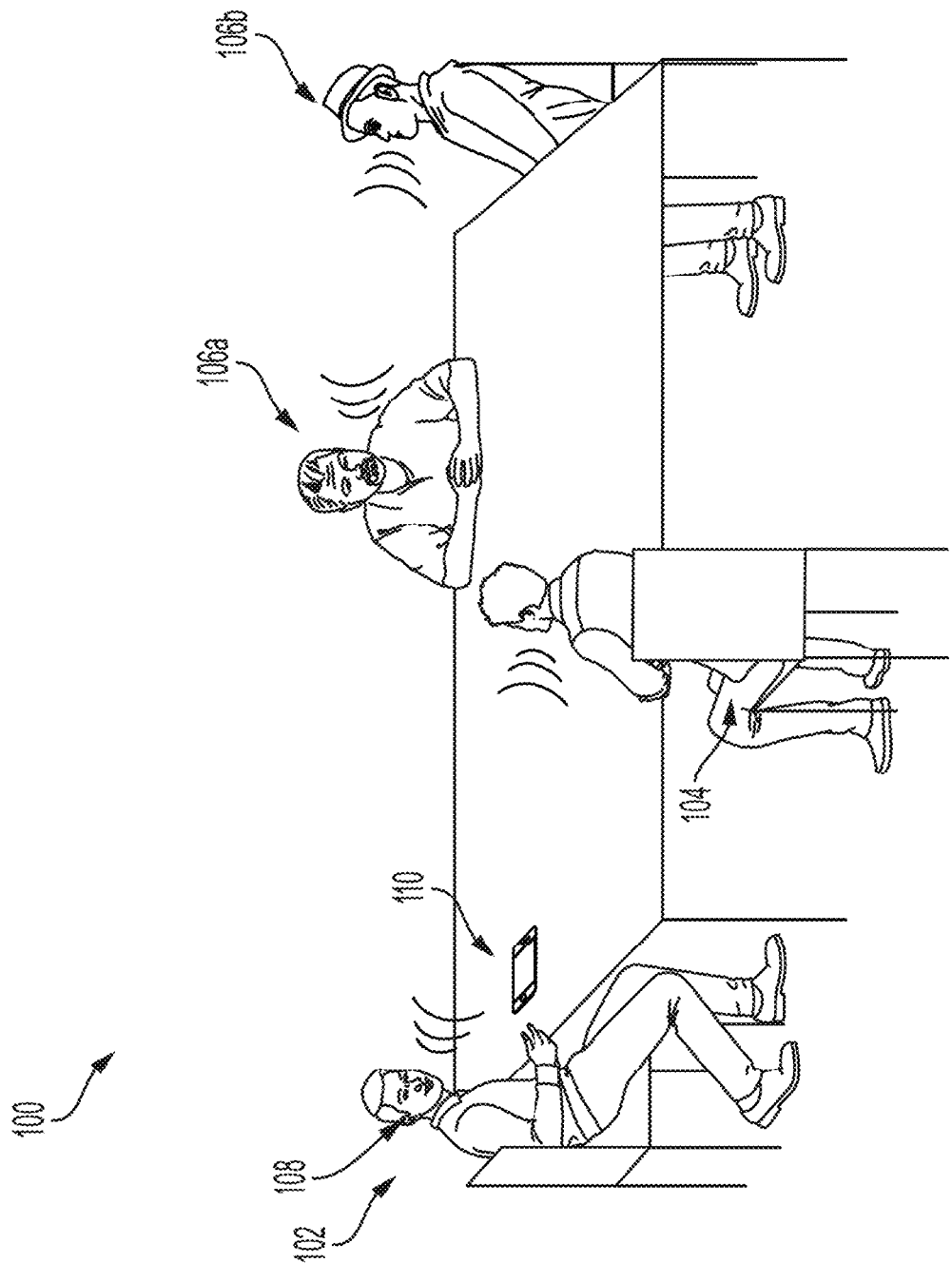
FIG. 1 illustrates an example multi-speaker environment and an audio system including an ear-worn device and a separate electronic device, according to a non-limiting embodiment of the present application.

Aspects of the present technology provide hearing systems and methods for de-noising a received audio signal, identifying the presence of a target or non-target speaker's speech in the received audio signal, and processing the received audio signal for output to a listener based on detection of the target or non-target speaker's speech. The hearing system may include an ear-worn device, such as a hearing aid, and a separate electronic device, such as a mobile phone or tablet, in communication with the ear-worn device. The target speaker may be one or more conversation partners of the wearer of the ear-worn device, while a non-target speaker may be another conversation partner or may be the wearer of the ear-worn device herself. The ear-worn device may process the received audio signal using a machine learning model. In some embodiments, the machine learning model also receives a voice signature of the target and/or non-target speaker(s). The voice signature may be used by the machine learning model to identify the speech of the target and/or non-target speaker(s), and the hearing system may then preferentially process the speech of the target and/or non-target speaker(s). In some embodiments, the machine learning model may process the received audio signal by de-noising the audio signal and determining an embedding of the audio signal, which may be compared to a reference embedding representing a voice signature. The audio signal may then be processed differently depending on whether the embedding determined from the received audio signal matches the reference embedding. For example, the wearer's own voice may be attenuated, or the speech of a conversation partner may be enhanced.

According to an aspect of the technology described herein, an ear-worn device is provided that operates to isolate and individually treat the received speech of a target speaker or multiple target speakers from an audio input signal detected in a multi-speaker environment. The ear-worn device, which is a hearing aid in some embodiments, uses a machine learning model that receives a voice signature of each of one or more target speakers as input signals, to identify and isolate the component of the audio input signal attributable to the target speaker(s). Once isolated, the target speaker's speech may be enhanced, de-emphasized, or otherwise processed in a manner desired by the wearer of the ear-worn device. As a result, the wearer of the ear-worn device can have a positive experience in multi-speaker environments.

The inventors have recognized that conventional hearing aids do not perform well in multi-speaker environments. Some hearing aids amplify all received sounds. Some hearing aids attempt to filter out ambient noise and amplify all speech received. The inventors have appreciated that such approaches perform inadequately in some hearing aid use scenarios including multi-speaker environments, which is exacerbated by poor performance at filtering out ambient noise. Examples of multi-speaker environments include family gatherings, meals with multiple people, conference meetings, networking events, playground settings, and school classrooms. In these and other multi-speaker environments, an individual often wishes to listen to a subset of the speakers present. For instance, multiple conversations may occur simultaneously between different people seated at a table, and a hearing aid wearer may wish to pay attention to one of the conversations and not the others. Hearing aids that simply amplify all sound or that amplify all speech are inadequate in such a setting, as they are in other multi-speaker environments, because they fail to provide the user with the desired level of hearing focus.

The inventors have also recognized that conventional hearing aids do not perform well at reducing or excluding the wearer's own voice. As described above, some hearing aids amplify all received sounds, including the wearer's own speech. Such behavior can worsen the wearer's experience. People are used to hearing their own voice both traveling through the air into their ears and traveling through the bones of their head to their ears, with both signals arriving at very low latency. The bone conduction path typically has a different frequency characteristic than the air conduction path. When also played back through a hearing aid, an amplified version of the person's voice is typically at a delay of a few milliseconds and has the frequency characteristics of the air conduction path. Hearing aid wearers typically find the experience of hearing themselves more loudly, with an uncharacteristic sound, to be initially very unnatural. As a result, people can be dissuaded from wearing a hearing aid even when they have poor hearing.

The consequences of poor hearing aid performance are significant. Hearing is a fundamental sense which impacts how people experience their settings and interactions with others. Poor hearing aid experience leads to the hearing aid user withdrawing from those activities in which the hearing aid does not work well or avoiding such activities altogether. Withdrawing from these common and innately human multi-speaker environments can be detrimental to family connections and friendships, among other things, and can contribute to the further health and emotional decline of the individual hard of hearing.

Aspects of the present application provide hearing aids or other ear-worn devices that provide a wearer with a positive experience in multi-speaker environments by aiding the wearer in focusing on the speech of a desired subset of the speakers in the multi-speaker environment. For example, the speech of one or more target speakers may be selectively amplified. The speech of one or more non-target speakers may be reduced or eliminated. For instance, the ear-worn device wearer may not want to hear his or her own voice, and therefore may select for the ear-worn device to deemphasize his or her own speech. In at least some embodiments, the wearer can select the target speaker(s) or non-target speaker(s).

Aspects of the present application provide an intelligent ear-worn device that provides a true audio experience by selectively isolating speech from one or more target speakers in a multi-speaker environment without noticeable delay of the audio signal containing the speech. The ear-worn device may feature a temporal lobe on a chip executing a machine learning model that analyzes an incoming audio signal, identifies and isolates speech in the incoming audio signal attributable to the target speaker, and presents that speech to the wearer. The isolated speech is presented to the wearer within a time amounting to no more than an insignificant delay from the perspective of the wearer, as would not negatively impact natural conversation. Thus, the machine learning model operates to identify and isolate the speech within that time.

According to an aspect of the technology described herein, the input audio signal may be segmented into small samples (segments), which are processed sequentially. An audio segment may be provided to the machine learning model to generate isolated speech. While the isolated speech is further processed and played back to the wearer of the ear-worn device, the subsequent audio segment is being provided to and processed by the machine learning model. Thus, when the playback of the current audio segment is completed, the subsequent audio segment outputted by the machine learning model will be ready for further processing and playback. Such technology, combined with a choice of machine learning model, for example, a recurrent neural network, may facilitate the ear-worn device processing the speech signal with a machine learning model without introducing noticeable delay to the wearer's ears.

The inventors have recognized that voice signatures may be used by ear-worn devices to isolate the speech of one or more target speakers or non-target speakers. Individual speakers typically exhibit unique speech characteristics. The unique speech characteristics can be used to uniquely identify the respective speaker, and thus may serve as a voice signature. The voice signature may take various forms usable by a processor of an ear-worn device. The ear-worn device may process the voice signature in combination with an audio signal received by the ear-worn device to identify and isolate the component of the audio signal attributable to the speaker associated with the voice signature. The processing may be performed using a machine learning model executing on the ear-worn device.

According to an aspect of the technology described herein, an ear-worn device is configured to use a machine learning model that operates on a voice signature and an input audio signal containing speech from multiple speakers to isolate a component of the speech representing speech of a target speaker associated with the voice signature. The machine learning model receives the input audio signal as one input signal and a voice signature of the target speaker as a second input signal, and outputs the isolated speech component. The voice signature is a feature vector including frequency domain components. The voice signature may be used by the machine learning model to generate a complex ideal ratio mask that may be applied to the input audio signal to isolate the target speaker's speech from the input audio signal. After isolating the target speaker's speech, that speech may be preferentially treated (e.g., amplified) to produce an enhanced output audio signal for the ear-worn device.

According to an aspect of the technology described herein, the voice signatures used by the machine learning model of an ear-worn device may be provided by a separate electronic device that, together with the ear-worn device, forms an audio system. The separate electronic device may be a smartphone, tablet computer, personal digital assistant (PDA), or other device in communication with the ear-worn device. The separate electronic device may provide one or more voice signatures to the ear-worn device, for example in response to user selection. For example, the separate electronic device may contain a registry of voice signatures from which the user of the ear-worn device may select. The provided voice signature(s) may serve as an input to the machine learning model executed by the ear-worn device to isolate speech attributable to the speaker associated with the voice signature(s).

Thus, according to an aspect of the technology described herein, a registry of voice signatures is provided. The voice signature registry includes one or more voice signatures associated with known speakers, who are potential target speakers and non-target speakers for an ear-worn device wearer. One or more signatures may be selected from the registry for use in a machine learning model of an ear-worn device, to allow the ear-worn device to identify and isolate speech attributable to speakers associated with the selected voice signature(s). In some embodiments, the machine learning model may receive a subset of the voice signatures associated with the registry representing selected known speakers that are present in a given conversation.

The voice signature registry may be stored in various locations. In one embodiment, the voice signature(s) are stored on the external electronic device (e.g., the smartphone). In some embodiments, a user of the external electronic device may be the wearer of the ear-worn device. In a given conversation (e.g., in a multi-speaker environment), a user of the external electronic device may select the target speaker(s) on the external electronic device from among known speakers in the registry, e.g., from an option list (menu). Alternatively, and/or additionally, the external electronic device may automatically identify target speakers by determining whether the input audio signal in a conversation includes speech components of one or more known speakers in the registry. The user may then be presented with a menu of the identified target speakers from which to select. Once the target speaker(s) are identified and/or selected, the voice signature(s) associated with the target speaker(s) are sent to the ear-worn device. In one embodiment, the voice signature(s) are stored on the ear-worn device itself and can be called from memory. In such case, instead of transmitting the voice signature(s) of the target speaker(s) to the ear-worn device, the external electronic device may transmit identifier(s) of the target speaker(s) to the ear-worn device, which in turn can retrieve the stored voice signature(s) of target speaker(s) based on the identifiers.

The voice signatures associated with the registry of known speakers may be collected in various ways. In some embodiments, the voice signatures may be extracted from audio input using another machine learning model, e.g., a voice signature machine learning model implemented in a voice signature network separate from the machine learning model used by the ear-worn device to isolate speech from a received audio signal. A sample of speech from the target speaker may be provided as input to the voice signature network. The voice signature network may output a multi-dimensional feature vector representing the voice signature for that target speaker. The machine learning model used to extract voice signatures may operate on the separate electronic device (e.g., the smartphone) in some embodiments. In some other embodiments, the machine learning model used to extract voice signatures may operate on the ear-worn device.

The sample speech of the target speaker used by the voice signature network to extract the voice signature may be obtained in various manners. In some examples, input audio signal including the sample speech may be detected using the microphone of the external electronic device. In other examples, the input audio signal including the sample speech may be detected using the microphone of the ear-worn device, and the ear-worn device then transmits the input audio signal to the external electronic device. The input audio signal may be transmitted to the external electronic device wirelessly. In some embodiments, the target speaker may be provided a microphone and may read a predetermined script. Alternatively, the target speaker may provide a speech sample online. In a further alternative, the speech may be dynamically extracted from audio input to the ear-worn device wearer. For instance, while having a conversation with a given speaker, the ear-worn device may collect an audio sample and provide that sample to the voice signature network, which may extract the voice signature.

In some embodiments, multiple target speakers may be identified in a multi-speaker conversation. In the multi-speaker conversation, multiple target speakers may speak at different or overlapping times. In some embodiments, the ear-worn device is configurable to isolate the speech of multiple target speakers. The neural network may receive multiple voice signatures as input(s) and analyze the incoming audio signal using those voice signatures to isolate speech components from the input audio signal attributable to the multiple target speakers.

As should be appreciated from the foregoing, according to some embodiments of the technology described herein, an ear-worn device is configured to use a voice isolation machine learning model that operates on a voice signature to isolate a component of the speech representing speech of a target speaker associated with the voice signature. The voice signature may be obtained from a separate machine learning model, such as a voice signature machine learning model, configured to extract the voice signature from one or more reference audio clips representing speech of the target or non-target speaker. Such an embodiment may be advantageous for multiple reasons. As a non-limiting example, the voice signature machine learning model may be implemented on an electronic device different from the ear-worn device, thereby reducing the computational complexity of implementing multiple machine learning models on the ear-worn device, while retaining voice isolation capabilities.

According to an aspect of the technology, an ear-worn device is configured to use a voice isolation and classification machine learning model that operates on an input audio signal to both (a) de-noise the input audio signal and (b) determine an embedding of the input audio signal. The voice isolation and classification machine learning model may be used to determine an embedding representative of a target or non-target speaker, for example by supplying the voice isolation and classification machine learning model with a sample audio clip from the target or non-target speaker. Subsequently, the voice isolation and classification model may operate on input audio signals to de-noise the input audio signal and determine an embedding of the input audio signal, and the determined embedding may be compared to the embedding determined previously to correspond to the target or non-target speaker. The manner of processing the de-noised audio signal may depend on whether the two embeddings are found to match. For example, if the non-target speaker is the hearing aid wearer, then the de-noised audio signal may be attenuated when the two embeddings are determined to match, whereas the de-noised audio signal may be amplified if the two embeddings do not indicate a match.

As described above, according to an aspect of the present application, the ear-worn device may be configured to suppress the wearer's own voice. Using a voice signature of the wearer, the machine learning model may suppress such audio. The wearer of the ear-worn device may select such operation when he or she wishes to only hear the speech of his or her conversation partners.

The aspects and embodiments described above, as well as additional aspects and embodiments, are described further below. These aspects and/or embodiments may be used individually, all together, or in any combination of two or more, as the disclosure is not limited in this respect.

As described above, aspects of the technology described herein provide an ear-worn device that operates to isolate and individually treat the received speech of a target speaker or multiple target speakers from an audio input signal detected in a multi-speaker environment. FIG. 1 illustrates a multi-speaker environment and an audio system including an ear-worn device of the type described and a separate electronic device. The multi-speaker environment 100 includes ear-worn device wearer 102 and other individuals, including a target speaker 104 and two non-target speakers 106a and 106b. The ear-worn device wearer 102 has an ear-worn device 108 and a separate electronic device 110. The ear-worn device 108 and electronic device 110 in combination represent an audio system.

The illustrated setting of the multi-speaker environment 100 is one in which multiple individuals may speak simultaneously. In the illustrated example, the individuals are seated around a table. For instance, the illustrated individuals may be having a meeting, playing a game, or may be having a meal. Other scenarios are possible as well, as the specific setting is not limiting of the various aspects of the technology described herein. In this context, multiple of the illustrated individuals may be speaking at the same time. For example, the ear-worn device wearer 102 and the target speaker 104 may be having a conversation, and the non-target speakers 106a and 106b may be having a conversation. There may be other reasons that multiple of the illustrated individuals may be speaking simultaneously.

The ear-worn device wearer 102 is wearing an ear-worn device 108 which detects sound and outputs an audio signal to the ear-worn device wearer 102. For example, the ear-worn device wearer 102 may be hard of hearing, and the ear-worn device 108 may be a hearing aid. The ear-worn device 108 may be capable of detecting environment sound as well as the speech of the target speaker 104 and non-target speakers 106a and 106b. The ear-worn device wearer, however, may wish to listen to the target speaker 104, and not the non-target speakers 106a and 106b. The ear-worn device 108 may detect the speech of all the illustrated speakers, but output to the ear-worn device wearer 102 an audible output signal representing the speech of the target speaker 104, with the speech of non-target speakers 106a and 106b reduced or eliminated.

The ear-worn device 108 and the electronic device 110 may work in combination to allow the ear-worn device wearer 102 to listen to only the speech of target speaker 104. The electronic device 110 may store a registry of voice signatures. For example, the electronic device 110 may store voice signatures for each of the target speaker 104, non-target speaker 106a, and non-target speaker 106b. When the ear-worn device wearer 102 wants to listen to only target speaker 104, the ear-worn device wearer 102 may select the voice signature for target speaker 104 from the voice signature registry on electronic device 110. The electronic device 110 may provide the voice signature to the ear-worn device 108, which may use the provided voice signature to identify and isolate speech attributable to target speaker 104 from a detected audio signal containing speech components attributable to target speaker 104 and at least one of non-target speaker 106a or non-target speaker 106b.

Figure 2:
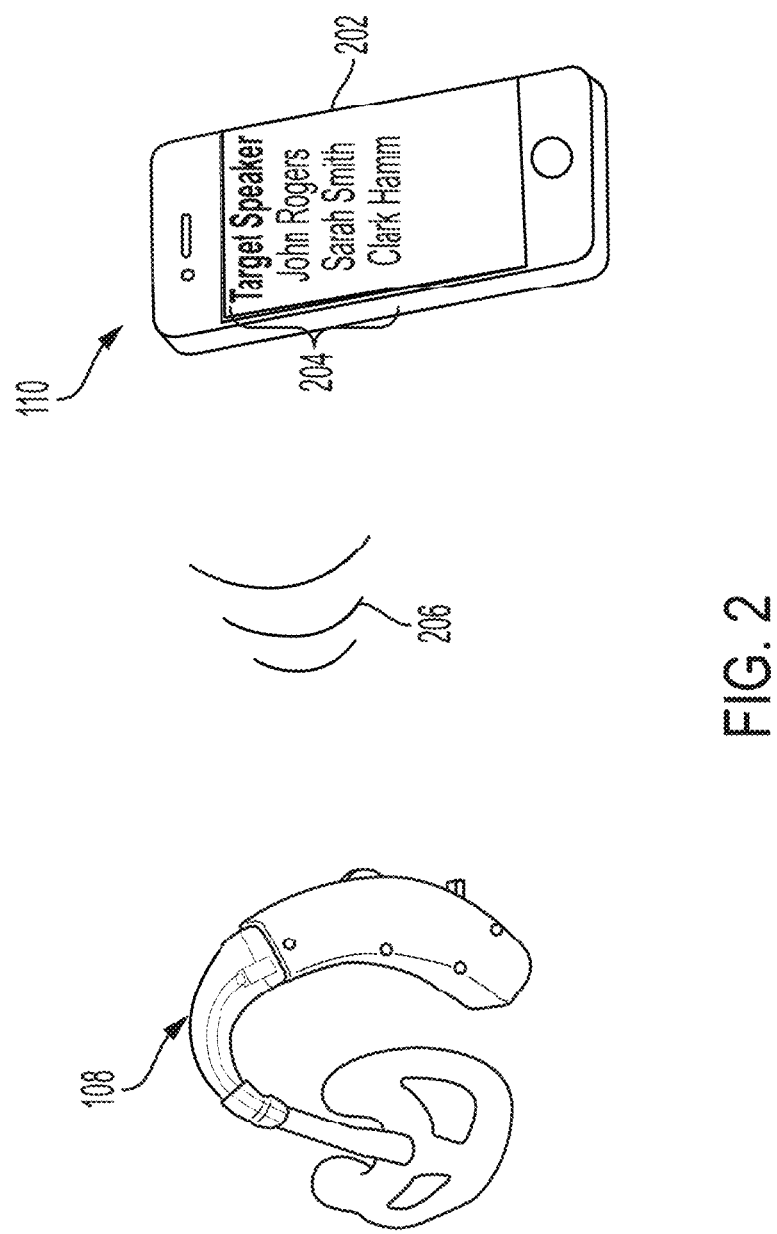
FIG. 2 illustrates communication between an ear-worn device and a separate electronic device, according to a non-limiting embodiment of the present application.

FIG. 2 illustrates an example implementation of the audio system illustrated in FIG. 1. As shown, the audio system 200 includes the ear-worn device 108 and the electronic device 110. In this example, the ear-worn device is a hearing aid and the electronic device 110 is a smartphone. The electronic device 110 includes a display screen 202 which can display entries 204 of a voice registry. The ear-worn device wearer can select the entry of interest to be the target speaker or a speaker the ear-worn device wearer would prefer to selectively not hear. The voice signature(s) corresponding to the selected speaker(s) can be sent to the ear-worn device 102 via a wireless communication link 206. The ear-worn device 108 may use the received voice signature from the electronic device to process audio signals detected from the microphone(s) of the ear-worn device to isolate speech attributable to the selected speaker(s). The isolated speech may be output to the ear-worn device wearer 102 through the speaker device(s) (e.g., receiver(s)) of the ear-worn device.

Figure 3:
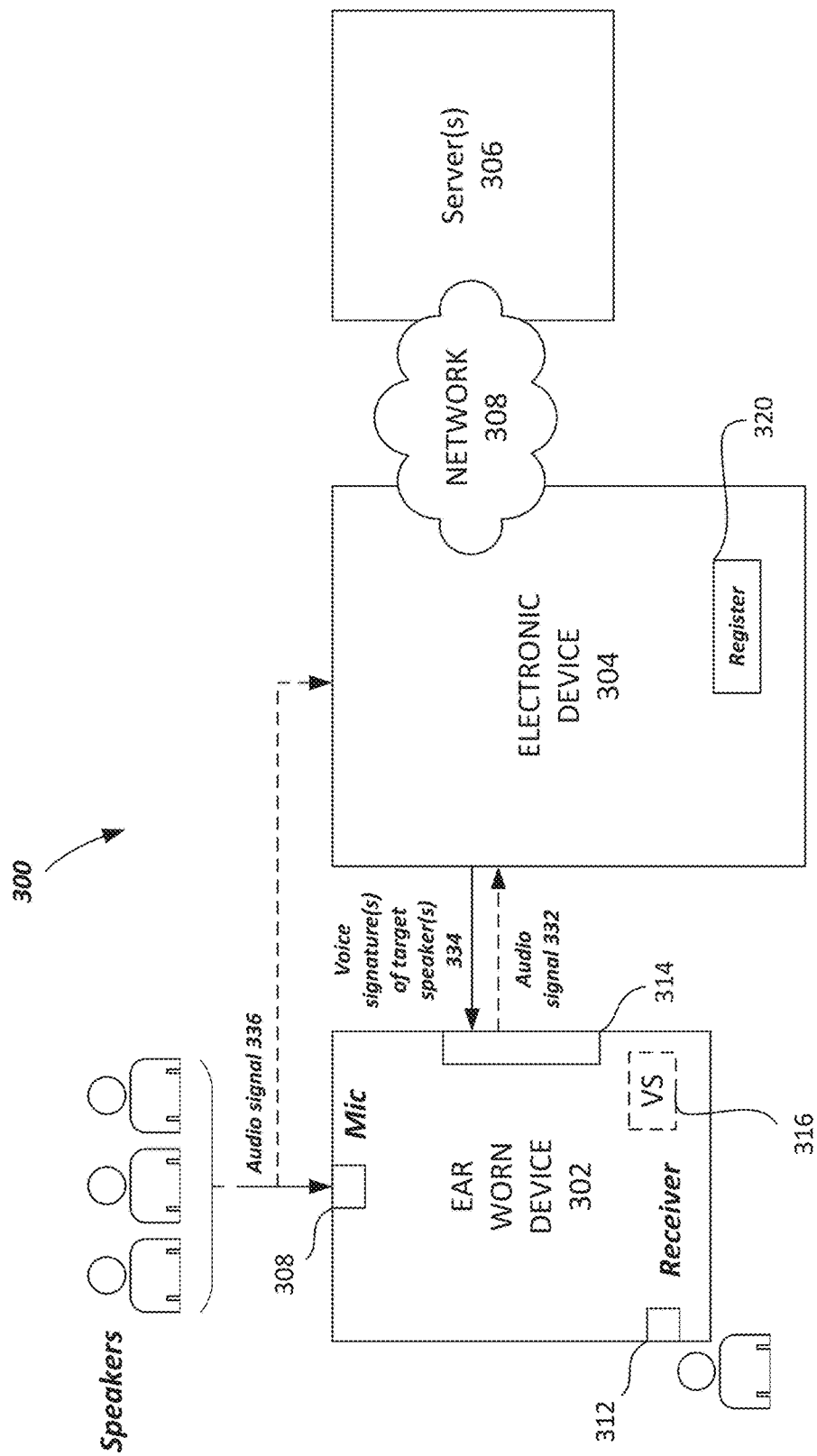
FIG. 3 illustrates a system with an ear-worn device and a portable electronic device for selectively enhancing speech from a target speaker, according to a non-limiting embodiment of the present application.

FIG. 3 illustrates a system with an ear-worn device and a portable electronic device for selectively enhancing speech from a target speaker, according to a non-limiting embodiment of the present application. Audio system 300 may be an example implementation of the system shown in FIGS. 1 and 2. For example, audio system 300 may include an ear-worn device 302 and electronic device 304. The ear-worn device 302 may be an example implementation of the ear-worn device 108 of FIGS. 1 and 2. Ear-worn device 302 as described in FIG. 3 may have various forms. For example, the ear-worn device may be a hearing aid or a headphone, or any suitable wearable audio device. Additionally, ear-worn device 302 may include a communication port 314 configured to communicate (e.g., wired or wirelessly) with an external device and exchange data with the external device, such as electronic device 304. Electronic device 304 may be an example implementation of the electronic device 110 of FIGS. 1 and 2. For example, electronic device 304 may be a smart phone, or any suitable portable electronic device associated with the wearer of the ear-worn device.

In some non-limiting examples, ear-worn device 302 may include a microphone 308 and a speaker device (e.g., a receiver) 312. Microphone 308 may be configured to detect audio signal 336 from sound (e.g., speech). For example, the audio signal may include temporally overlapping speech components from multiple speakers. Ear-worn device 302 may be capable of processing the audio signal 336 detected by the microphone 308 to isolate a component of the audio signal representing the target speaker's speech from among the temporally overlapping speech components from multiple speakers. In some embodiments, ear-worn device 302 may be configured to process the audio signal 336 with a voice isolation network using a voice signature of the target speaker. In some examples, the voice signature of a speaker may be a multi-dimensional feature vector. The voice signature may contain data in frequency-domain, time-domain, or any suitable data that may be representative of different speakers. Receiver 312 may include an audio output device configured to playback the output from the voice isolation network to the ear-worn device wearer, such as a speaker device.

Voice signature of a speaker may be a unique digital representation of a speaker, where voice signatures of different speakers are distinctive. In some embodiments, the system may use a trained voice signature network to extract the voice signature of a speaker from an audio signal containing speech of the speaker. When the voice signature network is properly trained, the voice signatures for different speakers (i.e., speaker embeddings) extracted using the voice signature network may be distinctive and the voice signatures extracted from different audio signal including speech of the same speaker may be the same. Using the voice signature that is unique to a selected target speaker, the voice isolation network may isolate the speech components from an audio signal, where the isolated speech component is attributable to the selected target speaker. In some embodiments, each of the voice signature network and the voice isolation network may include a different machine learning model. For example, the voice signature network may include a voice signature machine learning model configured to receive an audio signal as input and output voice signature of the speaker whose speech is included in the audio signal. The voice isolation network may include a voice isolation machine learning model configured to receive two inputs, an audio signal including a target speaker (s) and a voice signature(s) of the target speaker(s), and output isolated speech of the target speaker(s). Details of the voice isolation network will be further described in with reference to FIGS. 6-8. Details of the voice signature network will be further described with reference to FIGS. 12 and 13.

With continued reference to FIG. 3, in some embodiments, ear-worn device 302 may store the voice signatures of target speakers locally, such as in a memory 316 containing the voice signatures of one or more speakers. In some embodiments, ear-worn device 302 may receive the voice signature(s) of target speaker(s) from an external device, such as electronic device 304. For example, ear-worn device 302 may be configured to communicate wirelessly with electronic device 304 in a multi-speaker environment, e.g., a multi-speaker conversation as shown in FIG. 1. Ear-worn device 302 may be configured to transmit a segment of an audio signal 332 detected from the microphone of the ear-worn device to electronic device 304. Alternatively, a microphone of the electronic device 304 may be configured to detect the audio signal 336 from the conversation. The segment of the audio signal may be of a length, e.g., a few seconds to a few minutes, and includes speeches from multiple speakers in the multi-speaker conversation, e.g., at the beginning of the conversation.

Electronic device 304 may be configured to process the audio signal 336 detected by the microphone of the ear-worn device (or the electronic device itself) to identify one or more speakers in the conversation. In some embodiments, in identifying the one or more speakers in the conversation, electronic device 304 may be configured to execute a voice signature network described above. The voice signature network may be configured to extract one or more voice signatures as output from input audio signal containing speech component(s) of one or more target speakers. Electronic device 304 may be configured to further identify one or more speakers in the conversation based on the extracted voice signature(s), against known speakers. In some embodiments, electronic device 304 may include a registry 320 of known speakers stored in a memory of the electronic device. Electronic device 304 may also include voice signatures associated with known speakers pre-stored in the memory.

In some embodiments, electronic device 304 may identify one or more speakers in the conversation by matching the extracted voice signature(s) to the voice signatures of known speakers in the registry 320. Electronic device 304 may automatically select target speaker(s) from the registry of known speakers whose signatures are matched to the extracted voice signature, assuming the target speakers are known speakers (of the wearer of the ear-worn device) that are speaking in the conversation. Additionally, and/or alternatively, electronic device 304 may receive user selection(s) identifying the target speakers from the identified speakers. For example, the user may select a subset of the previously identified speakers being matched and whom the wearer of the ear-worn device prefers to listen. In some embodiments, without executing the voice signature network, the electronic device 304 may display a list of known speakers in the registry and receives a user selection indicating a selection of one or more known speakers in the register whom the wearer of the ear-worn device knows is/are present in the conversation and prefers to listen to. In some other embodiments, if an extracted voice signature does not match to any voice signatures associated with the registry of known speakers, electronic device 304 may add a new speaker to the registry. The user may select that speaker as the target speaker, and along with additional other target speakers.

Subsequently, electronic device 304 may transmit the voice signature(s) of the selected target speaker(s) 334 to the ear-worn device 302. In some examples, electronic device 304 may transmit the voice signature(s) of the selected target speaker(s) 334 to the ear-worn device 302. Alternatively, as described above, the ear-worn device 302 may store the voice signatures of multiple speakers. In such case, electronic device 304 may transmit identifier(s) of the selected target speaker(s) to ear-worn device 302, which in turn can retrieve the stored voice signature(s) of target speaker(s) based on the identifiers.

In some examples, electronic device 304 may also communicate (wired or wirelessly) with one or more servers 306, via a communication network, to cause the server(s) 306 to perform some of the operations described above. In a non-limiting example, electronic device 304 may communicate with server 306 to cause server 306 to perform extraction of the voice signature. In such case, the electronic device 304 may provide input audio signal of a conversation to the server 306. Server 306 may include a voice signature network, which may be triggered by the electronic device to extract voice signature(s) from the input audio signal.

Figure 4A:
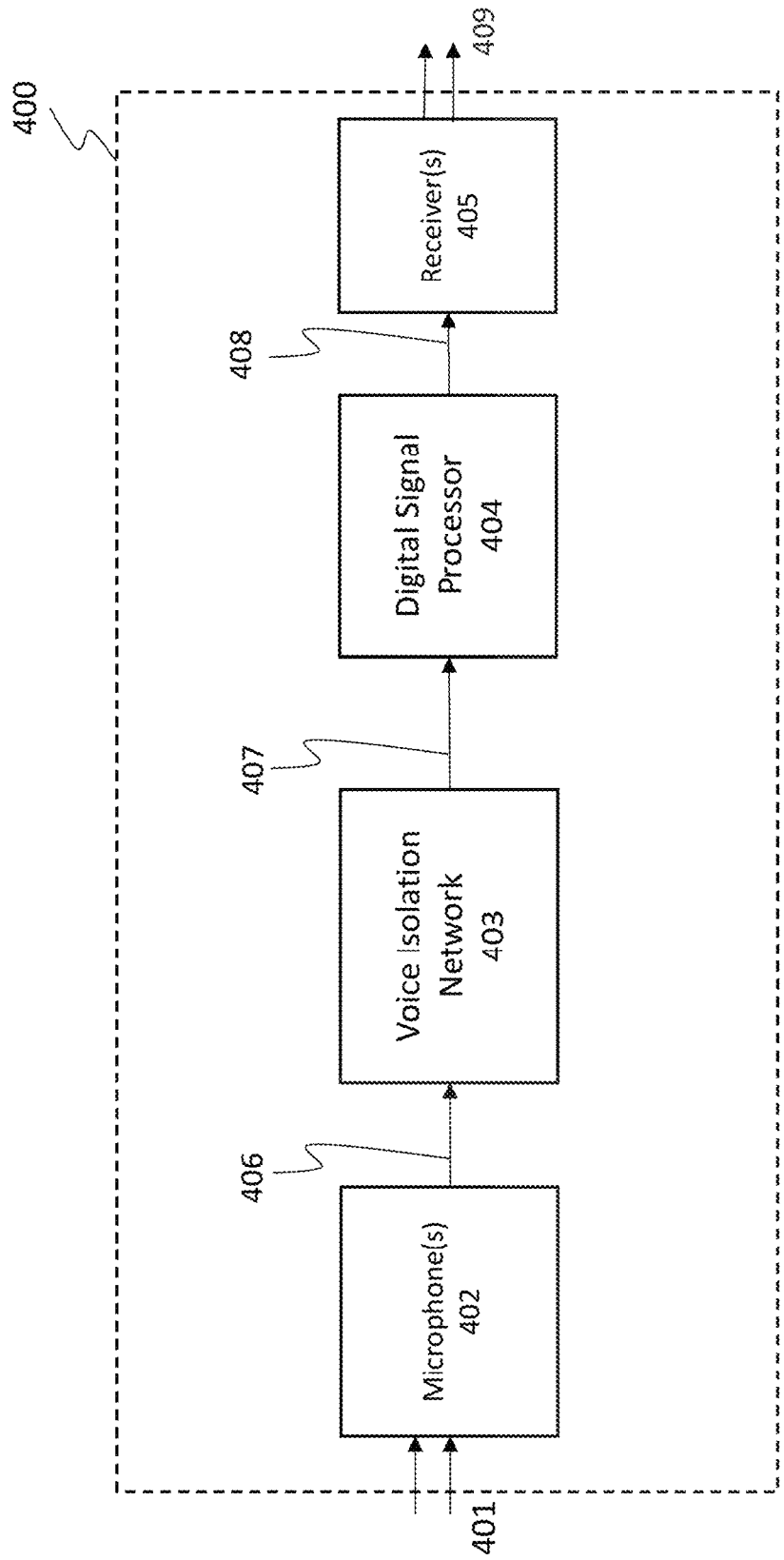
FIG. 4A illustrates example components of an ear-worn device that may be configured to enhance speech of a target speaker in a multi-speaker environment, according to a non-limiting embodiment of the present application.

FIG. 4A illustrates example components of an ear-worn device that may be configured to enhance speech of a target speaker in a multi-speaker environment, according to a non-limiting embodiment of the present application. In some embodiments, ear-worn device 400 may be an implementation of at least a portion of the ear-worn device 108 of FIGS. 1 and 2 and 300 of FIG. 3. Ear-worn device 400 may include one or more microphones 402, one or more receivers 405, and a voice isolation network 403 coupled in between the microphone(s) 402 and the receiver(s) 405. In some embodiments, microphone(s) 402 may be configured to detect audio signal. The audio signal may be generated by the microphone(s) from sound 401, e.g., speech in a conversation. In a multi-speaker conversation, the audio signal detected by the microphone(s) may include speech components attributable to multiple speakers. In some embodiments, the audio signal detected by the microphone(s) may be analog signal. The ear-worn device 400 may additionally include an analog-to-digital converter (ADC, not shown) to convert the analog signal to digital signal 406 as input to the voice isolation network 403. In some embodiments, the microphone(s) 402 may be capable of producing digital audio signals. In such case, the audio signal detected by the microphone(s) may be digital signal 406, which can be directly provided to the voice isolation network 403.

With further reference to FIG. 4A, voice isolation network 403 may receive the digital audio signal 406 and process the digital audio signal 406 to output isolated speech 407. Receiver(s) 405 may be configured to output the isolated speech 407 for playback to the wearer of the ear-worn device. For example, the receiver(s) 405 may receive the digital signal 407 from the voice isolation network and convert the digital signal 407 to analog signal before producing the output signal 409. The receiver 405 may be a speaker device (e.g., loudspeaker) in some embodiments. In other examples, the ear-worn device may additionally include a digital-to-analog converter (DAC, not shown) to convert the digital signal 407 to analog signal as input to the receiver(s) 405 for providing the output signal 409.

In some embodiments, ear-worn device 400 may include a digital signal processor (DSP, 404) coupled between the voice isolation network 403 and the receiver(s) 405. The DSP 404 may be configured to process the isolated speech from the voice isolation network 403 and generate an enhanced output 408. For example, DSP 404 may include a frequency-based amplification. In some embodiments, the isolated speech output from the voice isolation network may include preferentially processed (e.g., amplified or suppressed) speech components attributable to target/non-target speakers. For example, the output from the voice isolation network may include speech with increased signal-to-noise ratio (SNR) for the target speaker's speech, or the volume of one or more target speaker(s) at a desirable level selected by the user (e.g., the wearer of the ear-worn device). The details of preferentially treating the speech attributable to target/non-target speakers will be further described in embodiments of a voice isolation network with reference to FIGS. 6A-6B.

Figure 4B:
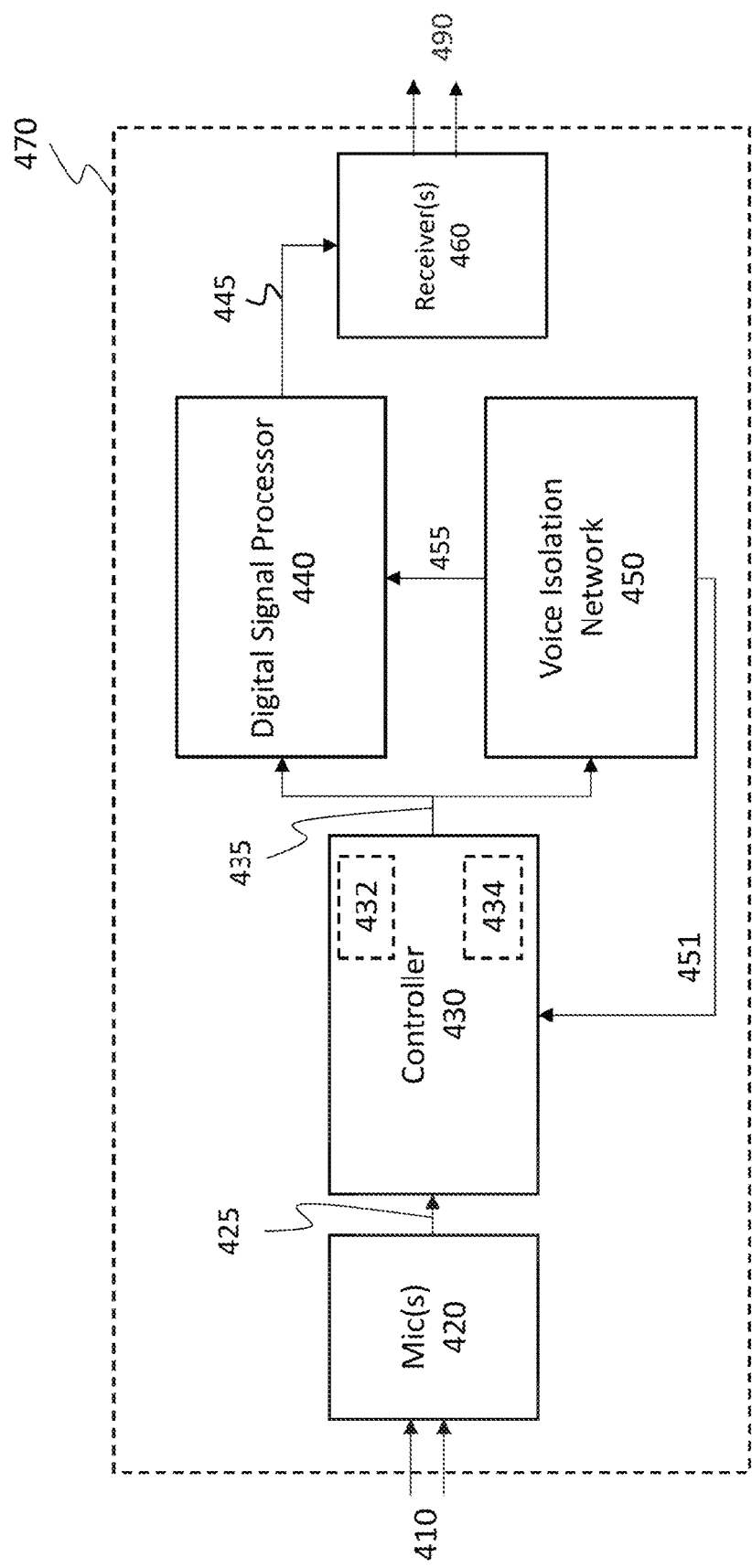
FIG. 4B illustrates example components of a variation of the ear-worn device in FIG. 4A that may be configured to enhance speech of a target speaker in a multi-speaker environment, according to a non-limiting embodiment of the present application.

FIG. 4B illustrates example components of a variation of the ear-worn device in FIG. 4A that may be configured to enhance speech of a target speaker in a multi-speaker environment, according to a non-limiting embodiment of the present application. In some embodiments, ear-worn device 470 may be an implementation of at least a portion of the ear-worn device 108 of FIGS. 1 and 2 and 300 of FIG. 3. Ear-worn device 470 may have microphone(s) 420 to receive one or more audio input signal 410 and receiver(s) 460, similar to microphone(s) 402 and receiver(s) 405, respectively, described in FIG. 4A. The receivers 460 may process the output signal 445 and output an output signal 490. The receivers 405 and 460 may be considered an output module or output block in some embodiments. Ear-worn device 470 may also include voice isolation network 450 similar to voice isolation network 403 of FIG. 4A, and digital signal processor (DSP, 440) similar to DSP 404 of FIG. 4A. Additionally, ear-worn device 470 may include controller 430 configured to control both the voice isolation network 450 and DSP 440.

Controller 430 receives digital audio signal 425. Controller 430 may comprise one or more processor circuitries (herein, processors), memory circuitries and other electronic and software components configured to, among others, (a) perform digital signal processing manipulations necessary to prepare the signal for processing by the voice isolation network 450 or the DSP 440, and (b) to determine the next step in the processing chain from among several options. In one embodiment of the disclosure, controller 430 executes a decision logic to determine whether to advance signal processing through one or both of DSP 440 and voice isolation network 450. For example, DSP 440 may be activated at all times, whereas controller 430 executes decision logic to determine whether to activate the voice isolation network 450 or bypass the voice isolation network by deactivating the voice isolation network 450. In some embodiments, DSP 455 may be configured to apply a set of filters to the incoming audio components. Each filter may isolate incoming signals in a desired frequency range and apply a non-linear, time-varying gain to each filtered signal. The gain value may be set to achieve dynamic range compression or may identify stationary background noise. DSP 440 may then recombine the filtered and gained signals to provide an output signal 445.

The controller 430 may include storage circuitry 432 to store data, such as data representing voices that, when detected, may serve as an input to the controller's logic. For example, the storage circuitry 432 may include a speaker registry of the types described herein, in those embodiments in which the voice registry is stored on the ear-worn device.

As stated, in one embodiment, the controller performs digital signal processing operations to prepare the signal for processing by one or both of DSP 440 and voice isolation network 450. Voice isolation network 450 and DSP 440 may accept as input the signal in the time-frequency domain (e.g., signal 425), so that controller 430 may take a Short-Time Fourier Transform (STFT) of the incoming signal before passing it onto either voice isolation network 450 or DSP 440. In another example, controller 430 may perform beamforming of signals received at different microphones to enhance the audio signals coming from certain directions.

In certain embodiments, controller 430 continually determines the next step in the signal chain for processing the received audio data. For example, controller 430 activates voice isolation network 450 based on one or more of user-controlled criteria, user-agnostic criteria, user clinical criteria, accelerometer data, location information, stored data and the computed metrics characterizing the acoustic environment, such as SNR. For example, in response to a determination that the speech is continual, or that the SNR of the input audio signal is above a threshold ratio, controller 430 may activate the voice isolation network. Otherwise, controller 430 may deactivate the voice isolation network 450, leaving the DSP 440 activated. This results in a power saving of the ear-worn device when the voice isolation network is not needed. If voice isolation network 450 is not activated, controller 430 instead passes signal 435 directly to DSP 440. In some embodiments, controller 430 may pass data to both voice isolation network 450 and DSP 440 simultaneously as indicated by arrows from controller 430 to DSP 440 and to voice isolation network 450.

In some embodiments, user-controlled criteria may represent one or more logics (e.g., hardware- or software-implemented). In some examples, user-controlled criteria may comprise user inputs including the selection of an operating mode through an application on a user's smartphone or input on the ear-worn device (for example by the wearer of the ear-worn device tapping the device). For example, when a user is at a restaurant, she may change the operating mode to noise cancellation/speech isolation by making an appropriate selection on her smartphone. Additionally, and/or alternatively, user-controlled criteria may comprise a set of user-defined settings and preferences which may be either input by the user through an application (app) or learned by the device over time. For example, user-controlled criteria may comprise a user's preferences around what sounds the wearer of the ear-worn device hears (e.g., new parents may want to always amplify a baby's cry, or a dog owner may want to always amplify barking) or the user's general tolerance for background noise. Additionally, and/or alternatively, user clinical criteria may comprise a clinically relevant hearing profile, including, for example, the user's general degree of hearing loss and the user's ability to comprehend speech in the presence of noise.

User-controlled logic may also be used in connection with or aside from user-agnostic criteria (or logic). User-agnostic logic may consider variables that are independent of the user. For example, the user-agnostic logic may consider the hearing aid's available power level, the time of day or the expected duration of the voice isolation network operation (as a function of the anticipated voice isolation network execution demands).

In some embodiments, acceleration data as captured on sensors in the device may be used by controller 430 in determining whether to direct signal controller output signal 435 to one or both of DSP 440 and voice isolation network 450. Movement or acceleration information may be used by controller 430 to determine whether the user is in motion or sedentary. Acceleration data may be used in conjunction with other information or may be overwritten by other data. Similarly, data from sensors capturing acceleration may be provided to the voice isolation network as information for inference.

In other embodiments, the user's location may be used by controller 430 to determine whether to engage one or both of DSP 440 and voice isolation network 450. Certain locations may require activation of voice isolation network 450. For example, if the user's location indicates high ambient noise (e.g., the user is strolling through a park or is attending a concert) and no direct conversation, controller 430 may activate DSP 440 only and deactivate voice isolation network 450. On the other hand, if the user's location suggests that the user is traveling (e.g., via car or train) and other indicators suggest human communication, then controller 430 may activate voice isolation network 450 to enhance the audio signal by amplifying human voices over the surrounding noise.

In some embodiments, controller 430 may execute an algorithmic logic to select a processing path. For example, controller 430 may detect SNR of input audio signal 425 and determine whether one or both of DSP 440 and voice isolation network 450 should be engaged. In one implementation, controller 430 compares the detected SNR value with a threshold value and determines which processing path to initiate. The threshold value may be one or more of empirically determined, user-agnostic or user-controlled. Controller 430 may also consider other user preferences and parameters in determining the threshold value as discussed above.

In another embodiment, controller 430 may compute certain metrics to characterize the incoming audio as input for determining a subsequent processing path. These metrics may be computed based on the received audio signal. For example, controller 430 may detect periods of silence, knowing that silence does not require the voice isolation network to enhance and it should therefore deactivate the voice isolation network. In another example, controller 430 may include a Voice Activity Detector (VAD) 434 to determine the processing path in a speech-isolation mode. In some embodiments, the VAD may be a compact (e.g., much less computationally intensive) neural network in the controller.

In an exemplary embodiment, controller 430 may receive the output of voice isolation network 450 for recently processed audio, as indicated by arrow from voice isolation network 450 to controller 430, as input to controller 430. Voice isolation network 450, which may be configured to isolate target audio in the presence of background noise, provides the inputs necessary to robustly estimate the SNR. Controller 430 may in turn use the output of the voice isolation network 450 to detect when the SNR of the incoming signal is high enough or too low to influence the processing path. In still another example, the output of voice isolation network 450 may be used to improve the robustness of VAD 434. Voice detection in the presence of noise is computationally intensive. By leveraging the output of voice isolation network 450, ear-worn device 470 can implement this task with minimal computation overhead when the noise is suppressed based on isolated speech from the voice isolation network.

When controller 430 utilizes voice isolation network output 451, it can only utilize the output to influence the signal path for subsequently received audio signal. When a given sample of audio signal is received at the controller, the output of voice isolation network 450 for that sample will be computed with a delay, where the output of the voice isolation network, if computed before the next sample arrives, will influence the controller decision for the next sample. When the time interval of the sample is small enough, e.g., a few milliseconds or less than a second, such delay will not be noticeable by the wearer.

When voice isolation network 450 is activated, using the output 451 of the voice isolation network 450 in the controller does not incur any additional computational cost. In certain embodiments, controller 430 may engage voice isolation network 450 for supportive computation even in a mode when voice isolation network 450 is not the selected signal path. In such a mode, incoming audio signal is passed directly from controller 430 to DSP 440 but data (i.e., audio clips) is additionally passed at less frequent intervals to voice isolation network 450 for computation. This computation may provide an estimate of the SNR of the surrounding environment or detect speech in the presence of noise in substantially real time. In an exemplary implementation, controller 430 may send a 16 ms window of data once every second for VAD 134 detection at voice isolation network 150. In some embodiments, voice isolation network 450 may be used for VAD 434 instead of controller 430. In another implementation, controller 430 may dynamically adjust the duration of the audio clip or the frequency of communicating the audio clip as a function of the estimated probability of useful computation. For example, if the audio signal (e.g., 425) exhibits a highly variable SNR, controller 430 may request additional voice isolation network computation at more frequent intervals.

With reference to FIGS. 4A and 4B, ear-worn devices 400 and 470 may each include a single ear-piece having a microphone. In other examples, ear-worn devices 400 and 470 may each be binaural and include two ear-pieces, each ear-piece having a respective microphone. Similarly, ear-worn devices 400 and 470 may each include one or more receivers respectively included in one or two ear-pieces.

Figure 5A:
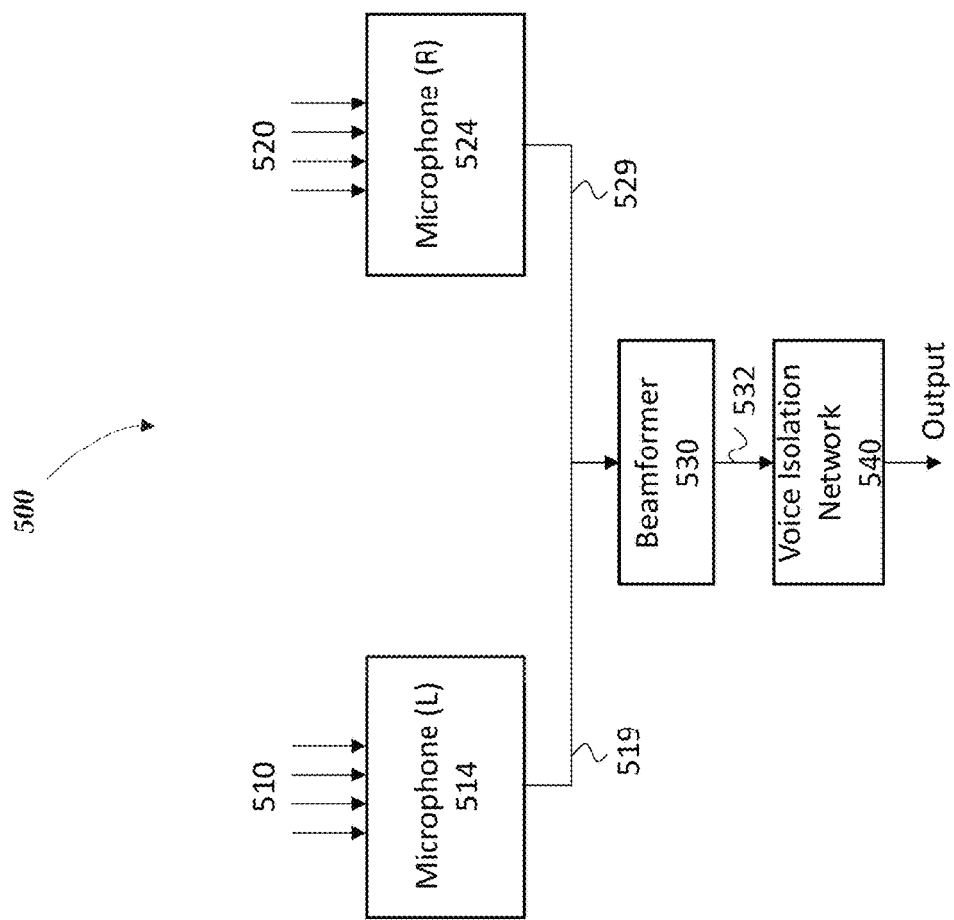
FIGS. 5A-5B illustrate example components of an ear-worn device having two microphones, according to a non-limiting embodiment of the present application.
Figure 5B:
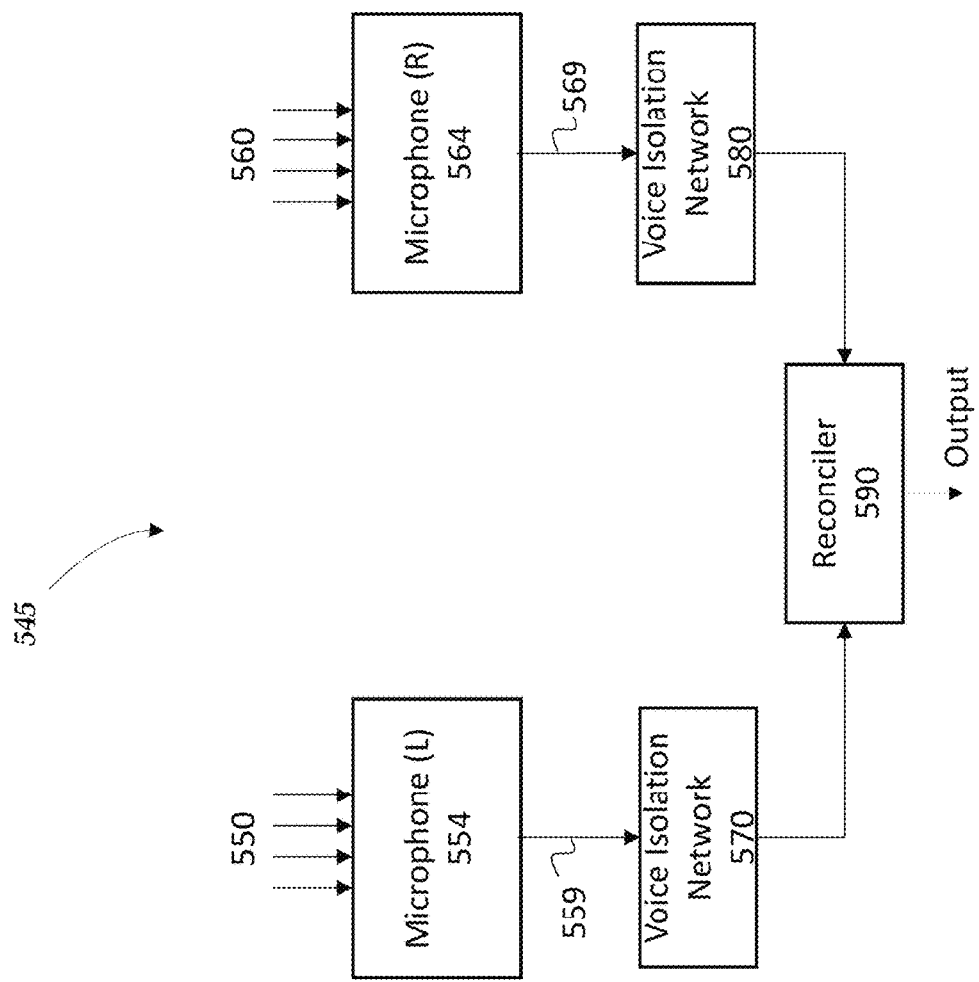

FIGS. 5A-5B illustrate variations of example components of an ear-worn device having two microphones, according to a non-limiting embodiment of the present application. FIGS. 5A and 5B each includes a portion of a circuitry 500, 545 in an example ear-worn device, respectively. In some embodiments, the portions of circuitry 500, 545 may be implemented in ear-worn device 108 (in FIGS. 1 and 2), 302 (in FIG. 3), 400 (in FIG. 4A) and 470 (in FIG. 4B), where the ear-worn device is binaural. In FIG. 5A, circuitry 500 may include a beamformer 530 configured to process audio signal 519, 529 respectively detected from microphones 514 and 524 (e.g., left and right microphones respectively residing in one of two ear-pieces of the ear-worn device and configured to receive input audio signals 510 and 520, respectively). In some embodiments, beamformer 530 may be implemented in controller 430 of FIG. 4B. Beamformer 530 may generate an enhanced audio signal 532 that accounts for sounds from different directions as detected by microphones 514 and 524. As described above, the audio signals 519, 529 respectively detected by the microphones 514 and 524 may be digital signals. The output from the beamformer 530 may be digital signal as well. As shown in FIG. 5A, the enhanced audio signal 532 may be provided to the voice isolation network 540 in the ear-worn device. The voice isolation network 540 may be similar to the voice isolation network described above, e.g., 403 in FIG. 4A and 450 in FIG. 4B. The output of the voice isolation network may be provided to the receivers of two ear-pieces.

In some embodiments, each ear-piece may be configured to communicate with the other ear-piece and exchange audio signal with the other ear-piece. For example, beamformer 530 may be residing in a first ear-piece of an ear-worn device. The audio signal detected by the microphone of the other ear-piece may be transferred from the other ear-piece to the ear-piece in which the beamformer 530 is residing. The output of the voice isolation network 540, or the output of the DSP (e.g., 404 in FIG. 4A, 440 in FIG. 4B) may be transferred back to the other ear-piece. It is appreciated that the two ear-pieces may be configured to communicate using any suitable protocol, such as near-field magnetic induction (NFMI) protocol, which allows for fast data exchange over short distances. Further, beamformer 530 may be optional, where a binaural audio stream may be detected from microphones 514 and 524, and provided to the virtual isolation network 540 without using a beamformer.

With reference to FIG. 5B, the circuitry 545 may include several components similar to those described in connection with FIG. 5A. Microphone 554 is the same as microphone 514 in some embodiments. Microphone 564 is the same as microphone 524 in some embodiments. Microphone 554 receives input audio signal 550 and microphone 564 receives input audio signal 560. Microphone 554 outputs audio signal 559, while microphone 564 outputs audio signal 569.

The circuitry 545 may include two separate voice isolation networks 570 and 580 each residing in a respective ear-piece of the ear-worn device. In such case, each ear-piece of the ear-worn device may include an independent configuration such as configurations described in 400 of FIG. 4A) or 470 of FIG. 4B. The circuitry 545 may further include a reconciler 590 configured to receive the output of the voice isolation network or the output of the DSP (e.g., 404 of FIG. 4B or 440 of FIG. 4B) from the two ear-pieces. The reconciler 590 may be configured to reconcile the outputs from the two ear-pieces and provide reconciled signals to the two ear-pieces for playback. As described above, the two ear-pieces may be configured to communicate with each other. In some embodiments, the output of the voice isolation network or the DSP of each one ear-piece may be transferred to the other ear-piece for reconciliation by the reconciler 590, and the reconciled audio signal may be transferred back from the other ear-piece. In some other embodiments, each of the two ear-pieces may combine the output of the voice isolation network from the other ear-piece with the output of its own voice isolation network into a combined output and provide the combined output for further audio processing. For example, the output of the voice isolation network in one ear-piece (e.g., a complex ratio mask) may be transmitted to the other ear-piece. The other ear-piece may combine the received output with the output of its own voice isolation network (e.g., taking the average of two complex ratio masks) for further audio processing (e.g., DSP).

Figure 6A:
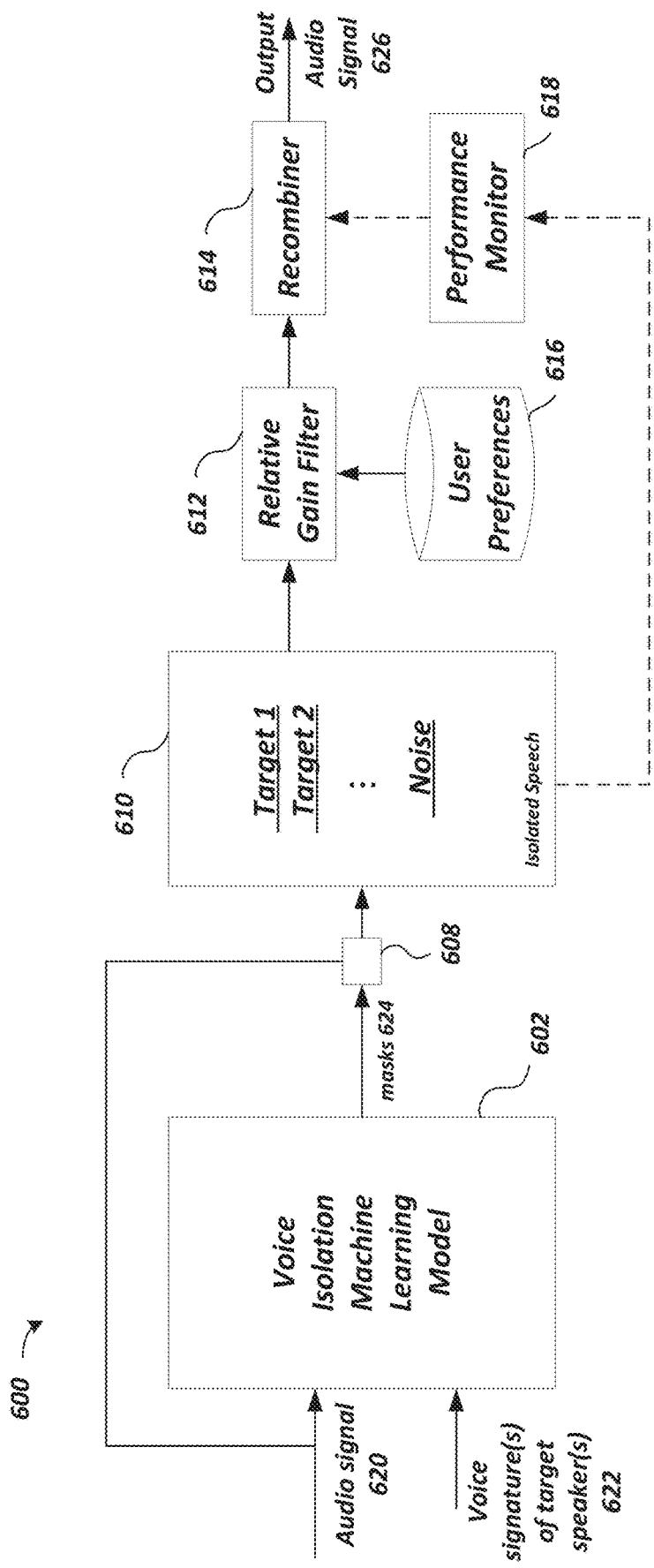
FIGS. 6A and 6B illustrate an example configuration of a voice isolation network, according to a non-limiting embodiment of the present application.
Figure 6B:
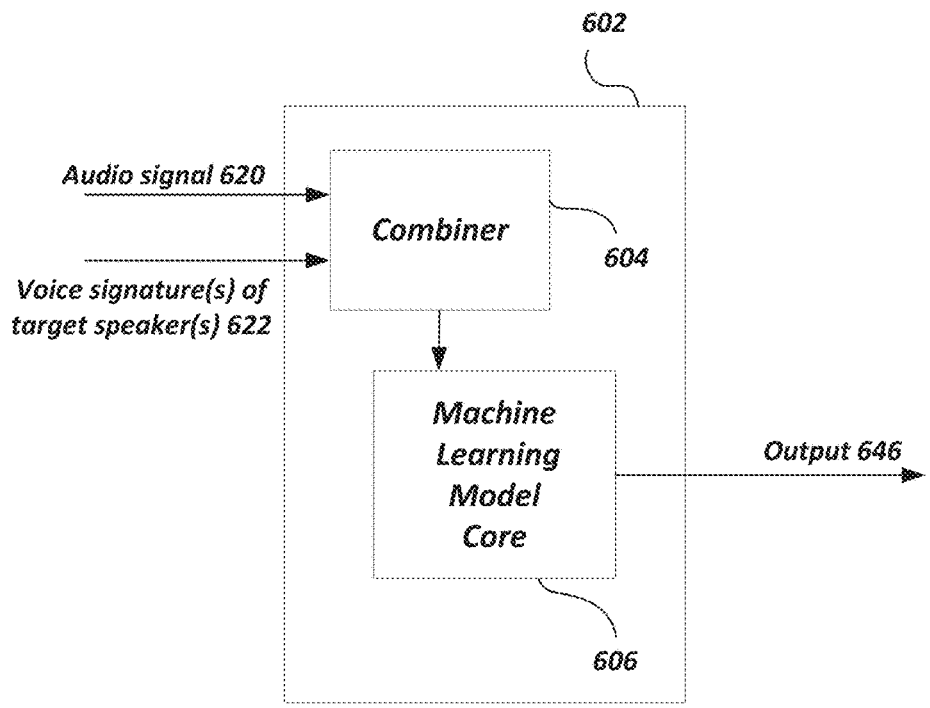

FIGS. 6A and 6B illustrate an example configuration of a voice isolation network, according to a non-limiting embodiment of the present application. Voice isolation network 600 may be implemented as voice isolation network 403 (in FIG. 4A), 450 (in FIG. 4B), 540 (in FIG. 5A) and 570, 580 (in FIG. 5B), in some examples, and may be implemented in ear-worn device 108 (in FIGS. 1 and 2), 302 (in FIG. 3), 400 (in FIG. 4A), and 470 (in FIG. 4B). Voice isolation network 600 may include a voice isolation machine learning (ML) model 602, which may be configured to receive two inputs: audio signal 620 and voice signature(s) of target speaker(s) 622. The audio signal provided as input to the voice isolation machine learning model may be audio signal detected from microphone(s) of an ear-worn device. The voice signature(s) of target speaker(s) may be obtained from an external electronic device associated with the wearer of the ear-worn device. The operations of the external electronic device that may be performed to provide voice signatures of selected target speaker(s) for the wearer of the ear-worn device will be further described in detail with reference to FIGS. 10-13.

The voice isolation network 600 may additionally include one or more components (e.g., relative gain filter 612, recombiner 614) to process the isolated speech from the voice isolation machine learning model 602 and preferentially treat (e.g., amplify or suppress) speech attributable to target/non-target speakers to produce an enhanced output audio signal 626. The output audio signal 626 may be provided to a DSP (e.g., see FIGS. 4A and 4B) for outputting to the receiver(s) of the ear-worn device.

Returning to FIG. 6A, the input audio signal provided to the voice isolation machine learning model 602 may include speeches of multiple speakers (including target and non-target speakers) in a conversation. The audio signal may also include other signals, such as background noise. The voice signature(s) may include data (e.g., feature vectors) representative of selected target speakers in the multi-speaker conversation. In some examples, each voice signature feature vector (e.g., in frequency domain) may be a 256-dimensional embedding. Other suitable dimensions may also be possible. With reference to FIG. 6B, voice isolation machine learning model 602 may include a combiner 604 and a machine learning model core 606 configured to generate output 646. For example, output 646 may include masks 624. The combiner 604 may be configured to combine the input audio signal 620 and the voice signatures 622 into a signal stream to be provided to the machine learning model core 606.

Figure 6C:
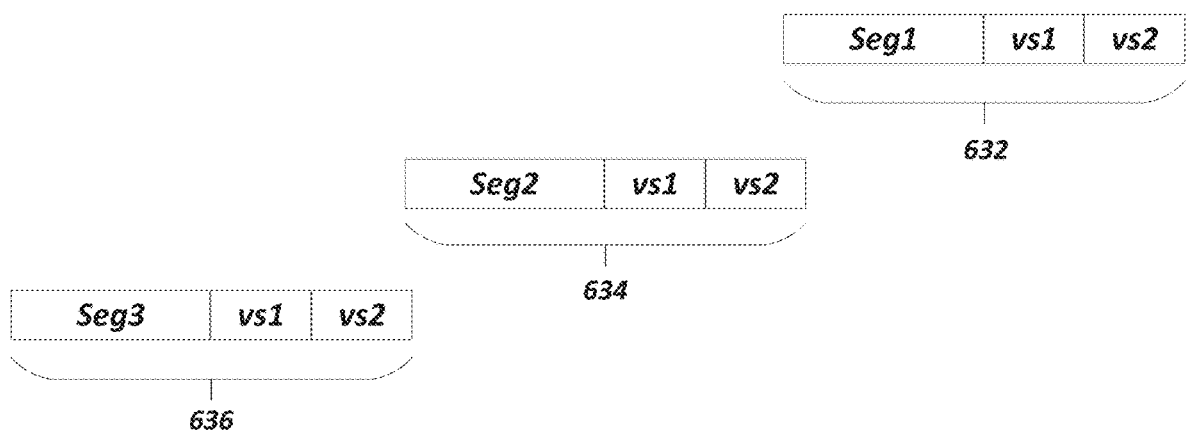
FIG. 6C illustrate an example signal stream that may be concatenated from an audio signal and voice signature(s) of target speaker(s), according to a non-limiting embodiment of the present application.

FIG. 6C illustrates an example signal stream that may be concatenated from an audio signal and voice signature(s) of target speaker(s) in the combiner 604, according to a non-limiting embodiment of the present application. As shown in FIG. 6C, a plurality of sequential segments may be formed as inputs to the machine learning core 606, each including a vector representing a respective audio segment from the input audio signal appended by the voice signature(s) of one or more target speakers. A vector representing an audio segment from an input audio signal may be the output of a STFT as previously described. For example, the system may convert the audio segment into time-frequency domain vector by taking an STFT of the signal as previously described. As described above, a voice signature may also be a vector, e.g., a multi-dimensional feature vector. The STFT operation may be performed inside the voice isolation network 602 (e.g., inside combiner 604, or inside another component in the voice isolation network, now shown), or outside the voice isolation network 602. In the latter case, a component in the ear-worn device may convert the audio signal detected by the microphone(s) into vectors representing audio segments in the audio signal and provide the vectors (instead of audio signal) to the voice isolation network 602. As shown in FIG. 6C, the audio segment vectors in the inputs may be representative of sequential segments in the audio signal. For example, an audio signal may be segmented into multiple sequential segments, each converted to a vector as described above, such as seg1, seg2, seg3, etc., where each of the sequential segments may include an audio signal frame within a small time period. In some examples, an audio signal frame may have a length of 1 ms, 2 ms, 3 ms, 4 ms, or 5 ms. In other examples, the audio signal frame may have a length of greater than 30 ms (and less than one second), or any suitable time period. In a multi-speaker conversation, each of the target speakers may be associated with a distinctive voice signature. For example, vs1, vs2, vs3 may respectively represent voice signatures of target speaker 1, target speaker 2, and target speaker 3.

An example of a concatenated signal stream is shown in FIG. 6C. For example, if two target speakers are selected, the first input 632 to the machine learning core 606 may include vector seg1 representing a first audio segment appended by two voice signature feature vectors vs1 and vs2. The second input 634 to the machine learning core 606 may include vector seg2 representing a second audio segment appended by two voice signature feature vectors vs1 and vs2. The third input 636 to the machine learning model core 606 may include vector seg3 representing a third audio segment appended by two voice signature feature vectors vs1 and vs2. Addition inputs to the machine learning model core 606 may take the same, or a similar, format. Using the voice signatures in the operation of the voice isolation machine learning model enables the machine learning model, when properly trained, to isolate the speech of target speaker(s) from non-target speaker(s) in the audio signal. The training of the voice isolation machine learning model will be further described with reference to FIG. 8.

Returning to FIG. 6A, the voice isolation machine learning model 602 may be a recurrent neural network, a convolutional neural network or any other suitable neural network. The output of the voice isolation machine learning model may include a mask 624 for isolating speeches from target speaker(s). In operation, a source separator 608 may be configured to apply the mask 624 outputted from the voice isolation machine learning model 602 to the input audio signal to provide isolated speech 610. As shown in FIG. 6A, isolated speech 610 may include a plurality of speech components each corresponding to a class of sounds or an individual speaker. For example, the isolated speech may include speech components of target speaker 1, target speaker 2, and non-target speaker(s) or background noise.

In some embodiments, the voice isolation network may be configured to isolate speech of any suitable number of multiple target speakers with proper training datasets. For example, a voice isolation network may be configured to handle a dynamically changing number of target speakers. For example, the voice isolation network may be configured to isolate speech of up to four target speakers, including 0, 1, 2, 3, and 4 target speakers. In implementing this, the network may be configured to have the size of input and output for four target speakers, where the input and output may contain multiple zeros where there are fewer than four target speakers. In training the network, various training datasets may be provided for various scenarios including speech of up to four distinct speakers. In such a configuration, the input to the voice isolation network (e.g., see FIG. 6C) may include a vector representing an audio segment appended by four feature vectors for four voice signatures, where some of the feature vectors may be zero when there are fewer than four target speakers. Additionally, and/or alternatively, the voice isolation network may be configured to isolate multiple target speakers by taking a combined voice signature from those of multiple target speakers. For example, the voice signatures of multiple target speakers may be combined by averaging them, where the averaged voice signature may be provided to the voice isolation network. In training the network, the voice signatures from multiple speakers may be combined in a similar manner before being provided to the voice isolation network being trained.

In a non-limiting example, a mask 624 outputted by the voice isolation machine learning model 602 may include complex values. When the mask is applied to the input audio signal, the magnitude and phase of the input audio signal are modified to yield the output signal stream including the isolated speech from the target speaker(s). In some embodiments, a mask outputted by the voice isolation machine learning model may be specific to an individual target speaker or multiple target speakers. Thus, the isolated speech 610 may include signals including speeches of one or more target speaker(s). Subsequently, the signals attributable to non-target speaker(s) and/or noise may be obtained by subtracting speeches attributable to the target source(s) from the input audio signal.

With continued reference to FIG. 6A, voice isolation network 600 may include additional components to further process the isolated speech to provide enhanced speech with the speech of the target speaker(s) being preferentially treated. As described above, the isolated speech 610 may include isolate speeches corresponding to different sound sources, for example, different target speakers and non-target speakers or noise. The ear-worn device may provide the isolated speech as different bands to a relative gain filter 612, which applies different gains based on user preferences 616. As described above, user preferences 616 may contain information about the optimal combination (or optimal weights) of various sound sources. Recombiner 614 then combines the differentially weighted frequency bands to form a combined output audio signal.

Referring again to FIGS. 4A and 4B, voice isolation network 600 directs the recombined audio stream to DSP 404 or 440 for further processing. In this manner and according to one embodiment, voice isolation network 600 estimates an ideal ratio mask that separates speech signal from noise signal, applies differential gain to each of the identified speech and noise signals and combines the differentially amplified signals into one data stream.

In some embodiments, voice isolation network 600 may optionally include a performance monitor 618. Performance monitor 618 may be configured to receive output of the voice isolation machine learning model 602 to predict the performance or predict the error of the voice isolation machine learning model. These predictions can further be used as inputs in recombiner 614, which seeks to optimize the way in which model outputs are recombined to form a final signal. Recombiner 614 takes into account both the user preferences 616 and output of performance monitor 618 to optimally recombine the outputs of isolated speech from the voice isolation machine learning model 602.

In an exemplary embodiment, performance monitor 618 receives output signal from the voice isolation machine learning model in sequential frames and determines an SNR for each frame. Performance monitor 618 then estimates an average SNR for the environment, which can be used to predict model error (since model error typically increases at more challenging input SNRs). Recombiner 614 also receives user preferences 616. Given the user preferences 616 and the estimated SNR from the performance monitor 618, recombiner 614 then determines a set of relative gains for the relative gain filter 612 to be applied to the isolated speech from the voice isolation machine learning model. In an exemplary embodiment, the recombiner 614 seeks to set the gains to best match user preferences while keeping total error below a certain threshold.

In some embodiments, recombiner 614 applies the gain values to the isolated speech to obtain output audio signal. In one embodiment, a plurality of gain values is communicated to recombiner 614. Each gain values corresponds to an intermediate signal, which in turn corresponds to a sound source. Recombiner 614 multiplies each gain value to its corresponding intermediate signal and combines the results to produce output audio signal. In some embodiments, the output audio signal from the recombiner 614 may be provided to a DSP for further processing, as shown in FIGS. 4A and 4B.

Returning to FIG. 6A, relative gain filter 612 may receive the user's auditory preferences from user preferences 616 and apply one or more relative gains to each of the frames of isolated speech signal. In some embodiments, the gains applied to the different frequency bands in the isolated speech can be non-linear. The implementation allows different gains to be applied at the source and at per-frame level. In a non-limiting example, the relative gains may be set to cause the relative gain filter to increase the SNR of the target speaker(s). For example, a higher gain may be applied to the speech component attributable to the target speaker(s) and a lower gain may be applied to the speech component attributable to non-target speaker(s) or background noise. Alternatively, the relative gains may be set to cause the relative gain filter to set the volume of the speech of the target speaker(s) to be at a desirable level. For example, the desirable level for a target speaker may be configured in the user preferences 616. In other variations, the volume of each target speaker may be equalized among the multiple target speakers. In some embodiments, the volume of each target speaker may be adjusted independently depending on how far the speaker is from the wearer of the ear-worn device. Adjusting the volumes of the target speaker(s) may include applying a higher gain to the speaker sitting farther away so that the volume of the voice at the receiver(s) of the ear-worn device is the same as that of the voice of the person sitting closer. In some embodiments, information indicative of the distance from a speaker to the wearer may be provided to the ear-worn device via an application on the external electronic device associated with the wearer. In some embodiments, the ear-worn device may adjust the volumes of speakers based on the control of the wearer (e.g., via an application on the external electronic device).

In some embodiments, the relative gains may be set to cause the relative gain filter to attenuate speech of non-target speaker(s) and/or the background noise. Additionally, and/or alternatively, the ear-worn device may receive an indication (e.g., set on the phone associated with the wearer of the ear-worn device, or set on the ear-worn device with a user selection) to suppress the wearer's own speech. In such configuration, the wearer him/herself may be designated as a non-target speaker whose speech should be isolated by the voice isolation network in the manner described herein for target speakers, but whose speech should be de-emphasized or suppressed. Once the wearer's own speech is isolated, the ear-worn device may set the relative gains to attenuate/suppress the wearer's speech. As the result, the output signal may be enhanced to include only speech of target speaker(s) other than the wearer of the ear-worn device. It is appreciated that the voice isolation network 600 may be implemented in configuration as described in FIG. 4B, in which the voice isolation network may be activated or deactivated by a controller (e.g., 430) as described above.

Figure 7A:
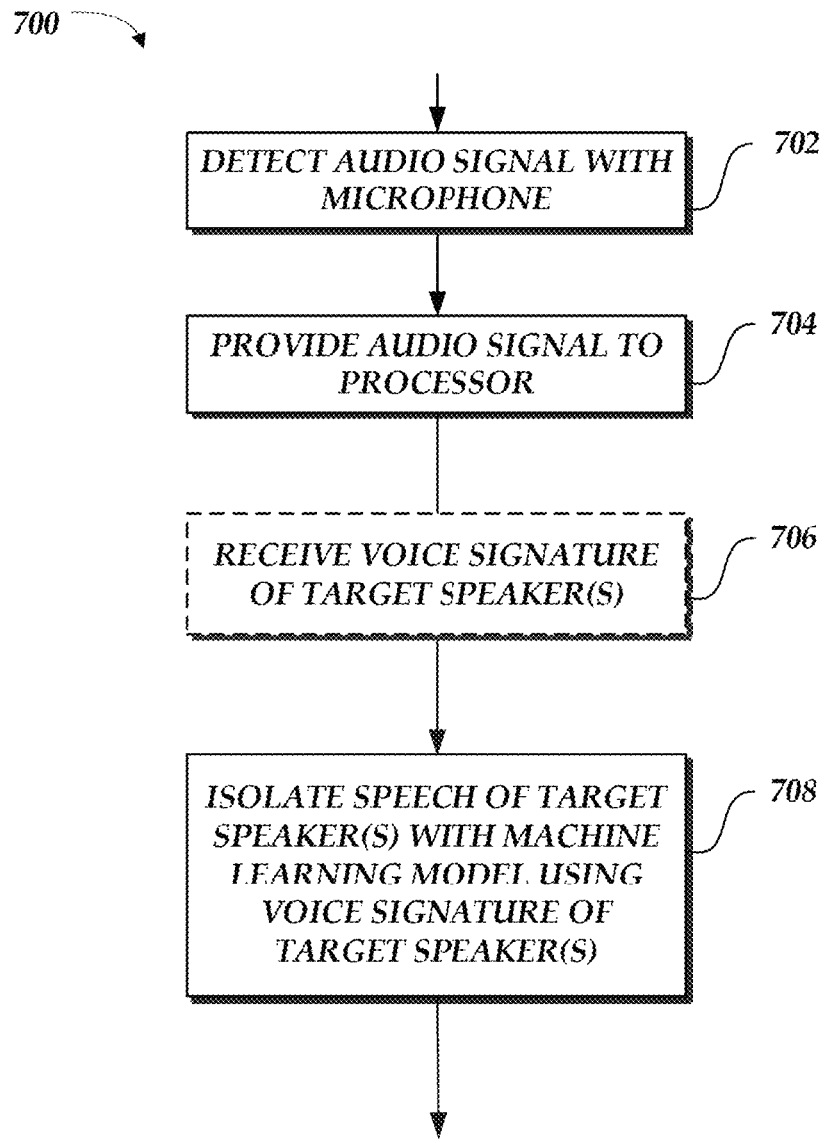
FIG. 7A is a flowchart of an example method of operation of an ear-worn device configured to selectively isolate speech from a target speaker within a multi-speaker environment, according to a non-limiting embodiment of the present application.

FIG. 7A is a flowchart of an example method 700 of operation of an ear-worn device configured to selectively isolate speech from a target speaker within a multi-speaker environment, according to a non-limiting embodiment of the present application. In some embodiments, method 700 may be implemented by a processor in an ear-worn device such as 108 (in FIGS. 1 and 2), 302 (in FIG. 3), 400 (in FIG. 4A), 470 (in FIG. 4B), 500 (in FIG. 5A) or 545 (in FIG. 5B).

Method 700 may implement any of the operations in various embodiments described above. For example, method 700 may include detecting an audio signal with a microphone of an ear-worn device at act 702, providing the audio signal detected by the microphone of the ear-worn device to the processor of the ear-worn device at act 704; and isolating, with the processor of the ear-worn device, speech of target speaker(s) with a machine learning model using voice signature(s) of the target speaker(s), at act 708. In some embodiments, the machine learning model may be a voice isolation machine learning model in a voice isolation network, such as voice isolation network described above in FIGS. 6A-6B. The machine learning model 602 may receive two inputs: the audio signal detected by the microphone of the ear-worn device and voice signature(s) of the target speaker(s). Voice signature of a speaker, as previously described, may be a unique representation of the speaker that differentiates the voice of the speaker from those of other speakers. Using the voice signature of target speaker(s) as input, the machine learning model may be operated to isolate the speech from the target speaker(s) in the audio signal. The isolated speech may include a component of the audio signal representing the target speaker's speech from among the temporally overlapping speech components from multiple speakers.

In some embodiments, the voice signature(s) of the target speaker(s) may be obtained from another machine learning model trained to discriminate between voices of speakers. With reference to FIG. 7A, method 700 may optionally include receiving voice signature(s) of target speaker(s) at act 706. For example, as shown in FIG. 3, the ear-worn device 302 may wirelessly receive the voice signature(s) of target speaker(s) from an electronic device 304, such as a phone associated with the wearer of the ear-worn device. In some embodiments, the ear-worn device 302 may be configured to send a segment of an audio signal detected from the microphone of the ear-worn device to electronic device 304, which may process the audio signal to extract voice signature(s) of the target speaker(s). Accordingly, act 706 may further include sending a segment of an audio signal to an external electronic device in the manner as described in embodiments of FIG. 3 before receiving the voice signature(s) of the target speaker(s).

Figure 7B:
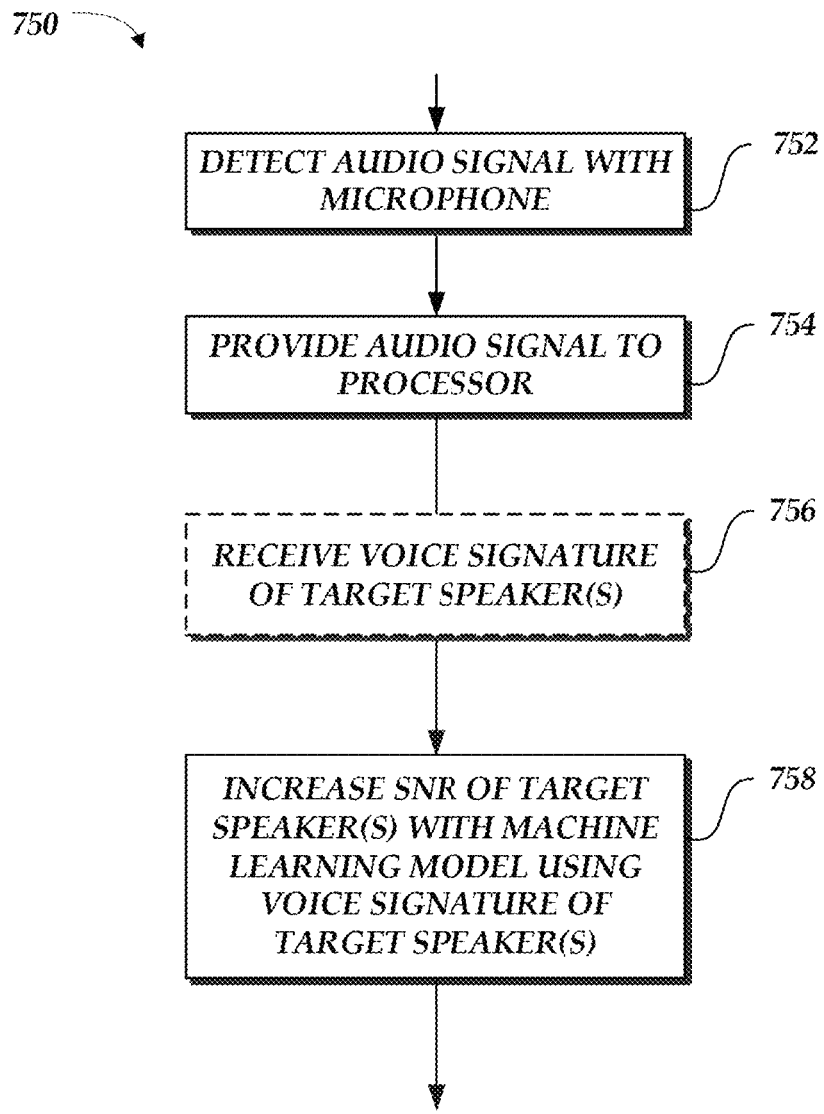
FIG. 7B is a variation of the example method in FIG. 7A of operation of an ear-worn device configured to selectively isolate speech from a target speaker within a multi-speaker environment, according to a non-limiting embodiment of the present application.

FIG. 7B illustrates a flowchart of an example method 750 as a variation of the example method in FIG. 7A of operation of an ear-worn device configured to selectively isolate speech from a target speaker within a multi-speaker environment, according to a non-limiting embodiment of the present application. Similar to method 700 in FIG. 7A, method 750 may be implemented by a processor in an ear-worn device such as 108 (in FIGS. 1 and 2), 302 (in FIG. 3), 400 (in FIG. 4A), 470 (in FIG. 4B), 500 (in FIG. 5A) or 545 (in FIG. 5B). In some embodiments, method 750 may include detecting audio signal with a microphone of an ear-worn device at 752 and providing the audio signal to the processor of the ear-worn device at act 754, where acts 752 and 754 may be respectively performed in a similar manner as acts 702 and 704 in method 700.

Additionally, and/or alternatively, method 750 may include increasing SNR of the target speaker(s) with a machine learning model using voice signature(s) of the target speaker(s), at act 758. Similar to method 700, the machine learning model may be a voice isolation machine learning model in a voice isolation network, such as voice isolation network described above in FIGS. 6A-6B. For example, the machine learning model may receive two inputs: the audio signal detected by the microphone of the ear-worn device and voice signature(s) of the target speaker(s), and output isolated speech from the target speaker(s). Further, act 758 may include one or more operations that may be performed in the voice isolation network as described in FIG. 6B. For example, recombiner 614 may be operated to output audio signal including improved SNR of the target speaker(s).

At act 756, similar to act 706 of method 700, the voice signature of target speaker(s) to be used with the machine learning model may be received (e.g., wirelessly) from an external electronic device. Further, act 756 may include sending a segment of an audio signal to an external electronic device in the manner as described in embodiments of FIG. 3 before receiving the voice signature(s) of the target speaker(s).

In both acts 706 and 756, in some embodiments, the voice signatures of multiple speakers are stored in the external electronic device, and thus, the voice signature(s) of the target speaker(s) are received from the external electronic device. In other embodiments, voice signatures of multiple speakers may be stored in the ear-worn device. As such, the identifiers that identify the target speaker(s) are received by the ear-worn device, which may use the identifiers to retrieve the corresponding voice signatures of the target speaker(s) from the local storage of the ear-worn device. In some other embodiments, rather than receiving voice signature(s) from an external device, acts 706/756 may include generating the voice signature(s) by the ear-worn device itself using a voice signature network that is also residing in the ear-worn device. In some other embodiments, voice signature(s) representing default target speakers may be pre-stored on the ear-worn device. In such configuration, acts 708/758 may include retrieving the voice signature(s) from a memory location of the ear-worn device and providing the voice signature(s) to the machine learning model.

In some embodiments, the target speaker(s) may be maintained the same during a conversation session, e.g., a meeting, a diner, in which the participants in the conversation do not change. In such case, the voice signature(s) of the target speaker(s) may be selected at the beginning of the conversation and remain constant throughout the conversation session. Thus, acts 708/758 (of method 700/750) may include providing the voice signature as a constant input to the machine learning model during processing of the audio signal. Alternatively, the model may be configured such that it continues to target those voice signatures previously provided, until it receives a new voice signature or an instruction indicating no voice signature. In such configurations, the machine learning model may be run in an efficient manner, obviating the need to keep passing large inputs to the network. In some embodiments, an indication of no voice signature may include a voice signature being set to a default value (e.g., all zeros in a voice signature). In some embodiments, an indication of no voice signature may cause the machine learning model to operate to isolate all voices.

In some embodiments, the target speaker(s) may change during a conversation. This may happen when the participants in the conversation change (e.g., a speaker left the conversation, or a new speaker joined), or when the wearer of the ear-worn device decides to listen to a different target speaker. In some embodiments, the wearer of the ear-worn device may be a user of his/her phone during a conversation, as shown in FIG. 1. Thus, the user may change target speaker(s) by making a user selection on the phone. In other embodiments, the ear-worn device may periodically transmit an audio signal segment detected by the microphone(s)

to the external electronic device, which generates and sends updated voice signature(s) of target speaker(s) to the ear-worn device. At such time when the target speakers are updated, acts 706/756 (of method 700/750) may be triggered to receive updated voice signature(s) of the target speaker(s). Consequently, acts 708/758 (of method 700/750) may include providing a second voice signature as input to the machine learning model in place of the previous voice signature during processing of the audio signal.

It is appreciated that each of methods 700 and 750 may include one or more additional acts to implement one or more operations described above to enhance the audio signal. For example, by the DSP (404 of FIG. 4A or 440 of FIG. 4B), the ear-worn device may play out only the target speaker's speech after isolating the component of the audio signal representing the target speaker's speech. In implementing this, methods 700 or 750 may amplify the component of the audio signal representing the target speaker's speech and/or apply a lower gain to or not amplify the speech component attributable to the non-target speaker(s) or background noise. Alternatively, and/or additionally, method 700 or 750 may include executing the recombiner 614 of FIG. 6A to suppress the component of the audio signal representing a non-target speaker's speech after isolating the component of the audio signal representing the target speaker's speech.

Figure 8:
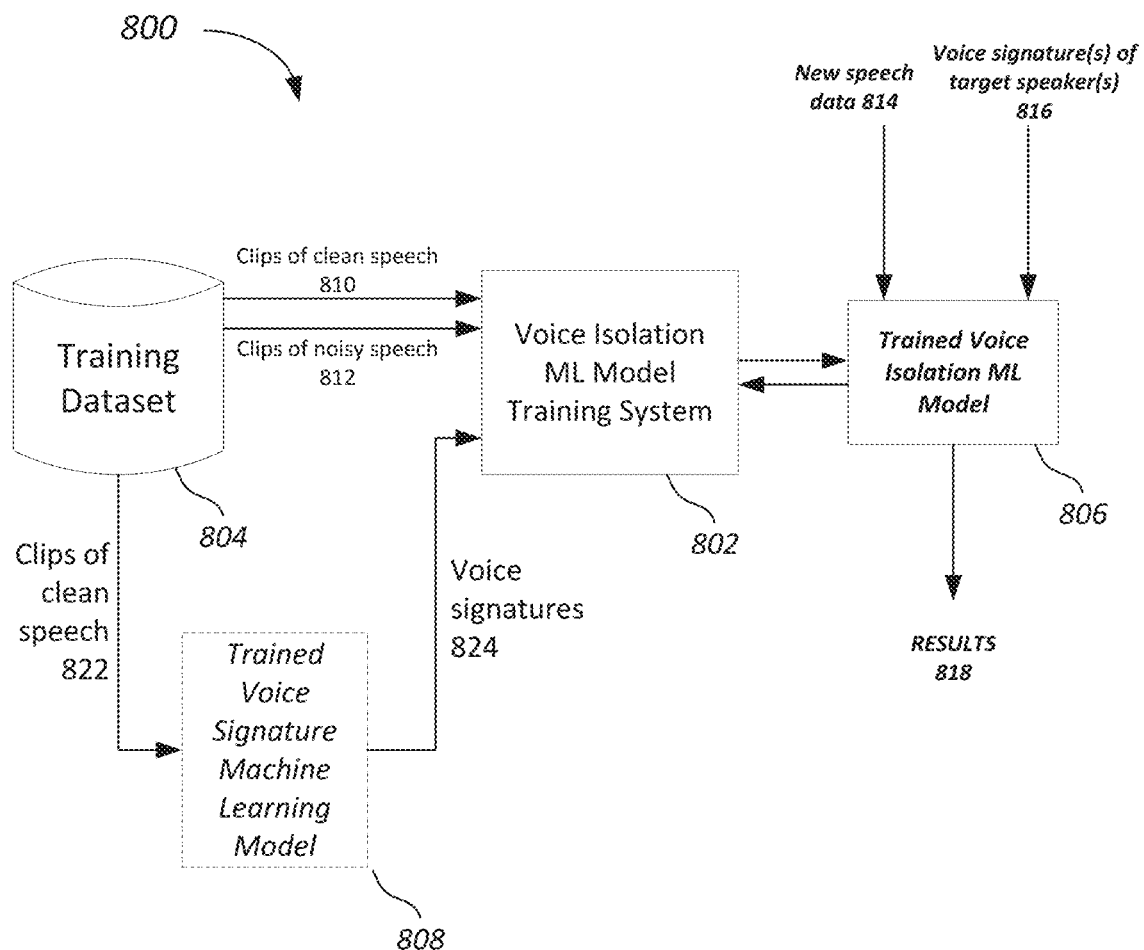
FIG. 8 is a block diagram illustrating training and deployment of a voice isolation machine learning model for isolating speech from a target speaker, according to a non-limiting embodiment of the present application.

FIG. 8 is a block diagram illustrating at 800 the training and deploying of a voice isolation machine learning model for isolating speech from a target speaker, according to a non-limiting embodiment of the present application. In some embodiments, a voice isolation machine learning model training system 802 may be configured to use training dataset 804 to generate a trained voice isolation machine learning model 806. The trained voice isolation machine learning model 806 may be deployed as the voice isolation machine learning model 602 in the voice isolation network 600, for example. The train voice isolation machine learning model 806 may also be implemented in voice isolation network described above, such as 403 (in FIG. 4A), 450 (in FIG. 4B), 540 (in FIG. 5A), 570 and 580 (in FIG. 5B). In some embodiments, the voice isolation machine learning model 806 may include a neural network comprising a plurality of layers, each having multiple weights. It is appreciated that the voice isolation machine learning model 806 may be any suitable model configured in a suitable manner. In a non-limiting example, the machine learning model 806 may be a recurrent neural network and may be a long short term memory (LSTM) network. In some examples, the machine learning model 806 may include five LSTM layers, each layer having a number of units, e.g., 1024 or other suitable number of units. The number of weights in the machine learning model 806 may be as few as thousands to as large as tens of millions. Training system 802 may use training dataset 804 to train the weights in the machine learning model 806.

In some embodiments, training dataset 804 may include clips of clean speech 810 and noisy speech 812 for a plurality of speakers. For example, for each of the plurality of speakers, the training dataset 804 may include a plurality of pairs of clips containing speech from the speaker. Each pair of clips may include a clip containing clean speech and another clip containing the same clean speech with interfering noise added (thus noisy speech). The interfering noise may include randomly selected background noise and also interfering contemporaneous speech of a non-target speaker or other speakers. The data can also be augmented by adding reverberation, in some examples. Thus, training system 802 receives the plurality of pairs of clips for the plurality of speakers as input. Additionally, training system 802 may also receive voice signatures of the plurality of speakers as a third input.

In training the voice isolation machine learning model 806, a pre-trained voice isolation machine learning model is initialized and contains initial weights. The training system then provides the noisy speech and the voice signatures 824 to the pre-trained voice isolation machine learning model to generate an output for each data point in each of a plurality of iterations in an optimization process. For example, each data point in an iteration may be a small segment of the noisy speech (e.g., a chunk of one second) of a speaker combined with the voice signature for the speaker. The clips of clean speech may be used as ground truth data. In some embodiments, the segment of the noisy speech and the voice signature of the speaker may be concatenated in the same manner as described in FIG. 6C as used in executing the voice isolation network (or voice isolation machine learning model). In some embodiments, the output of the voice isolation machine learning model for each data point may be an estimated complex mask for the noisy clip. A loss function is calculated based on the difference (e.g., measured by mean-squared error) between the ground truth complex mask and the estimated complex mask. The objective of the training is to minimize such loss function through multiple iterations in the optimization process. Any suitable algorithm, such as gradient descent, may be used in the optimization process. Once the training is completed, the weights in the voice isolation machine learning are trained.

Voice signatures 824 provided to the training system 802 may be pre-stored or generated concurrently with the training. In some embodiments, voice signatures of plurality of speakers may be extracted from audio signals containing speeches of the speakers using a voice signature network, which will be described in detail with reference to FIGS. 12-13. The generated voice signatures may be pre-stored, e.g., together with the training system. In other embodiments, training dataset 804 may include additional clips of clean speech 822 for the plurality of speakers, which are provided to a trained voice signature machine learning model 808. The trained voice signature machine learning model 808 is then executed to generate the voice signature for each additional clip. As such, the training dataset 804 includes a triplet of clips for each speaker, including two clips of clean speech and a clip of noisy speech. In this configuration, one clip of clean speech is used as ground truth, the other clip of clean speech is used to generate a voice signature. The generated voice signature and the clip of noisy speech are then provided to the training system 802.

The trained voice isolation machine learning model 806 may be deployed (executed) in the voice isolation network described in various embodiments above. The trained voice isolation machine learning model may take any new noisy speech 814 along with the voice signature(s) of the target speaker(s) 816 and generate results 818 (e.g., complex masks as described above). The new noisy speech and the voice signature(s) of target speaker(s) may be combined in a similar manner as described in FIG. 6C, and such manner of combination will therefore not be repeated herein.

Figure 9:
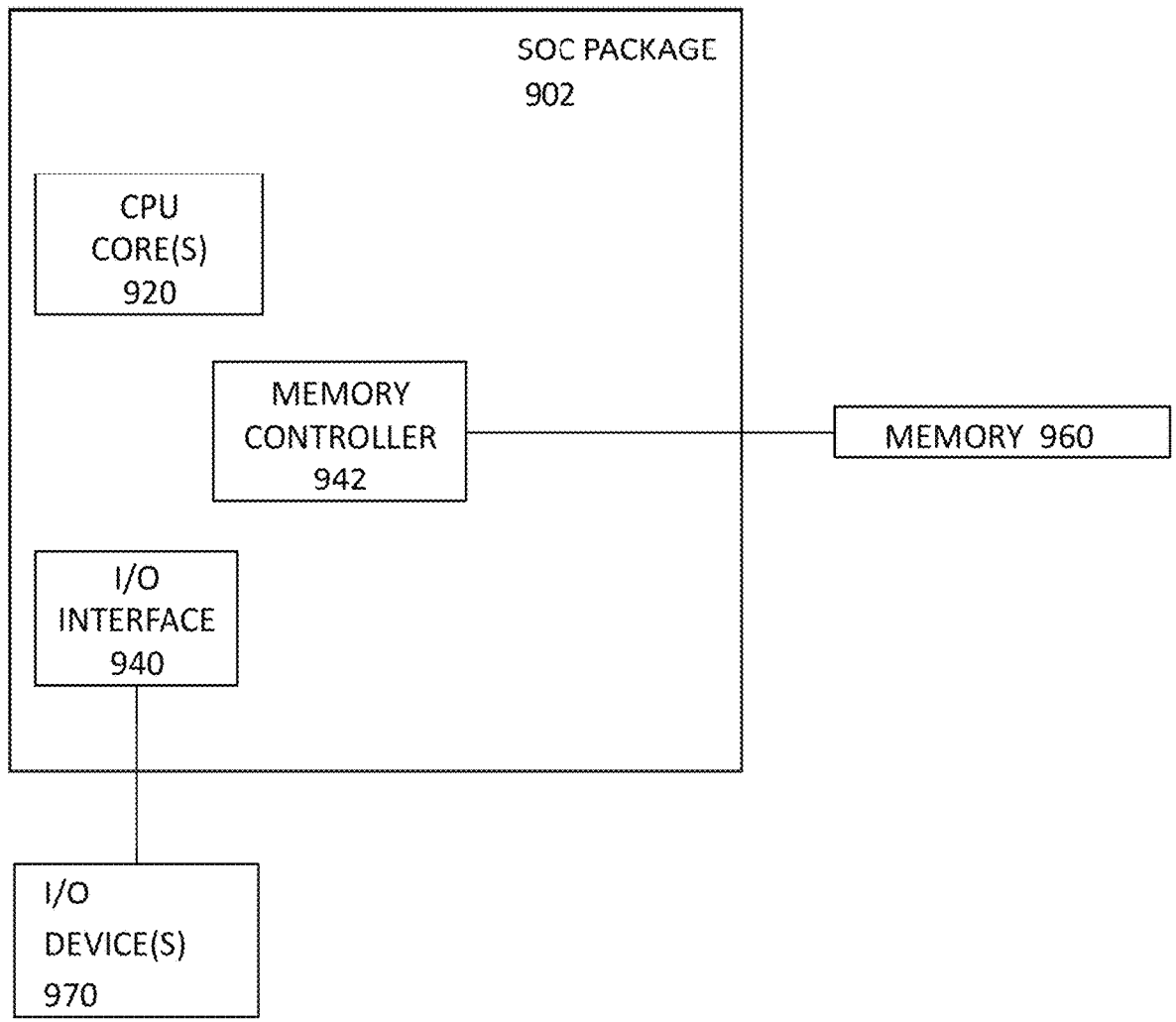
FIG. 9 illustrates a block diagram of a system-on-chip (SOC) package that may be implemented in an ear-worn device, according to a non-limiting embodiment of the present application.

FIG. 9 illustrates a block diagram of a system-on-chip (SOC) package that may be implemented in an ear-worn device, according to a non-limiting embodiment of the present application. In some embodiments, SOC package 902 may implement various operations in an ear-worn device, such as 108 (in FIGS. 1 and 2), 302 (in FIG. 3), 400 (in FIG. 4A), 470 (in FIG. 4B), or a circuitry of an ear-worn device such as 500 (in FIG. 5A), or 545 (in FIG. 5B). In various embodiments, SOC 902 includes one or more Central Processing Unit (CPU) cores 920, an Input/Output (I/O) interface 940, and a memory controller 942. Various components of the SOC package 902 may be optionally coupled to an interconnect or bus such as discussed herein with reference to the other figures. Also, the SOC package 702 may include components such as those discussed with reference to the ear-worn device described in FIGS. 1-8. Further, each component of the SOC package 920 may include one or more other components of the ear-worn device, e.g., as discussed with reference to FIGS. 4A-6B. In one embodiment, SOC package 902 (and its components) is provided on one or more Integrated Circuit (IC) die, e.g., which are packaged into a single semiconductor device. The single semiconductor device may be configured to be used as an ear-worn device, an amplification system or a hearing device to be used in the human ear canal.

As illustrated in FIG. 9, SOC package 902 is coupled to a memory 960 via the memory controller 942. In an embodiment, the memory 960 (or a portion of it) can be integrated on the SOC package 902. The I/O interface 940 may be coupled to one or more I/O devices 970, e.g., via an interconnect and/or bus such as discussed herein. I/O device(s) 970 may include interfaces to communicate with SOC 902. In an exemplary embodiment, I/O interface 940 communicates wirelessly with I/O device 970. SOC package 902 may comprise hardware, software and logic to implement, for example, the various components or methods described in FIGS. 1-8. The implementation may be communicated with an auxiliary device, e.g., I/O device 970. I/O device 970 may comprise additional communication capabilities, e.g., cellular, BlueTooth, WiFi or other protocols, to access any component in the ear-worn device, for example, to configure the voice isolation network.

Figure 10:
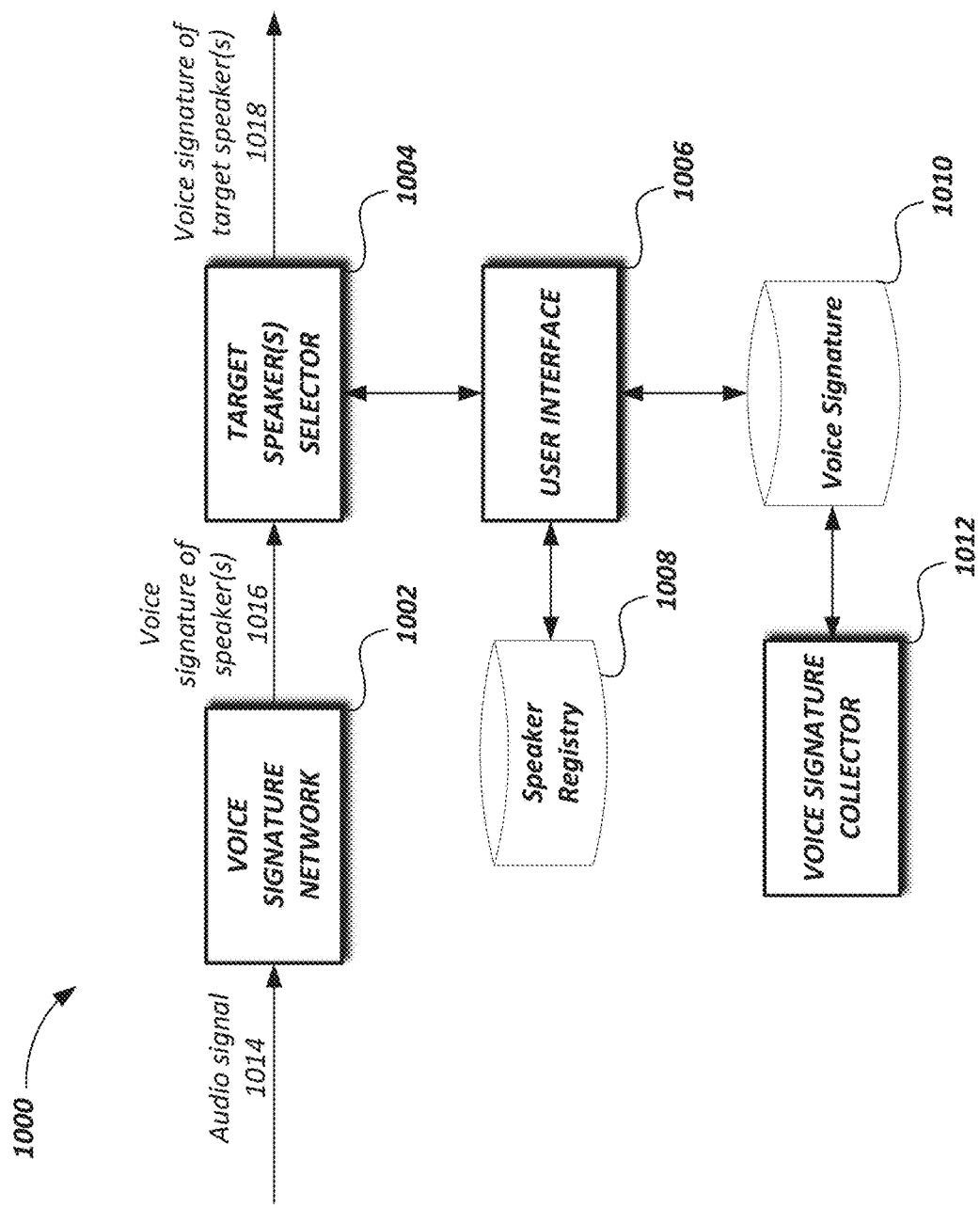
FIG. 10 is a block diagram illustrating a portion of a circuitry configuration of an electronic device operable to extract voice signature(s), according to a non-limiting embodiment of the present application.

FIG. 10 is a block diagram illustrating a portion of a circuitry configuration of an electronic device operable to extract voice signature of target speaker(s) to an ear-worn device, according to a non-limiting embodiment of the present application. In some embodiments, the wearer of an ear-worn device may be a user of his/her phone during a conversation, as shown in FIG. 1, and use his/her phone to perform various operations in association with voice processing on the ear-worn device. For example, circuitry 1000 may be implemented in electronic device 110 (in FIGS. 1 and 2), and 304 (in FIG. 3) to provide the voice signature(s) for target speaker(s) 1018 and transmit (e.g., wired or wirelessly) the voice signature(s) to the ear-worn device (see FIG. 3). Circuitry 1000 may include various components, either hardware- or software-implemented. In some embodiments, circuitry 1000 may include a voice signature network 1002 described above. The voice signature network 1002 may be configured to receive an audio signal 1014 as input and extract as output voice signature of the speaker(s) 1016 whose speech is included in the audio signal. In some embodiments, the voice signature network may include a voice signature machine learning model that can be trained. When properly trained, the voice signature machine learning model may be executed to extract from input audio signal distinctive voice signatures for different speakers and extract the same voice signature for the same speaker. A voice signature may be in the form previously described, e.g., in a multi-dimensional feature vector. The training of the voice signature machine learning model is described with reference to FIG. 13.

With further reference to FIG. 10, circuitry 1000 may include a target speaker selector 1004, a user interface 1006 coupled to the target speaker selector 1004. Circuitry 1000 may further include a speaker registry 1008 to store a list of known speakers to the wearer of the ear-worn device, and storage 1010 to store voice signatures of speakers. In some embodiments, the voice signatures 1010 of known speakers may be stored in association with registry 1008 of known speakers, where each entry of the registry may correspond to a respective individual speaker. As shown in FIG. 10, registry 1008 and voice signatures 1010 may be stored on the electronic device. In other embodiments, the voice signatures may be optionally and/or additionally stored on the ear-worn device associated with the electronic device. In some embodiments, circuitry 1000 may include a voice signature collector 1012, which is configured to collect the voice signatures 1010. The collection of voice signatures will be further described with reference to FIG. 12.

Figure 11A:
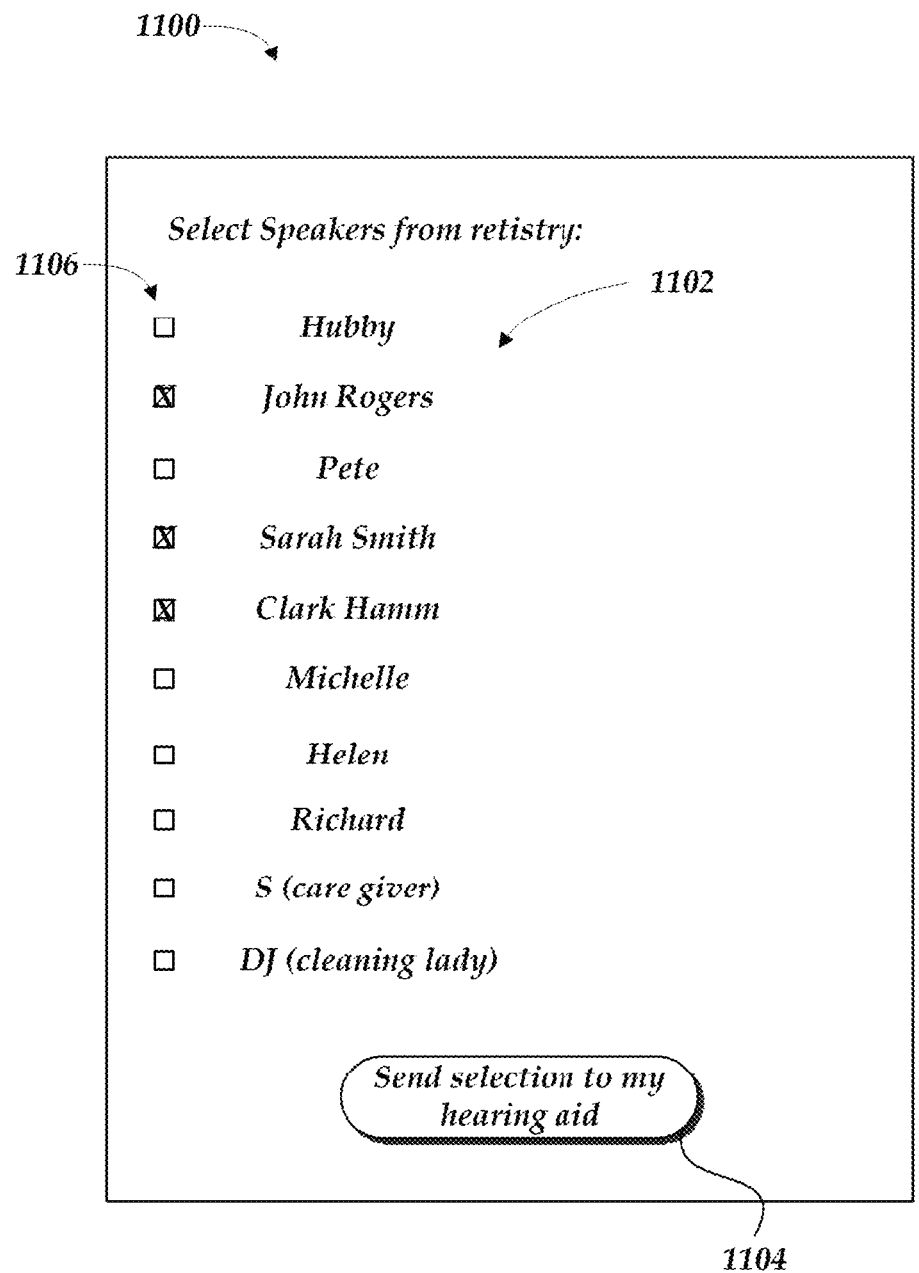
FIG. 11A illustrates an example graphical user interface that may be implemented in an electronic device to select one or more target speakers, according to a non-limiting embodiment of the present application.
Figure 11B:
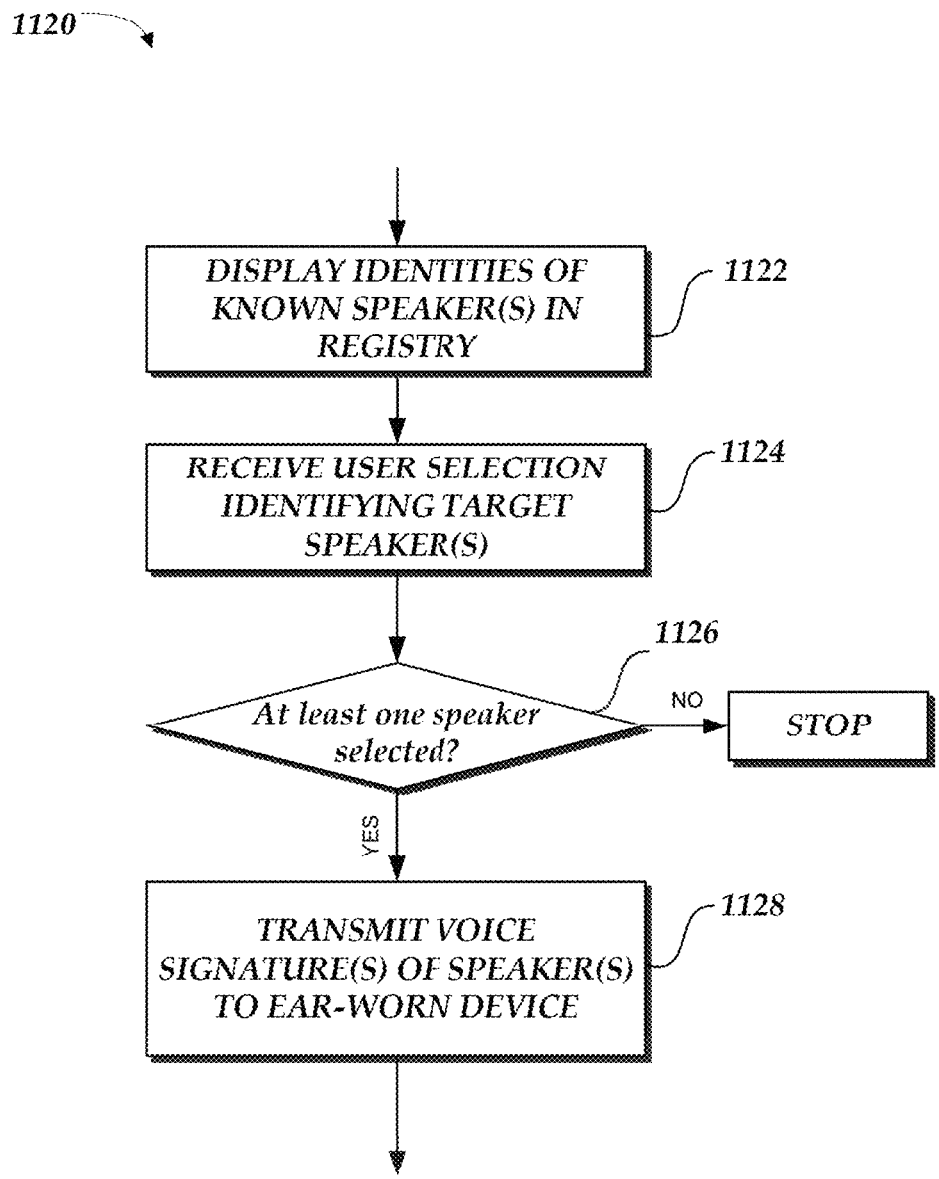
FIG. 11B illustrates a block diagram of an example process for implementing the example graphical user interface of FIG. 11A, according to a non-limiting embodiment of the present application.
Figure 11C:
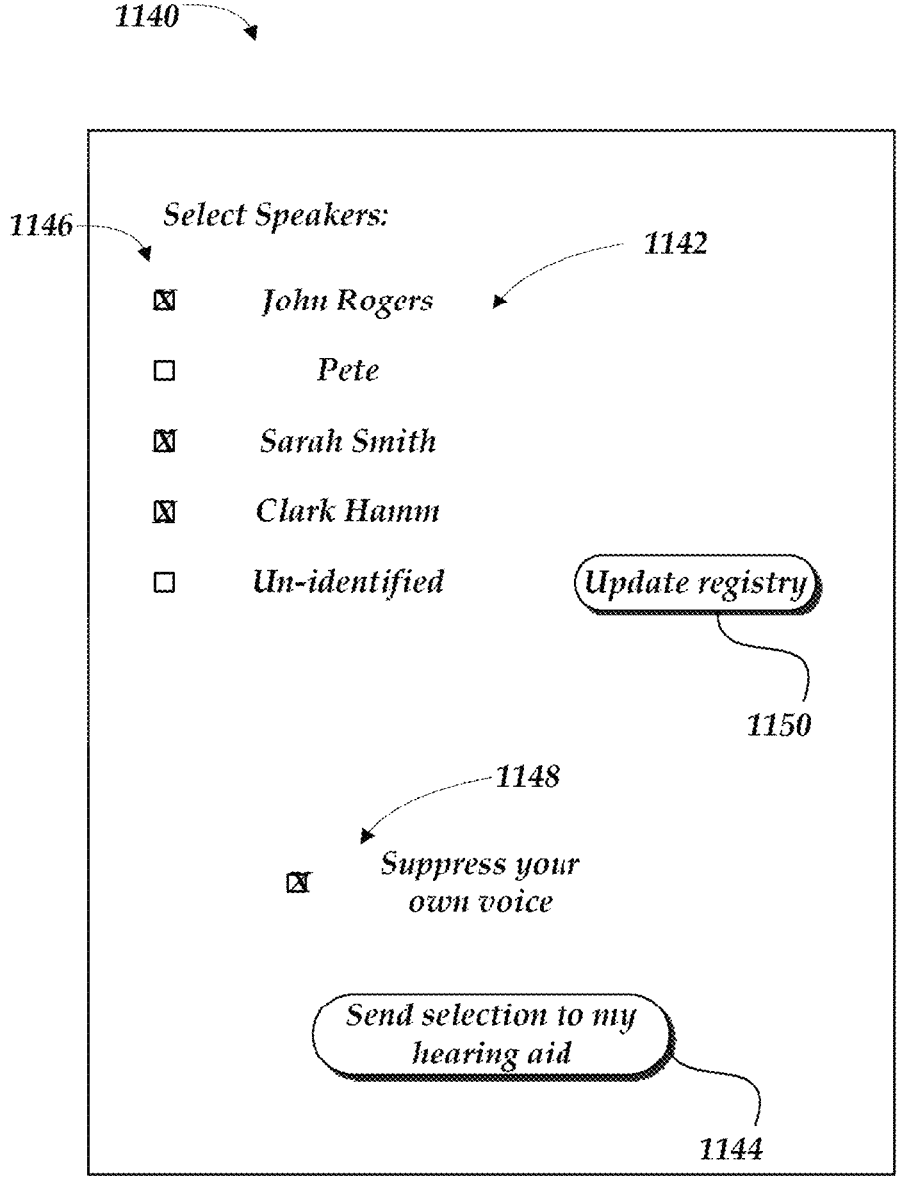
FIG. 11C illustrates an example graphical user interface that may be implemented in an electronic device to select one or more target speakers, according to a non-limiting embodiment of the present application.
Figure 11D:
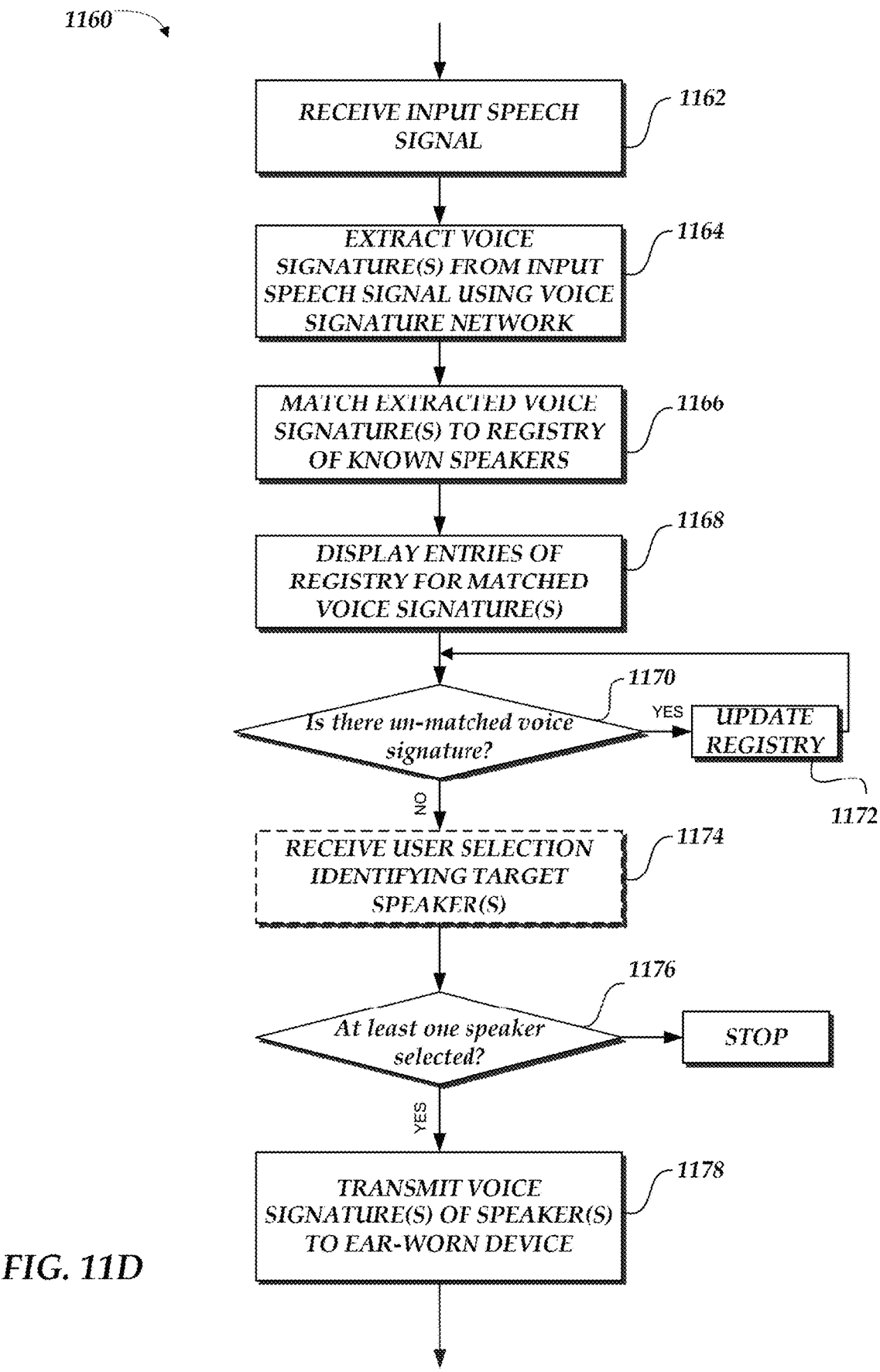
FIG. 11D illustrates a block diagram of an example process for implementing the example graphical user interface of FIG. 11C, according to a non-limiting embodiment of the present application.
Figure 11E:
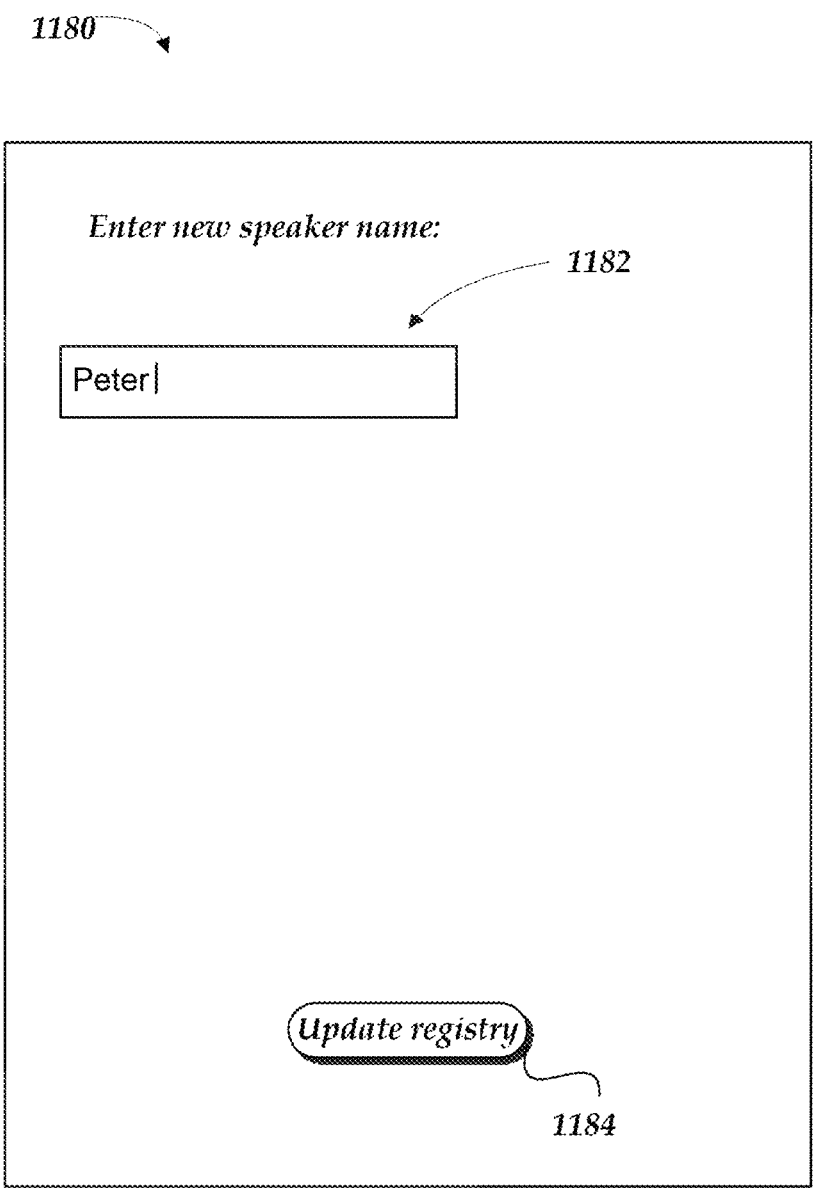
FIG. 11E illustrates an example graphical user interface that may be implemented in an electronic device to add a new speaker to a registry of known speakers, according to a non-limiting embodiment of the present application.
Figure 11F:
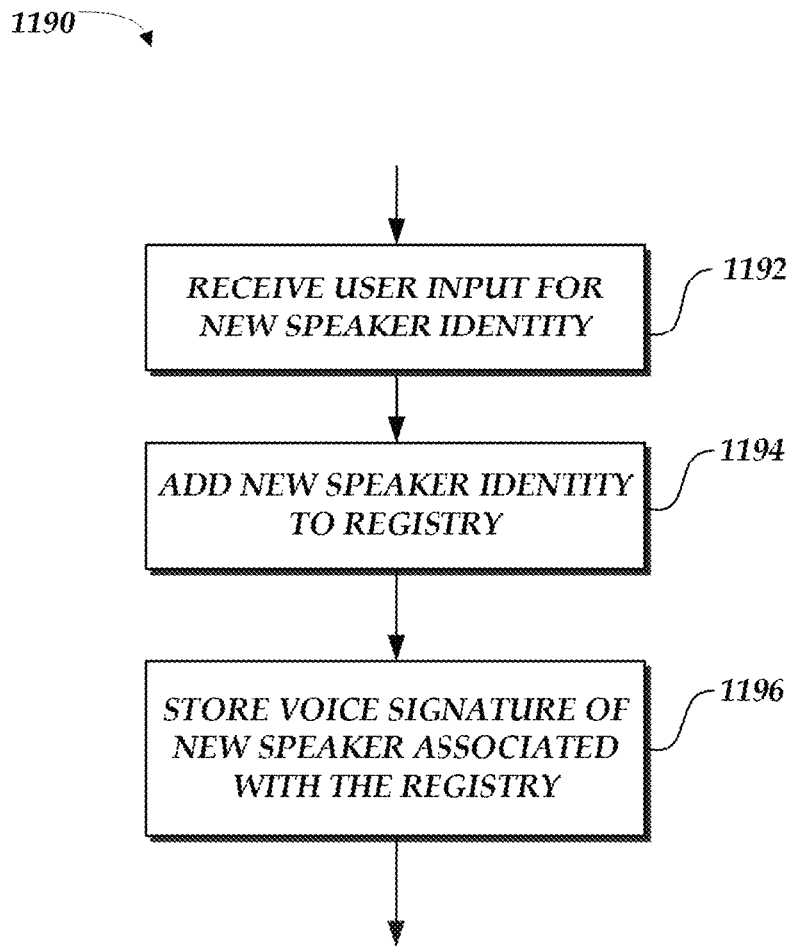
FIG. 11F illustrates a block diagram of an example process for implementing the example graphical user interface of FIG. 11E, according to a non-limiting embodiment of the present application.

As shown in FIG. 10, target speaker selector 1004 may be configured to select target speaker(s) for the user and transmit the voice signature(s) of selected target speaker(s) to the user's ear-worn device. The operations of the target speaker selector 1004 are further explained with examples in FIGS. 11A-11F. FIGS. 11A, 11C, and 11E illustrate examples of graphical user interface that may be implemented in an electronic device, according to some non-limiting embodiments of the present application. FIGS. 11B, 11D, and 11F illustrate block diagrams of example processes respectively for implementing the example graphical user interfaces shown in FIGS. 11A, 11C, and 11E.

With reference to FIG. 11A, an example display 1100 may be implemented in user interface 1006 of FIG. 10. The display of the user interface 1100 may include a list 1102 of known speakers to user (e.g., the wearer of the ear-worn device). The known speakers may be registered in the speaker register (e.g., 1008 in FIG. 10). The user may view the listed speakers and confirm who is present in a conversation and/or whom the user would like to listen to. This may be implemented by the user providing a user selection of target speaker(s) from the list of speakers in the registry. As shown in the display 1100, each speaker name may be displayed with a check box 1106 for the user to select/unselect. Once the user has made the selection, the user may click a "Send" button 1104 to send the voice signature(s) of selected target speaker(s) to the ear-worn device. In some embodiments, the user may not need to click a "Send" button. Instead, once the target speakers are selected/updated (automatically, or by the user), the electronic device may dynamically send the voice signature(s) of the updated target speaker(s) to the ear-worn device.

FIG. 11B illustrates an example process 1120 for implementing the example graphical user interface of FIG. 11A. In some embodiments, method 1120 may be implemented in an electronic device, e.g., 110 (in FIGS. 1 and 2), 304 (in FIG. 3). For example, method 1120 may be implemented in the target speaker selector 1104 of FIG. 10. In some embodiments, method 1120 may include displaying identities of known speaker(s) in a registry at act 1122. For example, as shown in FIG. 11A, the user interface may display a list 1102 of known speakers in the registry. Method 1120 may further include receiving user selection identifying the target speaker(s) at act 1124. Although it is shown in FIG. 11A that the user selection may be click(s) 1106, the user selection may also take other forms, such as drop-down menu or other suitable widgets.

In response to receiving the user section at act 1124, method 1120 may proceed to determine whether there is at least one target speaker selected, at act 1126. In response to determining that at least one target speaker is selected, method 1120 may proceed to transmit the voice signature(s) associated with the selected speaker(s) to the ear-worn device, at act 1128. For example, the method may enable the user to click "Send" button 1104 of FIG. 11A to transmit the voice signature(s). In another example, the method may dynamically transmit the voice signature(s) once the selected speaker(s) are updated, without requiring the user to click a "Send" button. In response to determining that no target speaker is selected, or no user selection is received, method 1120 may stop. In some embodiments, in response to determining that no target speaker is selected, or no user selection is received, method 1120 may disable the "Send" button 1104 of FIG. 11A (e.g., the "Send" button may be grayed out), in which case, the electronic device will not transmit any voice signature to the ear-worn device.

With reference to FIG. 11C, an example display 1140 may be implemented in user interface 1006 of FIG. 10. The display 1140 may include a list 1102 of one or more identified speakers. In some embodiments, the electronic device may receive audio signal detected by the microphone of the ear-worn device (or the electronic device itself) in a conversation to identify one or more speakers in the conversation. A speaker may be identified when an extracted voice signature from the audio signal is matched to a voice signature associated with a registry of known speakers. Extracting voice signature(s) from an audio signal will be further described in FIG. 11D. In some embodiments, the electronic device may transmit the voice signature(s) of the identified one or more speakers to the ear-worn device, assuming, by default, any known speakers in the registry who are also present in a conversation (thus, the voice signature is matched, and the speaker is identified) are target speakers to whom the wearer of the ear-worn device prefers to listen. Additionally, in the user interface shown in 1140, the user may be prompted to select, at 1146, a subset of the identified speakers to further confirm the target speaker(s). Then, the user may proceed to transmit the voice signatures of the selected target speaker(s), e.g., by clicking the "Send" button 1144.

Additionally, and/or alternatively, the list 1142 may include one or more un-identified speakers who voice signature(s) are not matched to any of the voice signatures of known speakers in the registry. An un-identified speaker may be a new speaker whom the wearer of the ear-worn device has never spoken with before. In some embodiments, the user interface may allow the user to add a new un-identified speaker to the registry, e.g., by clicking "Update registry" button 1150. Once the user selects an un-identified speaker to be added to the registry, the un-identified speaker may be added to the registry. The newly added speaker may also be automatically selected as a target speaker.

Additionally, and/or alternatively, the user interface 1140 may include a user selection 1148 that, when selected, enables the user to suppress his/her own voice. Such user selection may be an indication for suppressing the wearer's own voice, where the indication can be transmitted from the electronic device to the ear-worn device. Alternatively, the ear-worn device may include a user interface (e.g., by user clicking one or more buttons or a combination of buttons) to configure the ear-worn device to suppress the wearer's own voice. In an alternative embodiment, the ear-worn device may be configured, by default, to suppress the wearer's own voice. The techniques for suppressing the wearer's own voice are previously described with reference to FIG. 6A, and the description of those techniques will not be repeated herein.

FIG. 11D illustrates an example process 1160 for implementing the example graphical user interface of FIG. 11C. In some embodiments, method 1160 may be implemented in an electronic device, e.g., 110 (in FIGS. 1 and 2), 304 (in FIG. 3). For example, method 1160 may be implemented in the target speaker selector 1104 of FIG. 10. In some embodiments, method 1160 may include receiving input speech signal at act 1162. As previously described, the electronic device may receive the input speech signal from an ear-worn device. For example, the input speech signal may be detected by the microphone(s) of the ear-worn device and transmitted wirelessly to the electronic device. Alternatively, or additionally, the electronic device may receive the input speech signal from its own microphone(s), as described in FIG. 3 (showing the audio signal to be processed in the electronic device may be come from either the ear-worn device and/or the electronic device itself). As described above, the input speech signal may include the speech from one or more target speakers. The input speech signal may also include the speech from one or more non-target speakers. In some examples, the input speech signal may be detected in a beginning of a multi-speaker conversation, during which period every speaker (or every target speaker) has spoken at least once.

With further reference to FIG. 11D, method 1160 may include extracting voice signature(s) of speakers from the input speech signal using a voice signature network at act 1164. The voice signature network may be configured as described previously as in 1002 of FIG. 10, for example. Using the voice signature network, act 1164 may extract the voices of the speakers in the conversation based on the input speech signal. Method 1160 may further match the extracted voice signatures, at act 1166, with the voice signatures (e.g., 1010 of FIG. 10) associated with the known speakers in the registry (e.g., 1008 of FIG. 10). If an extracted voice signature is matched to a voice signature associated with a known speaker, method 1160 may identify that known speaker. Method 1160 may further display a respective entry of the identified speaker in the registry at act 1168. For example, list 1142 in the user interface 1140 displays the names of the speakers in the registry whose voice signatures respectively match an extracted voice signature from the input speech signal.

In some embodiments, method 1160 may handle an unidentified speaker. An example of an "un-identified" entry is shown in list 1142 of FIG. 11C. Method 1160 may determine whether an extracted voice signatures from the input speech signal is not matched to any of the voice signatures of the known speakers in the registry at 1170. In response to determining an unmatched voice signature, method 1160 may proceed to enable the user of the electronic device to update the registry of speakers at act 1172, for example, by clicking "Update registry" button 1150 of FIG. 11C. Updating the registry will further be described in FIGS. 11E and 11F.

With continued reference to FIG. 11D, in response to determining no unmatched voice signatures, method 1160 may optionally receive user selection identifying target speaker(s) from the matched speakers at act 1174. Before receiving user selection identifying the target speaker(s), act 1174 may display the user with an option to select the target speaker. For example, a list of selection boxes 1146 of FIG. 11C may be displayed aside the list of identified speakers 1142. Each of the selection boxes 1146 of FIG. 11C may be clickable to allow the user to click/unclick a corresponding speaker in the list. Thus, the selected target speaker may be a subset of the identified speakers described above. For example, as shown in FIG. 11C, the user selection may include selecting "John Rogers," "Sarah Smith," and "Clark Hamm."

Returning to FIG. 11D, in response to receiving the user section at act 1174, method 1170 may proceed to determine whether there is at least one target speaker selected, at act 1176. In response to determining that at least one target speaker is selected, method 1160 may proceed to transmit the voice signature(s) associated with the selected target speaker(s) to the ear-worn device, at act 1178. For example, method 1160 may enable the user to click "Send" button 1144 of FIG. 11C to transmit the voice signature(s) to the ear-worn device. In another example, the method may dynamically transmit the voice signature(s) to the ear-worn device upon matching the extracted voice signature(s) to the registry of known speakers at act 1166, without waiting for any user selection. In response to determining that no target speaker is selected, method 1160 may stop. In some embodiments, in response to determining that no target speaker is selected, or no user selection is received, method 1160 may disable the "Send" button 1144 of FIG. 11C (e.g., the "Send" button may be grayed out), in which case, the electronic device will not transmit any voice signature to the ear-worn device.

As previously described, the ear-worn device may additionally store voice signature(s) of one or more speakers. For example, see voice signature storage 316 of FIG. 3. In some embodiments, the voice signature(s) stored in the ear-worn device may be voice signature(s) of default target speaker(s). Alternatively, the voice signature(s) stored in the ear-worn device may be voice signature(s) of all known speakers to the wearer of the ear-worn device. Alternatively, the voice signature(s) stored in the ear-worn device may be associated with speakers with whom the wearer of the ear-worn device have frequently spoken, e.g., the voice signature(s) may be updated periodically or dynamically. It is appreciated that the voice signature(s) stored on the ear-worn device may be uploaded/updated by a user interface (e.g., click of buttons or a combination of buttons, or voice commands etc.) or via an electronic device (e.g., a phone).

In case voice signatures of some speakers are stored on the ear-worn device, acts 1128 of FIG. 11B and 1178 of FIG. 11D may instead transmit the identifiers of selected target speaker(s) rather than the voice signature(s) themselves. For example, the identifiers of selected target speaker(s) may include the speaker's names such as the names shown in list 1102 of FIG. 11A and 1142 of FIG. 11C. In other examples, the identifier(s) of selected speaker(s) may each include a fixed-length string, a multiple-digit code, or any other suitable identifiers. The ear-worn device may use the identifier(s) to retrieve the associated voice signature(s) of the selected target speaker(s).

It is appreciated that the electronic device may be configured to enable to the user to edit the registry of known speakers at any time. In some embodiments, the registry may be edited to store only default speakers. In other embodiments, the registry may be edited to store known speakers to the wearer of the ear-worn device. In some embodiments, the registry on the electronic device may correspond to the voice signatures stored on the ear-worn device. In other embodiments, the registry on the electronic device may be independent of the voice signatures stored on the ear-worn device.

In FIG. 11E, updating the registry is further illustrated. In some embodiments, the user interface 1180 is triggered by a click of "Update registry" button 1150 of FIG. 11C. In the scenario previously described in FIG. 11C, the voice signature of an un-identified speaker may be extracted from the input speech signal but not matched to any voice signature of known speakers in the registry. In FIG. 11E, the user interface 1180 prompts the user to enter the name of the new speaker via a widget, such as an input box 1182. The user interface 1180 may receive a user entry of the name of the new identify. After entering the name, the user may click an "Update" button 1184 to update the registry with the new entered name.

FIG. 11F illustrates an example process 1190 for implementing the example graphical user interface of FIG. 11E, according to a non-limiting embodiment of the present application. In some embodiments, method 1190 may be implemented in an electronic device, e.g., 110 (in FIGS. 1 and 2), 304 (in FIG. 3). For example, method 1190 may be implemented in the target speaker selector 1104 of FIG. 10. In some embodiments, method 1190 may include receiving a user input for a new speaker identity at act 1192. For example, the new speaker identity may be entered by the user in an input box (e.g., 1182 of FIG. 11E) in a user interface. Method 1190 may further include adding the new speaker identity to the registry at act 1194, and storing the voice signature of the new speaker associated with the registry at act 1196. Accordingly, with reference to FIG. 10, the electronic device may store the unmatched voice signature in the voice signatures storage (e.g., 1010 of FIG. 10), update the registry (e.g., 1008 of FIG. 10) with a new entry associated with the new name, and associate the new entry with the unmatched voice signature.

Figure 12:
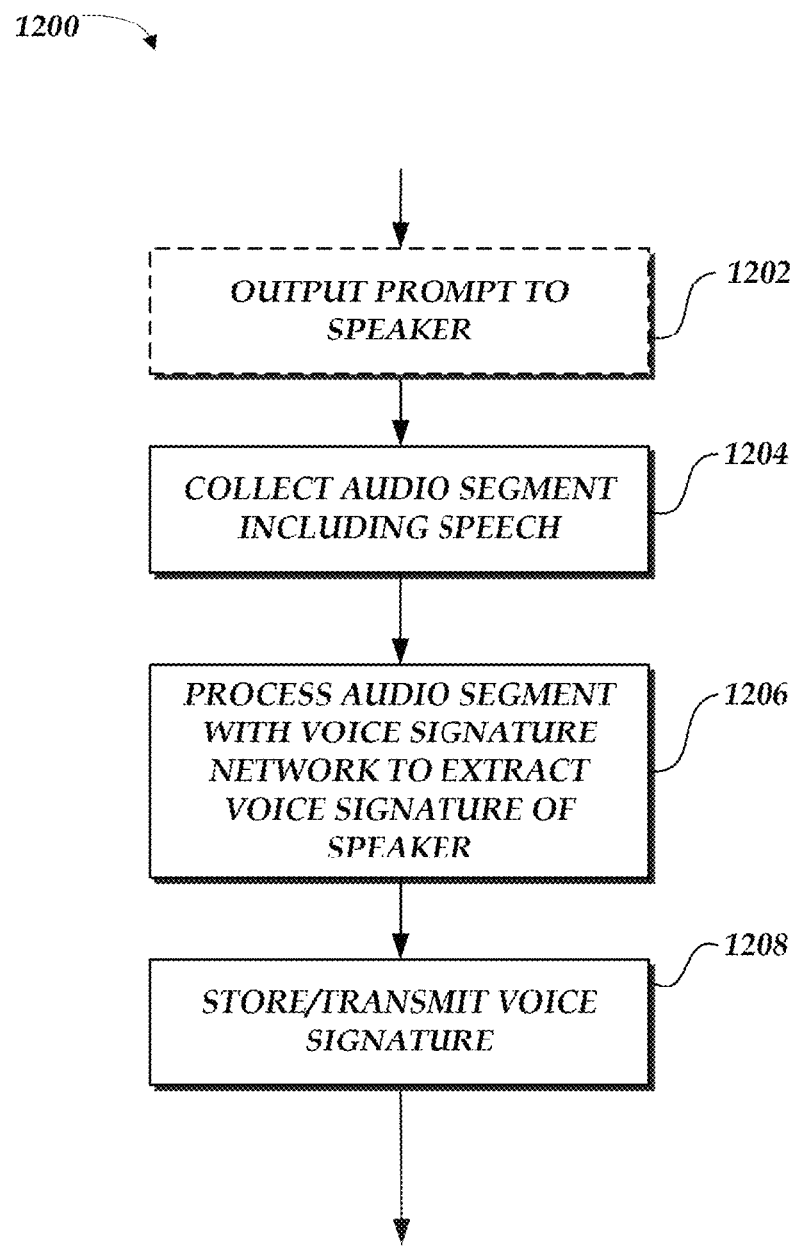
FIG. 12 illustrates a block diagram of an example process for collecting a voice signature of a speaker, according to a non-limiting embodiment of the present application.

FIG. 12 illustrates a block diagram of an example process 1200 for collecting a voice signature of a speaker, according to a non-limiting embodiment of the present application. As described above, the voice signatures of speakers may be pre-collected and stored on an electronic device for use with selecting the target speakers, as described in FIG. 10 and various examples in FIGS. 11A-11F. In some embodiments, method 1200 may be implemented in the voice signature collector 1012 of FIG. 10. Collecting the voice signatures of a plurality of speakers may include collecting a respective audio segment for each of the plurality of speakers; generating a respective voice signature for each of the plurality of speakers using a neural network over the respective audio segment; and registering in a registry the voice signatures of the plurality of speakers with the plurality of speakers in the contact list. In some embodiments, in collecting voice signature of a speaker, method 1200 may include receiving an audio segment (e.g., a segment of audio signal) including the speech of the speaker at act 1204. The audio segment may be recorded in a conversation including the speaker. Alternatively, and/or additionally, method 1200 may include outputting a prompt to the user at act 1202. For example, method 1200 may display a prompt (e.g., a script) and record the audio segment in respond to the speaker reading the prompt.

Method 1200 may further process the audio segment with a voice signature network to extract a voice signature for the speaker at act 1206. In some embodiments, the voice signature network may be implemented as 1002 of FIG. 10 for execution on an electronic device. Method 1200 may further store the extracted voice signature for the speaker and register the extracted voice signature in association with the speaker in a registry.

Although method 1200 may be implemented in an external electronic device, such as a phone, in other embodiments, method 1200 may be performed on a server (e.g., 306 of FIG. 3), or any other device. In such configuration, act 1204 may include receiving the audio segment from an electronic device (e.g., a phone capable of recording), which records the audio segment from the speaker. Act 1208 may include transmitting the extracted voice signature to the electronic device for registering with the registry.

Figure 13:
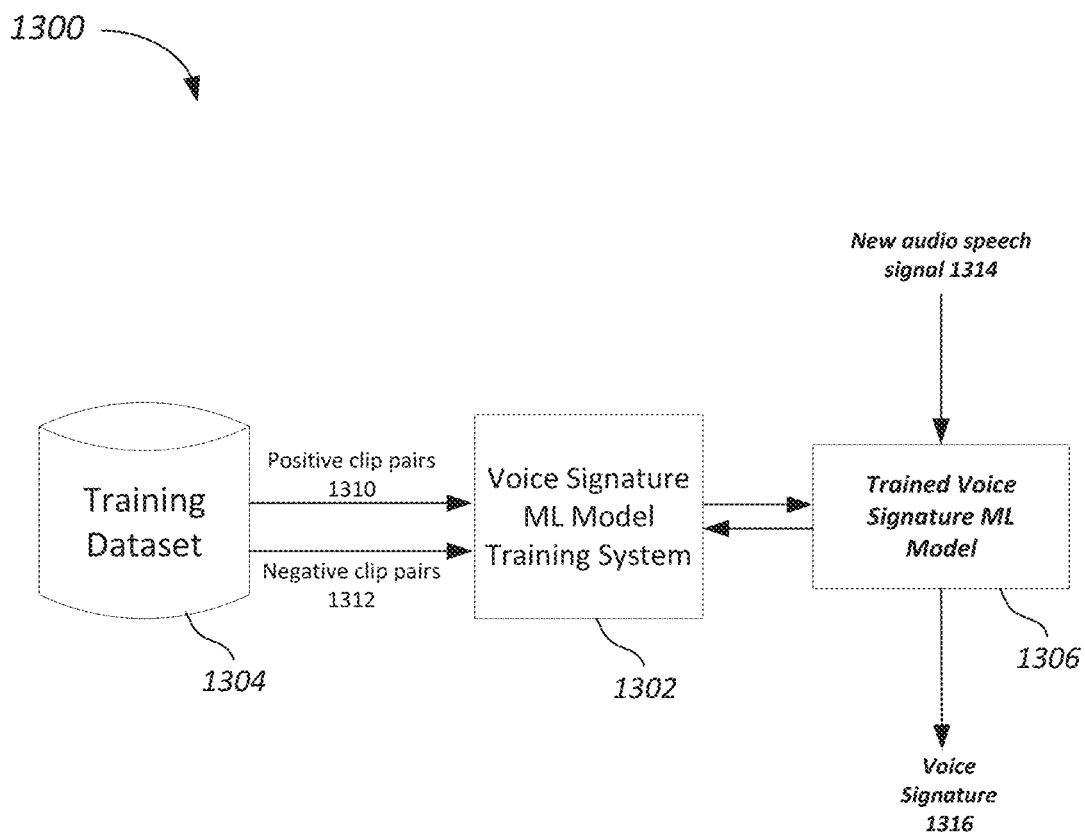
FIG. 13 is a block diagram illustrating training and deployment of a voice signature machine learning model for extracting voice signature(s) from speech data, according to a non-limiting embodiment of the present application.

FIG. 13 is a block diagram illustrating training and deploying 1300 of a voice signature machine learning model for extracting voice signature from speech data, according to a non-limiting embodiment of the present application. In some embodiments, a voice signature machine learning model training system 1302 may be configured to use training dataset 1304 to generate a trained voice signature machine learning model 1306. The trained voice signature machine learning model 1306 may be deployed in voice signature network described above, such as 1002 of FIG. 10. The trained voice signature machine learning model may also be used in training the voice isolation network, as described in FIG. 8 (see 808 of FIG. 8). In other embodiments, the trained voice signature machine learning model may also be used to implement the voice signature network for collecting voice signatures, as described in FIG. 12.

In some embodiments, the voice signature machine learning model 1306 may include a neural network comprising a plurality of layers, each having multiple weights. Training system 1302 may use training dataset 1304 to train the weights in the machine learning model 1306. In some embodiments, the training system 1302 may train the machine learning model 1306 using a contrastive learning method. The training dataset 1304 may include pairs of audio clips including speech collected from a plurality of speakers. For example, multiple clips are collected from various different speakers, with each clip being labelled with a unique speaker ID. The clips may be organized into positive 1310 and negative pairs 1312, where positive pairs denote pairs of clips belonging to the same speaker while negative pairs denote clips belonging to different speakers. In some embodiments, the training dataset 1304 may contain clean speech data (without noise). The training data may further be augmented with added noise. For example, audio data in the training dataset may be augmented by mixing in background audio for a small portion of the clips and applying room impulse responses to the speech to add reverberation.

In training the machine learning model 1306, a pre-trained voice signature machine learning model is initialized and contains initial weights. The training system then provides the training dataset including the positive and negative clip pairs to the pre-trained voice signature machine learning model to generate an output for each data point in each of a plurality of iterations in an optimization process. For example, each data point in an iteration may be a small segment of the clip pairs (e.g., in chunks of 1 second each). The training system 1302 may provide the clip pairs through the voice signature machine learning model 1306 and output pairs of embeddings. The optimization process may be configured in such a way that embeddings corresponding to clips from the same speaker are made as similar as possible, while embeddings corresponding to clips from different speakers are optimized to be as different as possible.

In some embodiments, a contrastive loss function is applied directly to the output (embeddings) corresponding to input audio clips. In another embodiment, a contrastive loss function is applied between each embedding and the centroid of the corresponding cluster of embeddings in the latent space. The similarity may be quantified using cosine similarity and the loss function may be configured such that the optimization maximizes the cosine similarity for positive pairs and minimizes the cosine similarity for negative pairs.

In some embodiments, the embedding (a 256-dimensional vector) may be obtained by averaging the outputs corresponding to each chunk (e.g., 1 second).

The trained voice signature machine learning model 1306 may be deployed (executed) in the voice signature network described in various embodiments above. The trained voice signature machine learning model may take any new audio speech signal 1314 and extract voice signature(s) of one or more speaker(s) 1316.

Figure 14:
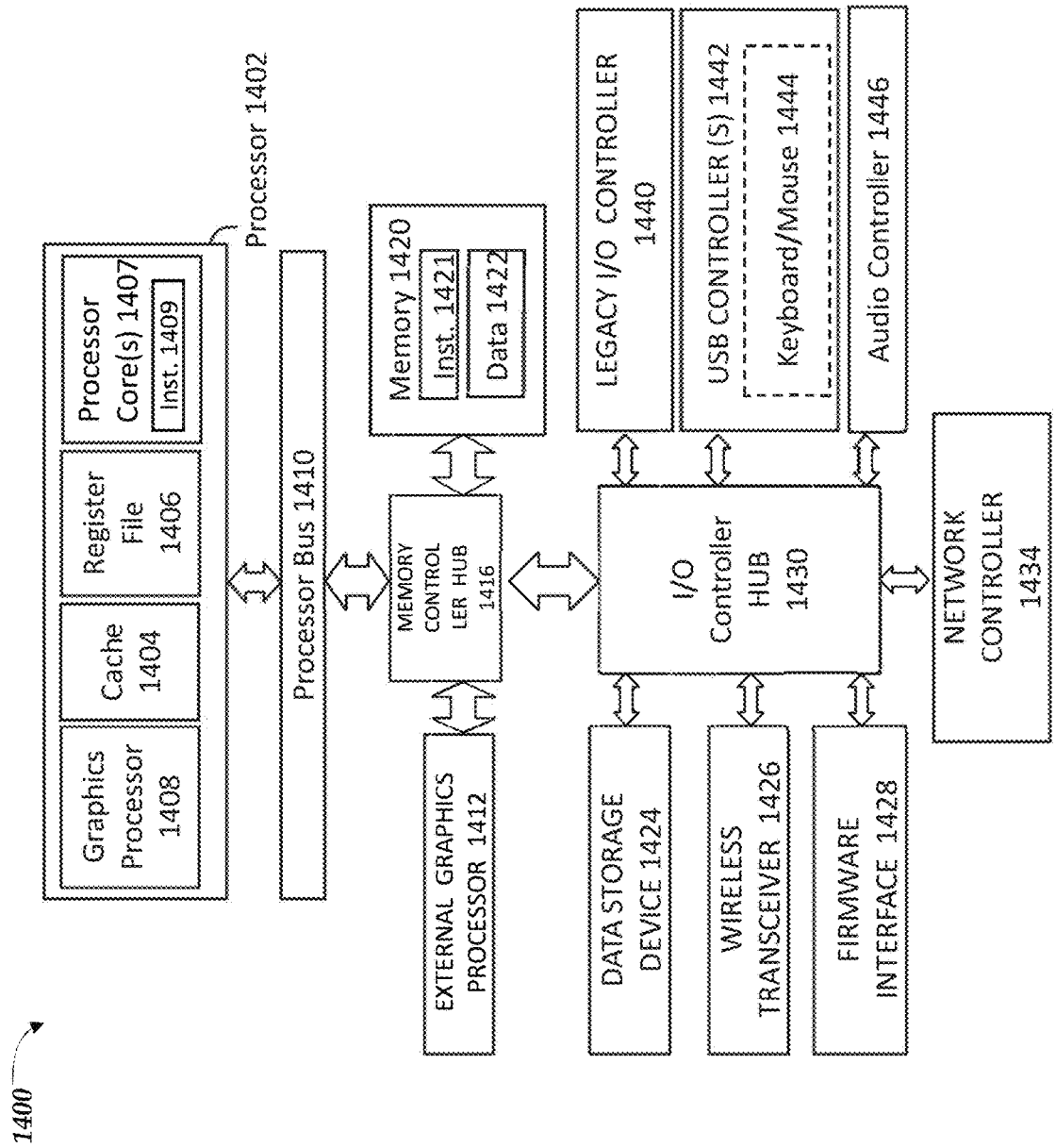
FIG. 14 illustrates an example of a computing system that may be implemented in an electronic device to implement various embodiments described in the present application.

FIG. 14 illustrates an example of a computing system 1400 that may be implemented in an electronic device to implement various embodiments described in the present application. In some embodiments, system 1400 may implement operations described in various embodiments with reference to FIGS. 1-3 and 10-13 on an electronic device, such as 110 (in FIGS. 1 and 2) or 304 (in FIG. 3). In some embodiments, the system 1400 includes one or more processors 1402 and one or more graphics processors 1408, and may be a single processor desktop system, a multiprocessor workstation system, or a server system having a large number of processors 1402 or processor cores 1407. In on embodiment, the system 1400 is a processing platform incorporated within a system-on-a-chip (SoC or SOC) integrated circuit for use in mobile, handheld, or embedded devices.

An embodiment of system 1400 can include or be incorporated within a server-based smart-device platform or an online server with access to the Internet. In some embodiments system 1400 is a mobile phone, smart phone, tablet computing device or mobile Internet device. Data processing system 1400 can also include, couple with, or be integrated within a wearable device, such as a smart watch wearable device, smart eyewear device (e.g., face-worn glasses), augmented reality device, or virtual reality device. In some embodiments, data processing system 1400 is a television or set top box device having one or more processors 1402 and a graphical interface generated by one or more graphics processors 1408.

In some embodiments, the one or more processors 1402 each include one or more processor cores 1407 to process instructions which, when executed, perform operations for system and user software. In some embodiments, each of the one or more processor cores 1407 is configured to process a specific instruction set 1409. In some embodiments, instruction set 1409 may facilitate Complex Instruction Set Computing (CISC), Reduced Instruction Set Computing (RISC), or computing via a Very Long Instruction Word (VLIW). Multiple processor cores 1407 may each process a different instruction set 1409, which may include instructions to facilitate the emulation of other instruction sets. Processor core 1407 may also include other processing devices, such as a DSP.

In some embodiments, the processor 1402 includes cache memory 1404. Depending on the architecture, the processor 1402 can have a single internal cache or multiple levels of internal cache. In some embodiments, the cache memory is shared among various components of the processor 1402. In some embodiments, the processor 1402 also uses an external cache (e.g., a Level-3 (L3) cache or Last Level Cache (LLC)) (not shown), which may be shared among processor cores 1407 using known cache coherency techniques. A register file 1406 is additionally included in processor 1402 which may include different types of registers for storing different types of data (e.g., integer registers, floating point registers, status registers, and an instruction pointer register). Some registers may be general-purpose registers, while other registers may be specific to the design of the processor 1402.

In some embodiments, processor 1402 is coupled to a processor bus 1410 to transmit communication signals such as address, data, or control signals between processor 1402 and other components in system 1400. In one embodiment the system 1400 uses an exemplary 'hub' system architecture, including a memory controller hub 1416 and an Input Output (I/O) controller hub 1430. A memory controller hub 1416 facilitates communication between a memory device and other components of system 1400, while an I/O Controller Hub (ICH) 1430 provides connections to I/O devices via a local I/O bus. In one embodiment, the logic of the memory controller hub 1416 is integrated within the processor.

Memory device 1420 can be a dynamic random access memory (DRAM) device, a static random access memory (SRAM) device, flash memory device, phase-change memory device, or some other memory device having suitable performance to serve as process memory. In one embodiment the memory device 1420 can operate as system memory for the system 1400, to store data 1422 and instructions 1421 for use when the one or more processors 1402 executes an application or process. Memory controller hub 1416 also couples with an optional external graphics processor 1412, which may communicate with the one or more graphics processors 1408 in processors 1402 to perform graphics and media operations.

In some embodiments, ICH 1430 enables peripherals to connect to memory device 1420 and processor 1402 via a high-speed I/O bus. The I/O peripherals include, but are not limited to, an audio controller 1446, a firmware interface 1428, a wireless transceiver 1426 (e.g., Wi-Fi, Bluetooth), a data storage device 1424 (e.g., hard disk drive, flash memory, etc.), and a legacy I/O controller 1440 for coupling legacy (e.g., Personal System 2 (PS/2)) devices to the system. One or more Universal Serial Bus (USB) controllers 1442 connect input devices, such as keyboard and mouse 1444 combinations. A network controller 1434 may also couple to ICH 1430. In some embodiments, a high-performance network controller (not shown) couples to processor bus 1410. It will be appreciated that the system 1400 shown is exemplary and not limiting, as other types of data processing systems that are differently configured may also be used. For example, the I/O controller hub 1430 may be integrated within the one or more processor 1402, or the memory controller hub 1416 and I/O controller hub 1430 may be integrated into a discreet external graphics processor, such as the external graphics processor 1412.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above (e.g., FIGS. 3-6C, 8-10 and 13-14) may comprise hardware, software or a combination of hardware and software. In a non-limiting example, voice isolation network as described above, or a portion of the voice isolation network, may be implemented in software by a processor of the ear-worn device. Alternatively, the voice isolation network may be implemented in hardware, e.g., in an FPGA or an ASIC chip installed in the ear-worn device.

Figure 15:
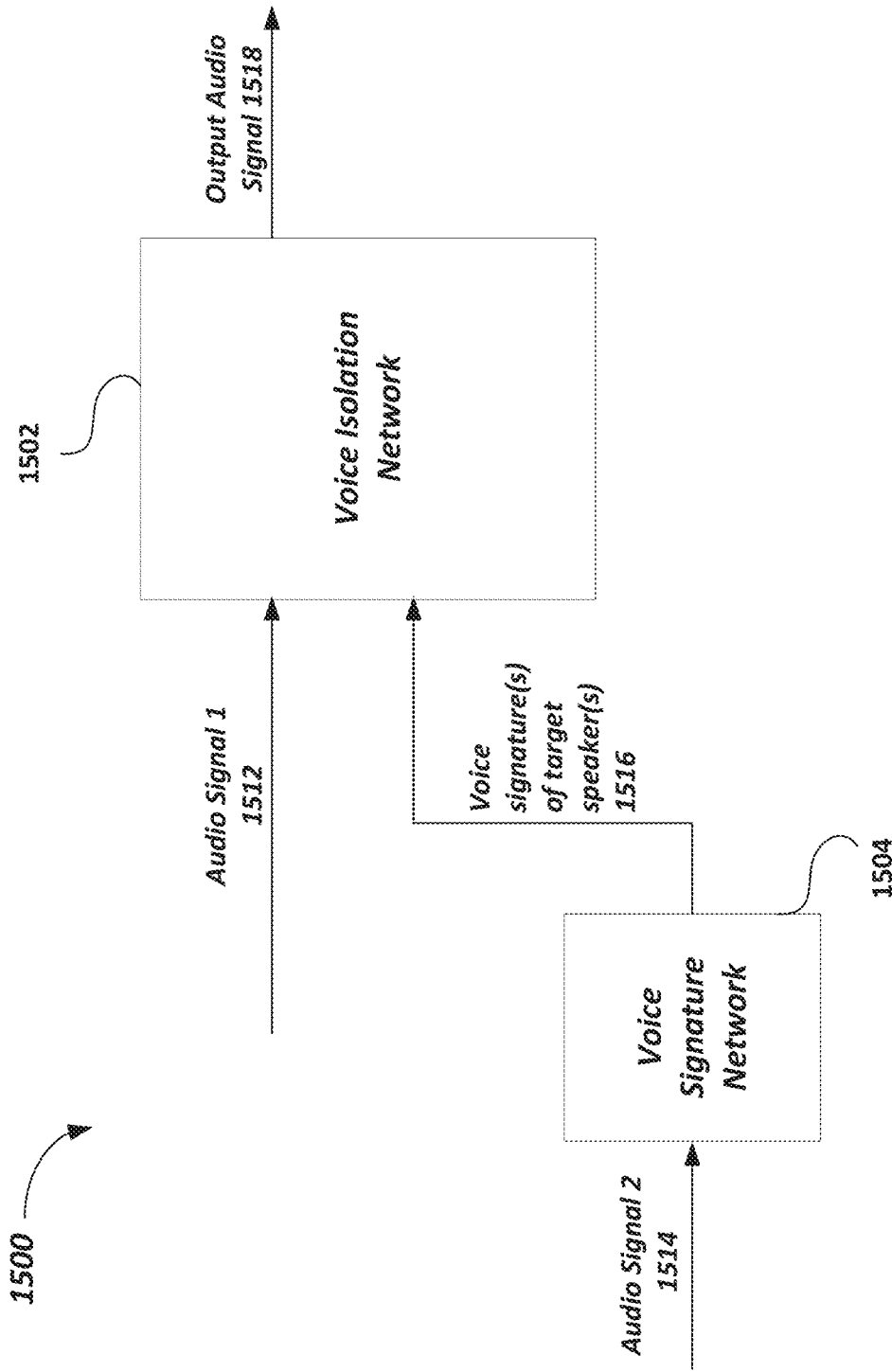
FIG. 15 illustrates an example circuit including a voice isolation network and a voice signature network, according to a non-limiting embodiment of the present application.

FIG. 15 illustrate an example circuit including a voice isolation network and a voice signature network coupled to the voice isolation work, where the circuit (hardware-implemented or software-implemented) may be implemented in an ear-worn device, or in an external electronic device. For example, circuitry 1500 may be implemented in an ear-worn device 108 (in FIGS. 1-2), 302 (in FIG. 3), or implemented as an expanded voice isolation network 403 (in FIG. 4A), 450 (in FIG. 4B), 540 (in FIG. 5A), 570 and 580 (in FIG. 5B), or 600 (in FIG. 6A). In some embodiments, circuitry 1500 may include a combination of configurations spread between an ear-worn device and an electronic device, as described above in connection with other components of an audio system including an ear-worn device and an electronic device. For example, circuitry 1500 may include both a voice isolation network 1502 configured to isolate the speech of speakers from an audio signal, and a voice signature network 1504 configured to provide the voice signature(s) of target speaker(s) to the voice isolation network 1502 from an audio signal. Voice isolation network 1502 may be configured in a similar manner as voice isolation network 600 of FIG. 6A. Voice signature network 1504 may be configured in a similar manner as voice signature network 1002 of FIG. 10, with the difference being that the circuitry 1000 (or a portion of circuitry 1000 including voice signature network 1002) may be implemented in the ear-worn device. In such configuration, the input audio signal 1514 to the voice signature network 1504 may be provided directly by the ear-worn device and the output of the voice signature network may be provided directly to the voice isolation network 1502. The output audio signal from the voice isolation network 1502 may be provided to other components in the ear-worn device for further process as previously described and output to the receiver(s) of the ear-worn device.

In another variation, one or more components in an ear-worn device described above may be implemented in an electronic device. For example, circuit 1500 may be implemented in an external electronic device such as 110 (in FIGS. 1-2), 304 (in FIG. 3). In such case, the input audio signal 1512 to the voice isolation network 1502 may be transmitted from the ear-worn device or detected directly by the microphone of the electronic device. The output audio signal 1518 of the voice isolation network may transmitted to the ear-worn device for further processing as describe above, and output to the receiver(s) of the ear-worn device.

In other variations, the voice signatures may be extracted and/or stored on any suitable device. For example, the voice signatures of speakers or a subset of speakers (e.g., known speakers, or default target speakers) may be stored on the ear-worn device itself. Alternatively, and/or additionally, voice signatures of some or all speakers may be extracted using an on-board voice signature network on the ear-worn device, instead of on an external electronic device. In other variations, the voice signature may be extracted without using a voice signature network. For example, a voice signature of a speaker may include a feature vector that contains the average speech power at different frequencies of an audio signal including the speech of the speaker. This voice signature may be obtained using a traditional signal processing technique. Similarly, ear-worn device may have various user interfaces that allow a wearer to make some user selections as described in connection with FIGS. 11A-11F. For example, an ear-worn device may have a user interface including one or more buttons, one or more lights, an audio interface, and/or a visual interface, which allows a user to make a variety of user selections in connection with one or more operations of the ear-worn device, and/or one or more operations performed on the external electronic device described in various embodiments above.

In further variations, the voice isolation network may be adapted to handle scenarios when multiple target speakers speak contemporaneously in a conversation, or when multiple target speakers and other non-target speaker(s) speak contemporaneously. In such cases, the voice isolation network training system may re-arrange the training dataset or re-create the training dataset to have clips that are mixed synthetically to have multiple target speakers. The training system may train the machine learning model with various permutations of multiple target speakers and multiple non-target speakers in a given clip. Other methods may also be possible.

As should be appreciated from the foregoing, according to some embodiments of the technology described herein, an ear-worn device is configured to use a voice isolation machine learning model that operates on a voice signature to isolate a component of a received speech signal representing speech of a target speaker or non-target speaker associated with the voice signature. The voice signature may be obtained from a separate machine learning model, such as a voice signature machine learning model, configured to extract the voice signature from reference audio clips representing speech of the target or non-target speaker. For example, FIG. 15 shows that a voice signature network 1504 is configured to process an audio signal (e.g., audio signal 2) to extract voice signature(s) of target speaker(s) 1516. The voice isolation network 1502 processes an audio signal (e.g., audio signal 1), in conjunction with the voice signature(s) output by the voice signature network 1504, to generate an output audio signal representing isolated speech of the target speaker(s). Such an embodiment may be advantageous for multiple reasons. As a non-limiting example, the voice signature network may be implemented on an electronic device different from the ear-worn device, thereby reducing the computational complexity of implementing multiple machine learning networks on the ear-worn device, while retaining voice isolation capabilities. In addition, multiple voice signatures may be determined by the voice signature network and supplied to the voice isolation network to allow separation of speech associated with multiple contemporaneous speakers.

In further variations, a single network, such as a voice isolation and classification network, may be configured to both (a) de-noise the input audio signal and (b) determine an embedding of the input audio signal. The embedding may be compared to a reference embedding representing a voice signature of a target or non-target speaker. The reference embedding may be generated by passing a clip of speech from a target speaker or non-target speaker through the same network and averaging the resultant embeddings. The result of the comparison may be used to classify the input audio signal as belonging to the target or non-target speaker, or as not belonging to any such target or non-target speaker. In some embodiments, the isolated component(s) of the audio signal are selectively processed based on the result of the classification. For example, an isolated component of the audio signal that is classified as originating from a target speaker may be amplified and/or enhanced, while an isolated component of the audio signal that is classified as originating from a non-target speaker may be suppressed.

In some embodiments, a voice isolation and classification network may be used instead of, or in addition to, a voice isolation network separate from a voice signature network. Such an embodiment may be advantageous for multiple reasons. For example, instead of providing a voice signature as input to a machine learning model and using the machine learning model to identify and separate out speech associated with the voice signature, the voice isolation and classification network may be trained to perform the two functions described above, namely (a) de-noising the input audio signal and (b) determining an embedding of the input audio signal. Determination of whether the input audio signal includes speech of a target or non-target speaker may then be accomplished using a comparator, such as a cosine similarity comparator. Such operation may be simpler than using a machine learning model to identify speech associated with a target speaker by having the machine learning model apply a voice signature as an input, and may lead to better overall performance of the hearing system. Also, using a voice isolation and classification machine learning model that performs the functions (a) and (b) described above may allow for use of the same model on both the ear-worn device (e.g., hearing aid) and the separate electronic device (e.g., mobile phone), which may simplify training and deployment of the model compared to an embodiment in which separate machine learning models are used for voice signature detection and voice isolation. Moreover, an audio clip representing the voice of a speaker may be passed through the voice isolation and classification model once, and then used to predict whether subsequent input audio signals represent speech from the same speaker. As another non-limiting example, layers of the voice isolation and classification machine learning model can take advantage of information already processed in previous frames. In other words, the layers that generate the discriminative embedding can also be recurrent, so while processing audio frame-by-frame in real-time, the network can use recently received information to identify who is speaking in a given frame (which is done by generating an embedding for a given frame).

Figure 16:
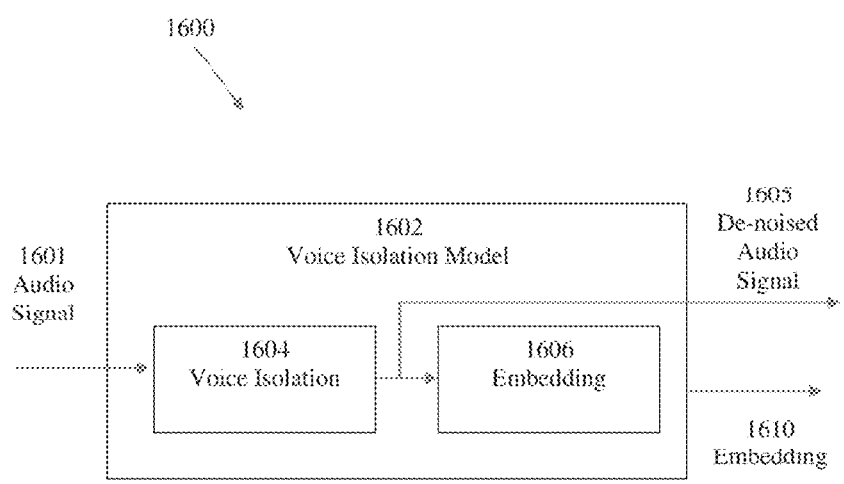
FIG. 16 illustrates an example of a voice isolation network having a voice isolation model for de-noising an input audio signal and determining an embedding of the input audio signal.

FIG. 16 illustrates an example of a voice isolation network having a voice isolation model for de-noising an input audio signal and determining an embedding of the input audio signal. The illustrated voice isolation network 1600 includes a voice isolation model 1602 configured to receive an audio signal 1601. The voice isolation model 1602 includes a voice isolation component 1604 and an embedding component 1606. Those two components may be considered separate components of the same machine learning model, namely voice isolation model 1602. The audio signal 1601 is first processed by the voice isolation component 1604 to produce a de-noised audio signal 1605. The de-noised audio signal is provided to the embedding component 1604 which determines an embedding 1610 of the audio signal. The voice isolation model 1602 therefore may provide two outputs, including the de-noised audio signal 1605 and the embedding 1610.

The illustrated voice isolation network may be used to generate a voice signature of a target or non-target speaker, represented by the embedding 1610. The audio signal 1601 may be an audio clip of speech of the target or non-target speaker. Therefore, the embedding may be a discriminative embedding representing a voice signature of the target or non-target speaker. That discriminative embedding may then be used as a reference embedding for later comparison to determine whether received audio includes speech from the target or non-target speaker. In some embodiments, the audio clip of the speech will be processed through the network frame by frame, and then the embedding averaged across all the frames will be the discriminative embedding that is stored for later comparison. In some embodiments, the non-target speaker is the wearer of the ear-worn device, and the embedding 1610 may represent a voice signature of the wearer of the ear-worn device.

Figure 17:
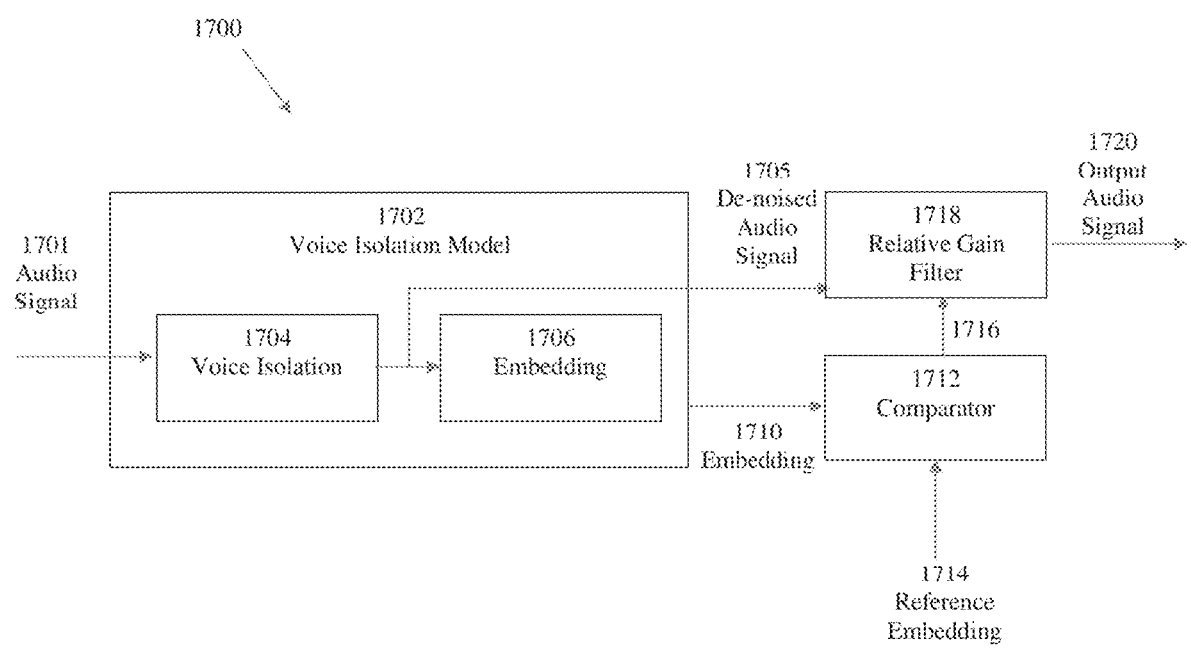
FIG. 17 illustrates a voice isolation and classification network according to some embodiments of the present technology.

FIG. 17 illustrates a voice isolation and classification network according to some embodiments of the present technology. The illustrated voice isolation and classification network 1700 includes a voice isolation model 1702 having a voice isolation component 1704 and an embedding component 1706. In some embodiments, the voice isolation model 1702 is the same model as voice isolation model 1602, but the two may be different instances of the same machine learning model in different locations. For instance, the voice isolation model 1602 may be used on an electronic device (e.g., a mobile phone) and the voice isolation model 1702 may be used on an ear-worn device (e.g., a hearing aid).

The voice isolation model 1702 receives an audio signal 1701 as input and generates a de-noised audio signal 1705 using the voice isolation component 1704. The voice isolation model 1702 further determines an embedding 1710 using the embedding component 1706. The voice isolation model 1702 therefore may output the de-noised audio signal 1705 and the embedding 1710.

The voice isolation and classification network 1700 further comprises a comparator 1712. The comparator 1712 is configured to compare the embedding 1710 with a reference embedding 1714. The reference embedding may be provided by a separate instance of the voice isolation model, for example by voice isolation model 1602. In some embodiments, then, the voice isolation model 1602 may be used to generate an embedding 1610 which may be stored and used as a reference embedding for use by a different instance of the voice isolation model. In one embodiment, for example, the voice isolation model 1602 is used on a mobile phone to determine a voice signature of a target or non-target speaker represented by embedding 1610. The embedding 1610 is then provided to an ear-worn device having the voice isolation and classification network 1700, to be used as the reference embedding 1714. The embedding 1610 in some embodiments represents a voice signature of the wearer of the ear-worn device.

The comparator 1712 compares the embedding 1710 with the reference embedding 1714 (e.g., embedding 1610 from FIG. 16) and determines whether they match. If the embedding 1710 matches the reference embedding 1714, the comparator 1712 outputs a classification value 1716 (e.g., a 1) indicating the match and thus that the audio signal 1701 includes speech from a speaker associated with reference embedding 1714. In some embodiments, the match may be determined by the cosine similarity between the embedding vectors, which may involve calculating the cosine similarity between the embedding vectors. In other embodiments, this may be another small recurrent network that predicts the degree of match. If the embedding 1710 does not match the reference embedding 1714, the comparator 1712 outputs a classification value 1716 (e.g., a 0) indicating no match and thus that the audio signal 1701 does not include speech from the speaker associated with the reference embedding 1714.

The classification value 1716 is provided to a relative gain filter 1718 which processes the de-noised audio signal 1705. For example, if the classification value 1716 indicates a match between the embedding 1710 and the reference embedding 1714, output audio signal 1720 may be enhanced or attenuated according to user preferences for the speaker associated with the reference embedding 1714. For example, if the reference embedding 1714 represents the wearer's own voice signature, indication of a match between the embedding 1710 and the reference embedding 1714 may result in the relative gain filter 1718 outputting an attenuated output audio signal 1720. In this manner, the wearer's own voice may be suppressed and the wearer may have a more positive experience with the hearing aid.

The output audio signal 1720 may be provided to a DSP (e.g., see FIGS. 4A and 4B) for outputting to the receiver(s) of the ear-worn device.

The comparator 1712 may be considered part of or separate from the voice isolation model. In the representation of FIG. 17, the comparator 1712 is shown as separate from the voice isolation model 1702. However, in alternative embodiments, the comparator 1712 may be considered to form part of the voice isolation model.

According to an embodiment of the present application, the voice isolation model 1602 and the voice isolation and classification network 1700 are used together. The voice isolation model 1602 is used on an electronic device (e.g., electronic device 110) to generate an embedding 1610 representing a target or non-target speaker. The de-noised audio signal 1605 may not be used. The voice isolation and classification network 1700 is used on an ear-worn device (e.g., ear-worn device 108, which may be a hearing aid) and receives the embedding 1610 from the electronic device for use as reference embedding 1714. Thus, it should be appreciated that in some embodiments the same voice isolation model may be used on both the electronic device and the ear-worn device. This system architecture simplifies development and training of the machine learning model compared to a hearing system that uses different machine learning models on the electronic device and ear-worn device.

Training of the voice isolation model 1602 and voice isolation model 1702—which, again, may be different instances of the same machine learning model—may be done in stages. First, the model may be trained to do the task of voice isolation. After voice isolation layers are trained, then additional layers are trained to check whether the isolated voice is a match for a given snippet of voice audio. The trained model would therefore output both clean speech and the result of a classifier that matched the speech to a voice signature. The trained model may then be used to amplify or suppress the voice. For example, when the target voice is present, the voice stream can be played out at full volume. When the classifier determines that a different speaker is speaking, the voice stream can be suppressed.

As described above, such an approach may provide various benefits. For example, the voice signature clip the represents the target or non-target voice can be passed through the voice isolation network just once, and then stored as a single vector representing the average embedding for the entire voice signature clip. The subsequently received input audio signal may be processed frame by frame with low latency (e.g., in real time), and the voice isolation and classification network can predict the discriminative embedding. Also, since the machine learning model may be a recurrent network, the predicted embedding for a given frame of the input audio signal can utilize information from previous frames.

The voice isolation networks of FIGS. 16 and 17 may also be used with multiple target or non-target speakers. To do so, just the classifier layers of the voice isolation and classification model are rerun for each target or non-target speaker. The layers of the machine learning model that perform de-noising may be run once for each audio frame. Since the layers that perform de-noising may be computationally expensive, such operation may allow for relatively computationally little effort to process input audio signals to identify multiple target or non-target speakers.

The various embodiments described in FIGS. 1-17 provide advantages over conventional hearing aids. For example, rather than separating out speech from noise as done in conventional hearing aids (in which all voices may be presented equally to the wearer), techniques described herein allow a system to selectively isolate one or more target speakers from other non-target speakers or noise, thus provide a positive experience for the wearer of the ear-worn device. Such positive experience allows the wearer to focus on the speech of a subset of the voices in the environment, which is a function important to natural hearing.

Further, the use of voice signatures in a voice isolation network allows the system to selectively isolate the target speakers. Other techniques, such as the use of triplets of clips combined with the use of a trained voice signature machine learning model in a training system yields a trained voice isolation machine learning model with improved performance on isolating speech(es) of target speaker(s).

Various techniques are provided to further process the isolated speech by preferentially treating the isolated speech, to generate enhanced speech for target speakers with increased SNR. Other techniques include dynamically controlling the voice isolation network to activate or deactivate during a conversation. Such controlling results in a saving of computation, which makes it possible to execute a machine learning model in real-time and on a power-restraint ear-worn device.

Even further, the system uses a phone associated with the wearer of the ear-worn device, which allows the wearer to effectively select target speakers to whom the wearer of the ear-worn device prefers to listen. For example, the phone may store a registry of known speakers, which may be updated by the user. The registry of known speakers thus assists the user to quickly select target speakers in a multi-speaker conversation.

According to some embodiments, a method of operating a mobile processing device operatively couplable to an ear-worn device is provided. The method comprises: wirelessly transmitting, from the mobile processing device to the ear-worn device, a voice signature of at least one target speaker.

According to some embodiments, an apparatus is provided. The apparatus comprises at least one processor; and at least one non-transitory computer-readable medium storing instructions that, when executed, cause the at least one processor to perform a method of operating a mobile processing device operatively couplable to an ear-worn device. The method comprises: wirelessly transmitting, from the mobile processing device to the ear-worn device, a voice signature of at least one target speaker.

According to some embodiments, a non-transitory computer-readable medium comprising instructions that, when executed, cause at least one processor to perform a method of operating a mobile processing device operatively couplable to an ear-worn device. The method comprises: wirelessly transmitting, from the mobile processing device to the ear-worn device, a voice signature of at least one target speaker.

In some embodiments, the voice signature comprises a feature vector, and wirelessly transmitting the voice signature of the target speaker comprises wirelessly transmitting the feature vector.

Some embodiments further comprise storing a registry of plurality of speakers including the target speaker on the mobile processing device, wherein the registry comprises a plurality of entries respectively each associated with a voice signature of a respective speaker of the plurality of speakers; wherein transmitting the voice signature of the target speaker comprises transmitting an identifier identifying the voice signature of the target speaker in the registry.

Some embodiments further comprise receiving an input speech signal including speech from the target speaker; and determining that the input speech signal includes the speech from the target speaker by processing the input speech signal with a machine learning model that isolates speech associated with the voice signature of the target speaker.

In some embodiments, receiving the input speech signal comprises receiving the input speech signal from a microphone coupled to the mobile processing device or from the ear-worn device.

Some embodiments further comprise determining that the input speech signal includes speech from an additional speaker besides the target speaker; and wirelessly transmitting from the mobile processing device to the ear-worn device, a voice signature of the additional speaker.

Some embodiments further comprise receiving a user selection identifying the target speaker and/or the additional speaker, and wherein wirelessly transmitting the voice signature of the target speaker and/or wirelessly transmitting the voice signature of the additional speaker is performed in response to receiving the user selection.

Some embodiments further comprise, before receiving the user selection identifying the target speaker and/or the additional speaker, displaying respective entries of the target speaker and/or the additional speaker in the registry.

Some embodiments further comprise receiving an input speech signal including speech from the target speaker; and obtaining the voice signature of the target speaker based on the input speech signal.

In some embodiments, obtaining the voice signature of the target speaker comprises developing the voice signature of the target speaker by processing the input speech signal with a machine learning model.

In some embodiments, the mobile processing device comprises a microphone, and wherein receiving the input speech signal comprises receiving the input speech signal from the microphone.

In some embodiments, receiving the input speech signal comprises wirelessly receiving the input speech signal from the hearing aid.

Some embodiments further comprise receiving a user selection identifying the target speaker, and wherein wirelessly transmitting the voice signature of the target speaker is performed in response to receiving the user selection.

In some embodiments, the mobile processing device stores a plurality of voice signatures including the voice signature of the target speaker. Some embodiments further comprise, in advance of receiving the user selection identifying the target speaker, presenting the user with an option to select the target speaker.

In some embodiments, each voice signature in the plurality of voice signatures is associated with a respective speaker among a plurality of speakers in a contact list including the target speaker, and storing the plurality of voice signatures comprises: collecting a respective audio segment for each of the plurality of speakers; generating a respective voice signature for each of the plurality of speakers using a machine learning model over the respective audio segment; and registering in a registry the voice signatures of the plurality of speakers with the plurality of speakers in the contact list.

In some embodiments, collecting the respective audio segment for a speaker of the plurality of speakers comprises:

displaying a prompt; recording the respective audio segment in response to the speaker reading the prompt.

In some embodiments, collecting the respective audio segment for a speaker of the plurality of speakers comprises processing an audio signal recorded in a conversation including the speaker.

According to some embodiments, a method of selectively processing, with an ear-worn device including a processor and a microphone coupled to the processor, a target speaker's speech from an audio signal comprising temporally overlapping speech components from multiple speakers is provided. In some embodiments, the target speaker comprises a wearer of the ear-worn device. The method comprises: detecting the audio signal with the microphone of the ear-worn device; providing the audio signal detected by the microphone of the ear-worn device to the processor of the ear-worn device; isolating, with the processor of the ear-worn device, a component of the audio signal representing the target speaker's speech from among the temporally overlapping speech components from multiple speakers by processing the audio signal with a machine learning model; and suppressing the isolated component of the audio signal representing the target speaker's speech.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be object of this disclosure. Accordingly, the foregoing description and drawings are by way of example only.

What is claimed is:

1. A hearing aid system, comprising:
an ear-worn device including:
  a microphone configured to receive an audible signal and output an electrical signal representing the audible signal;
  front-end circuitry coupled to the microphone and configured to receive the electrical signal representing the audible signal, digitize the electrical signal, and output a digitized version of the audible signal;
  a controller configured to:
    receive the digitized version of the audible signal; and
    selectively output the digitized version of the audible signal to either a digital signal processor (DSP) or a neural network engine comprising a voice isolation and classification neural network;
  the neural network engine, wherein the neural network engine is coupled to an output of the controller and configured to:
    output from the voice isolation and classification neural network a de-noised version of the digitized version of the audible signal;
    output from the voice isolation and classification neural network an embedding of the digitized version of the audible signal;
    compare the embedding of the digitized version of the audible signal to a reference embedding;
    separate the digitized version of the audible signal into multiple source signals using the voice isolation and classification neural network;
    apply gains to multiple source signals of the de-noised version of the digitized version of the audible signal based at least in part on a result of the comparison of the embedding of the digitized version of the audible signal to the reference embedding;
    create a combined signal by recombining the multiple source signals after application of the gains; and
    provide the combined signal to the DSP;
  the DSP, wherein the DSP is coupled to the output of the controller and an output of the neural network engine, and wherein the DSP is configured to, upon receiving the combined signal from the neural network engine, filter the combined signal to generate an output signal; and
  a speaker, coupled to an output of the DSP and configured to playback the output signal in audible form; and
an electronic device, comprising a voice isolation and classification neural network, wherein the electronic device is configured to:
  receive a speech sample from a target speaker and generate the reference embedding; and
  provide the reference embedding to the ear-worn device.

2. The hearing aid system of claim 1, wherein the voice isolation and classification neural network of the ear-worn device and the voice isolation and classification neural network of the electronic device are of a same type.

3. The hearing aid system of claim 2, wherein the voice isolation and classification neural network of the ear-worn device is a recurrent neural network.

4. The hearing aid system of claim 2, wherein the electronic device is configured to provide a graphical user interface (GUI) to a user and to provide the reference embedding to the ear-worn device upon selection by the user of the target speaker on the GUI.

5. The hearing aid system of claim 1, wherein the electronic device is configured to provide a graphical user interface (GUI) to a user and to provide the reference embedding to the ear-worn device upon selection by the user of the target speaker on the GUI.

6. The hearing aid system of claim 1, wherein the reference embedding is a first reference embedding, and wherein the electronic device is configured to received multiple speech samples from respective target speakers and to generate respective reference embeddings including the first reference embedding using the voice isolation and classification neural network of the electronic device, wherein the electronic device is further configured to provide the respective reference embeddings to the ear-worn device, and wherein the neural network engine of the ear-worn device is further configured to compare the embedding of the digitized version of the audible signal to the respective reference embeddings.

7. The hearing aid system of claim 6, wherein the neural network engine of the ear-worn device is configured to compare the embedding of the digitized version of the audible signal to the respective reference embeddings at least in part by calculating a respective cosine similarity between the embedding of the digitized version of the audible signal and a respective reference embedding.

8. The hearing aid system of claim 7, wherein the neural network engine is configured to apply the gains to multiple source signals of the de-noised version of the digitized version of the audible signal based at least in part on results of the comparisons of the embedding of the digitized version of the audible signal to the respective reference embeddings.

9. The hearing aid system of claim 1, wherein the reference embedding represents a voice of a wearer of the ear-worn device, and wherein, when the comparison of the embedding of the digitized version of the audible signal to the reference embedding indicates that the wearer's voice is present in the digitized version of the audible signal, the neural network engine is configured to reduce a component of the digitized version of the audible signal representing the wearer's voice.

10. The hearing aid system of claim 1, wherein the electronic device is a smartphone.

11. The hearing aid system of claim 1, wherein the neural network engine of the ear-worn device is configured to compare the embedding of the digitized version of the audible signal to the reference embedding at least in part by calculating a cosine similarity between the embedding of the digitized version of the audible signal and the reference embedding.

12. The hearing aid system of claim 1, wherein the front-end circuitry, controller, neural network engine, and DSP are implemented on a system-on-chip.

13. The hearing aid system of claim 1, wherein the controller is further configured to determine a heuristic of the digitized version of the audible signal, and wherein the controller is further configured to selectively output the digitized version of the audible signal to either the DSP or the neural network engine depending at least in part on the heuristic of the digitized version of the audible signal.

14. The hearing aid system of claim 1, wherein the controller is further configured to receive a user-selected mode and to selectively output the digitized version of the audible signal to either the DSP or the neural network engine depending at least in part on the user-selected mode.

15. The hearing aid system of claim 14, wherein the electronic device is further configured to provide to the ear-worn device the user-selected mode.

16. The hearing aid system of claim 1, wherein the neural network engine is further configured to receive an indication of a user-selected directionality and to select the gains based at least in part on the user-selected directionality.

17. The hearing aid system of claim 1, wherein the DSP is configured to apply frequency-dependent filtering including the application of non-linear gains to different frequency bands of the combined signal.

18. The hearing aid system of claim 1, wherein the controller is configured to provide the digitized version of the audible signal to the neural network engine in segments, and wherein the neural network engine is configured to process a segment of the digitized version of the audible signal in a time less than or equal to a duration of the segment.

19. The hearing aid system of claim 1, wherein the voice isolation and classification neural network of the ear-worn device is a recurrent neural network.

20. The hearing aid system of claim 1, wherein the voice isolation and classification neural network of the ear-worn device is a convolutional neural network.

* * * * *